(12) United States Patent
Brander et al.

(10) Patent No.: US 9,935,979 B2
(45) Date of Patent: Apr. 3, 2018

(54) SYSTEM AND METHOD FOR ASSIGNING SECURITY LEVELS FOR INSTANT MESSAGING CONTACTS ACROSS DEVICE PARTITIONS

(71) Applicant: BlackBerry Limited, Waterloo (CA)

(72) Inventors: Ryan Conrad Brander, Beaverbank (CA); Maurice Patrick Scott, Ottawa (CA)

(73) Assignee: BlackBerry Limited, Waterloo (CA)

( * ) Notice: Subject to any disclaimer, the term of this patent is extended or adjusted under 35 U.S.C. 154(b) by 216 days.

(21) Appl. No.: 14/644,131

(22) Filed: Mar. 10, 2015

(65) Prior Publication Data

US 2015/0350251 A1    Dec. 3, 2015

Related U.S. Application Data

(63) Continuation-in-part of application No. 14/294,140, filed on Jun. 2, 2014, now Pat. No. 9,226,147, and a continuation-in-part of application No. 14/294,065, filed on Jun. 2, 2014, now Pat. No. 9,270,648.

(51) Int. Cl.
*H04L 29/06* (2006.01)
*H04L 12/58* (2006.01)
*G06F 17/30* (2006.01)

(52) U.S. Cl.
CPC ........ *H04L 63/20* (2013.01); *G06F 17/30876* (2013.01); *H04L 51/04* (2013.01); *H04L 63/105* (2013.01); *H04L 63/0428* (2013.01)

(58) Field of Classification Search
CPC ....... H04L 9/08; H04L 9/0816; H04L 9/0819; H04L 9/0838; H04L 9/0841; H04L 9/0844; H04L 9/085; H04L 63/20; H04L 63/205; H04L 51/04; G06F 21/6263; H04W 4/12; H04W 4/022
USPC ................. 713/168–171, 189, 193; 380/270, 380/277–278, 283; 726/1, 14
See application file for complete search history.

(56) References Cited

U.S. PATENT DOCUMENTS

| | | | | |
|---|---|---|---|---|
| 6,983,370 B2 * | 1/2006 | Eaton | ...................... | H04L 51/04 713/153 |
| 7,020,480 B2 * | 3/2006 | Coskun | .............. | G06Q 30/0209 455/414.1 |
| 7,489,781 B2 * | 2/2009 | Klassen | ............... | G06Q 20/347 380/270 |

(Continued)

*Primary Examiner* — Hosuk Song
(74) *Attorney, Agent, or Firm* — Jenna L. Wilson; Wilson Lue LLP

(57) ABSTRACT

A method, communication device and computer program product communicate between the communication device and a second communication device using an instant messaging application. The first device receives contact information identifying the second communication device and determines a contact type for the second communication device from the contact information. If the contact type is a first contact type, the contact information is stored in a first partition of a memory of the communication device. If the contact type is a second contact type, the contact information is stored in a second partition of the memory. The partitions may employ different encryption schemes or one partition may be is unencrypted. A third party has access and control over the second partition. The device communicates with the second communication device using a security policy associated with the contact type.

20 Claims, 42 Drawing Sheets

(56) References Cited

U.S. PATENT DOCUMENTS

| | | | | |
|---|---|---|---|---|
| 7,620,387 B2* | 11/2009 | Rybak | ................... | H04L 51/38 |
| | | | | 455/403 |
| 7,849,313 B2* | 12/2010 | Klassen | .............. | G06Q 20/347 |
| | | | | 713/168 |
| 9,226,147 B2* | 12/2015 | Brander | ................. | H04L 51/04 |
| 2012/0329554 A1* | 12/2012 | Mgrdechian | ....... | G06Q 30/0207 |
| | | | | 463/29 |

* cited by examiner

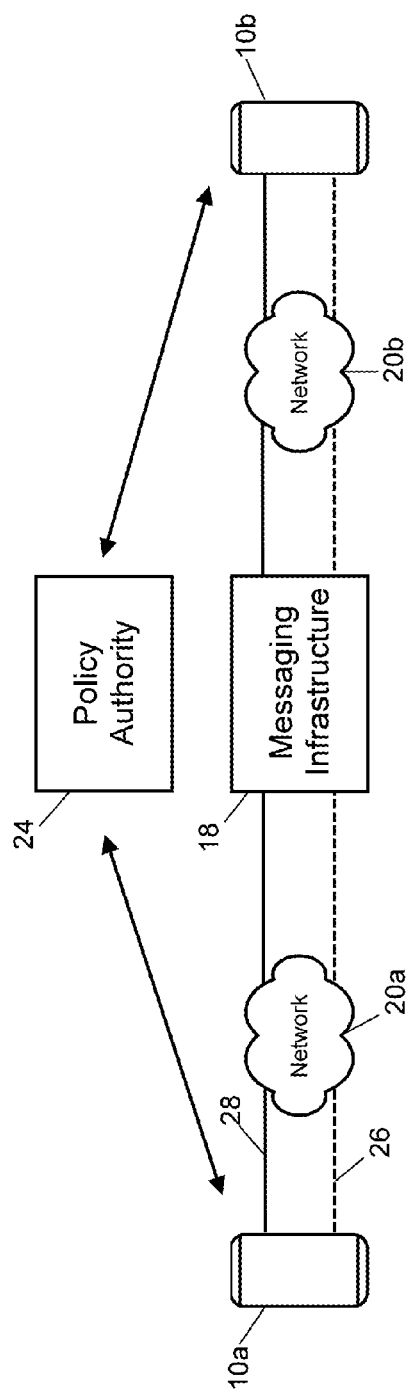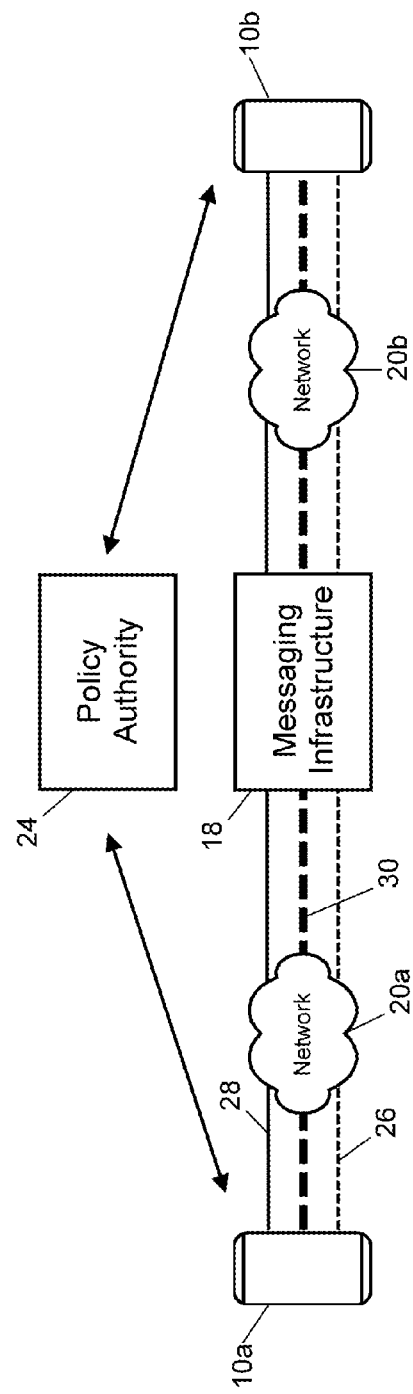

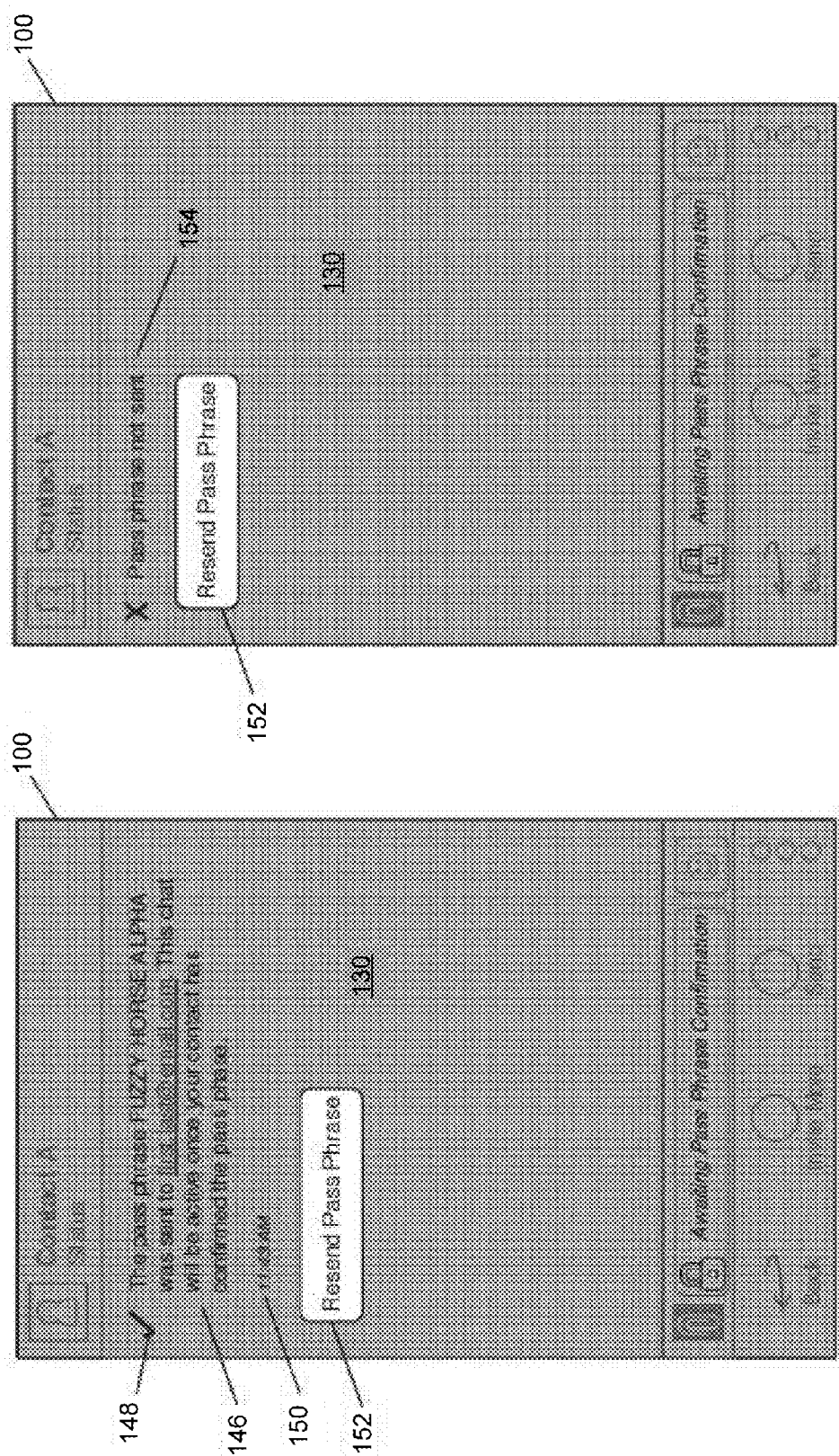

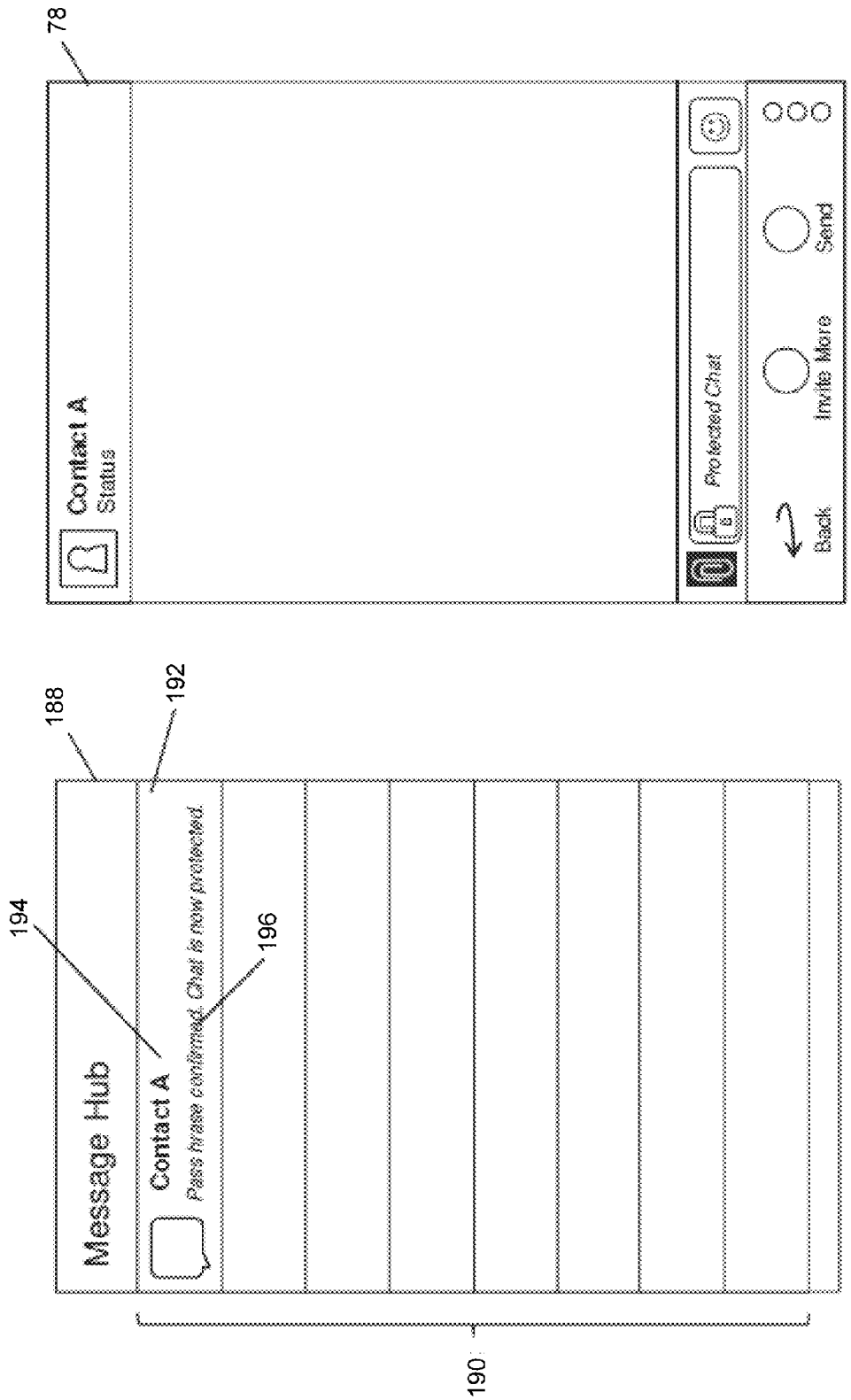

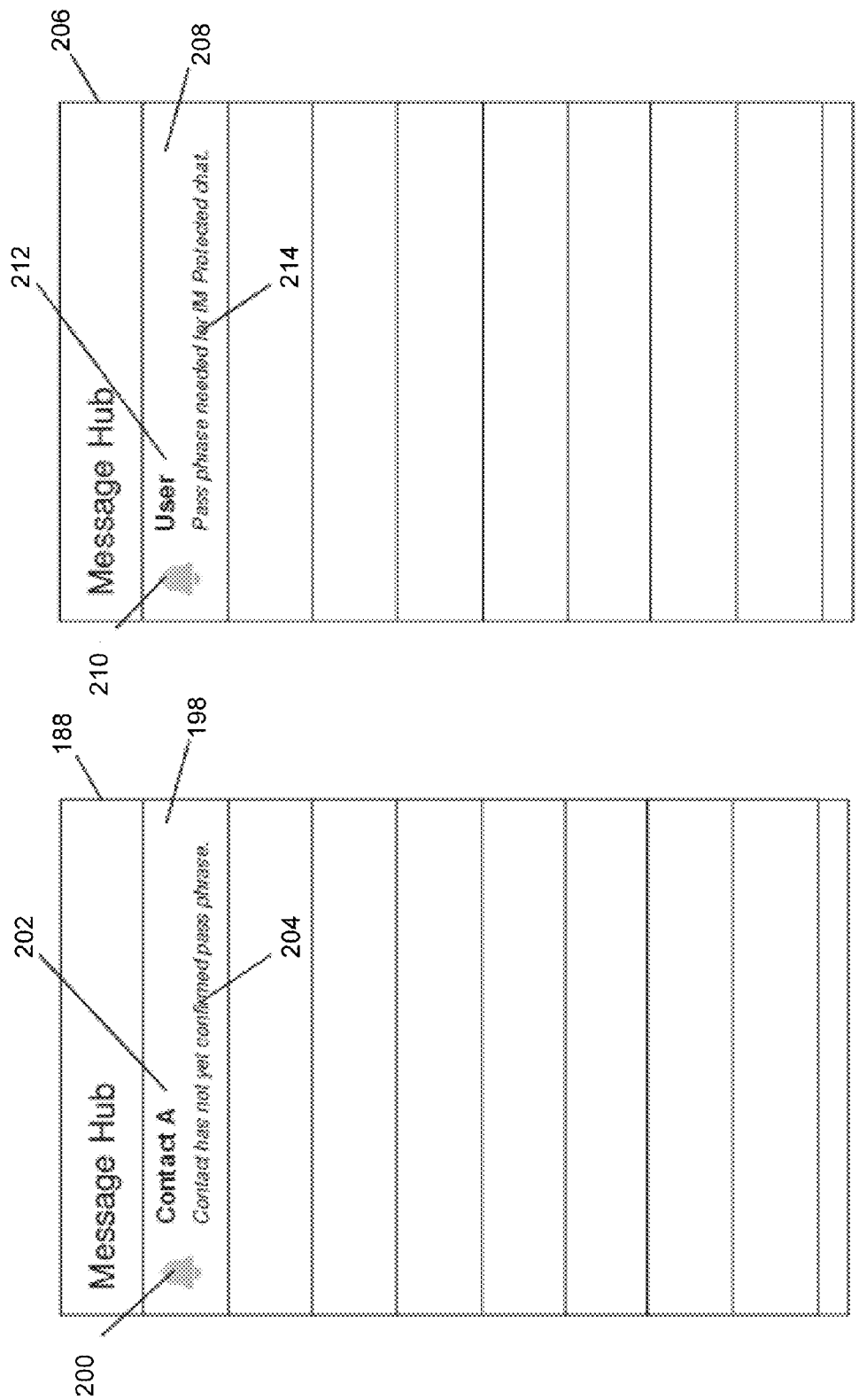

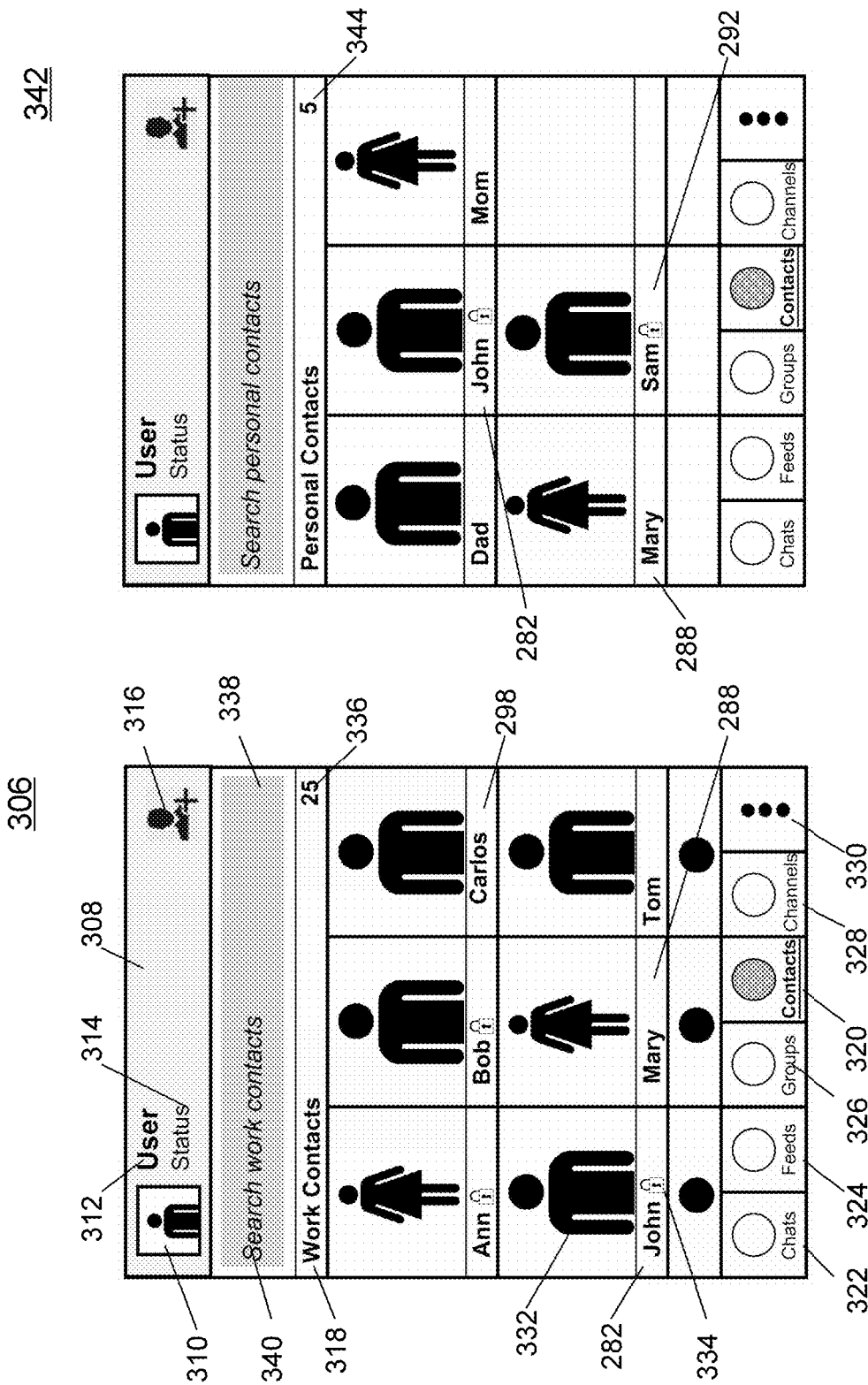

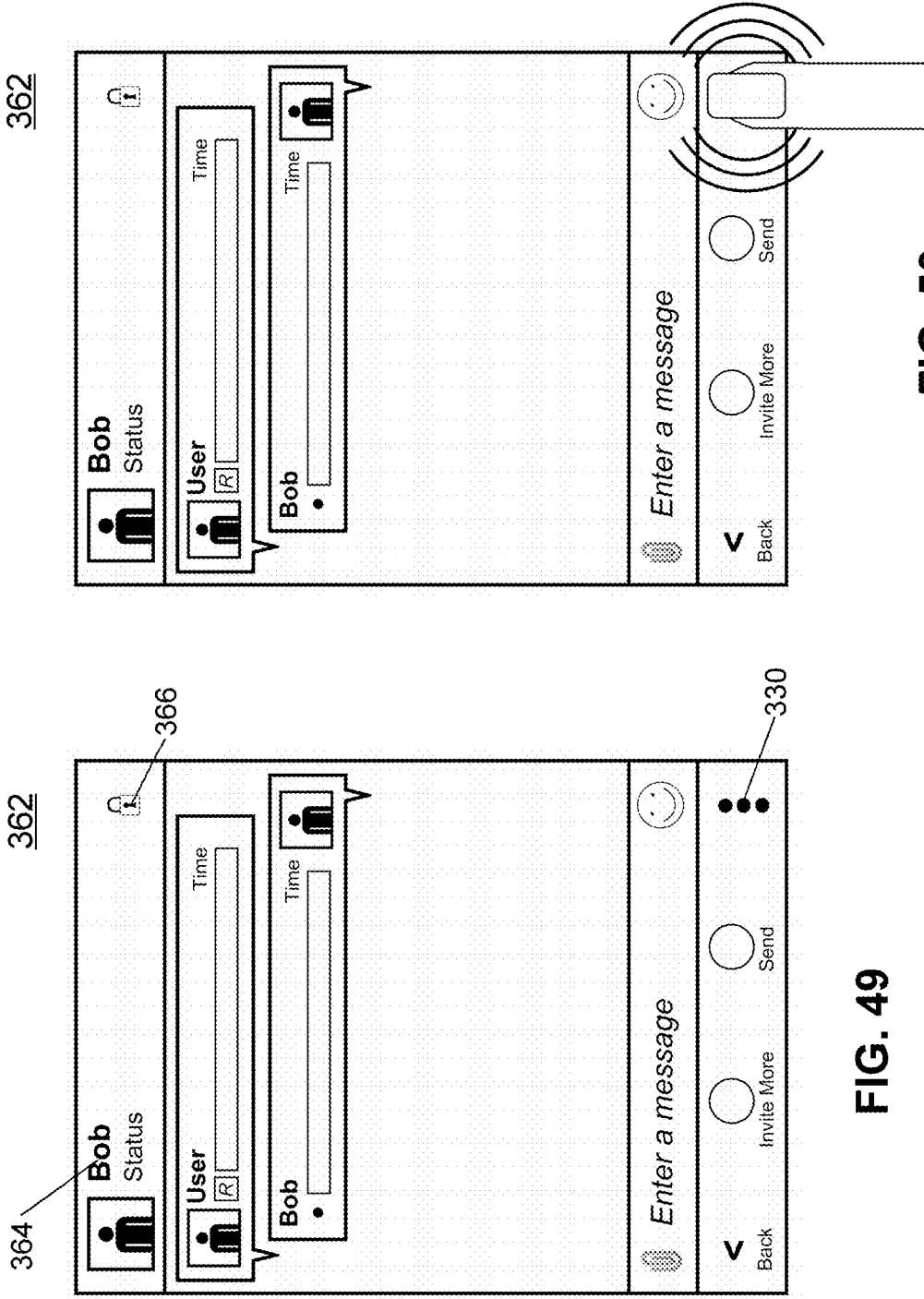

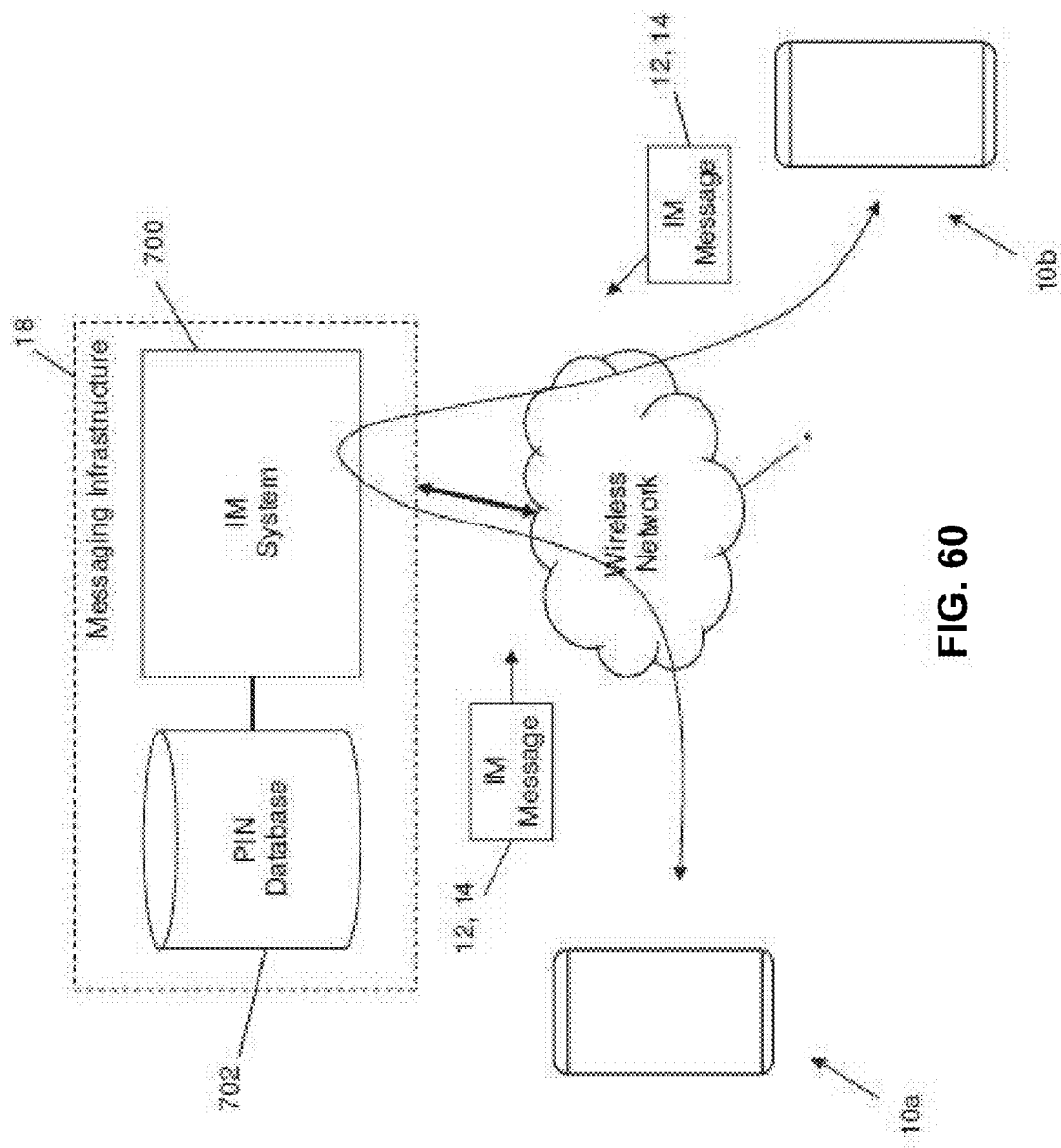

SYSTEM AND METHOD FOR ASSIGNING SECURITY LEVELS FOR INSTANT MESSAGING CONTACTS ACROSS DEVICE PARTITIONS

CROSS-REFERENCE TO RELATED APPLICATIONS

This patent application is a continuation-in-part application of U.S. patent application Ser. No. 14/294,140, filed Jun. 2, 2014, entitled "System and Method of Securing Instant Messaging Sessions," and is further a continuation-in-part application of U.S. patent application Ser. No. 14/294,065, filed Jun. 2, 2014, entitled "System and Method for Initiating Protected Instant Messaging Conversations," the entirety of both of which is incorporated herein by reference.

BACKGROUND OF THE INVENTION

Field of the Invention

The present invention relates to an instant messaging system and more particularly to a system and method of assigning security levels to different instant messaging contacts based on contact type across multiple device partitions.

Description of the Related Art

Data security in electronic communications is essential for many organizations, particularly in regulated industries, government services and industries in which the electronic communications may contain sensitive, proprietary or confidential information. While the number of platforms for electronic communications have increased (e.g., email, text messaging, instant messaging, social networking, etc.), by in large, a great deal of the electronic communications over mobile networks remains unprotected or minimally protected, placing the content of those communications at risk for interception.

Even in systems where security measures are implemented, these measures are generally applied "across-the-board" to all contacts, or are not applied at all. However, across-the-board measures consume processing, storage and transmission resources and require a certain amount of time to authenticate. While communications with certain contacts may require the use of these measures, other contacts may not require such measures. Additionally, for a particular contact whose conversations do not usually require security measures, or require a modest degree of security, certain messages may be deemed more sensitive than others.

BRIEF DESCRIPTION OF THE SEVERAL VIEWS OF THE DRAWINGS

Embodiments will now be described by way of example only with reference to the appended drawings wherein:

FIG. 3 is a schematic diagram illustrating instant messaging (IM) security applied at a first policy level;

FIG. 4 is a schematic diagram illustrating IM security applied at a second policy level which is considered more secure than the first policy level shown in FIG. 3;

FIG. 24 is a screen shot of an example of a graphical user interface for a protected IM conversation pending confirmation of a pass phrase sent to a contact;

FIG. 25 is a screen shot of an example of a graphical user interface for a protected IM conversation pending confirmation of a pass phrase subsequent to a failed delivery attempt;

FIG. 34 is a screen shot of an example of a graphical user interface for a message hub user interface illustrating a pass phrase related message;

FIG. 35 is a screen shot of an example of a graphical user interface for a protected IM conversation user interface;

FIG. 36 is a screen shot of an example of a graphical user interface for a message hub user interface illustrating a pass phrase related notification at the sender;

FIG. 37 is a screen shot of an example of a graphical user interface for a message hub user interface illustrating a pass phrase related notification at the recipient;

FIG. 44 is a screen shot of an example of a graphical user interface for displaying work contacts;

FIG. 45 is a screen shot of an example of a graphical user interface for displaying personal contacts;

FIG. 49 is a screen shot of an example of a graphical user interface for a protected IM conversation;

FIGS. 50 through 54 are a sequence of screen shots illustrating an example procedure for changing a security level of an IM conversation with a protected contact;

FIG. 56 is an example listing of groups and associated users;

FIG. 57 is an example group selection interface displaying a user matrix for assigning users to specific groups;

FIG. 58 is an example security level interface for assigning default security levels to users in an enterprise;

FIG. 60 is a schematic diagram illustrating an example of a peer-to-peer messaging environment;

DETAILED DESCRIPTION OF THE INVENTION

Figure 1:
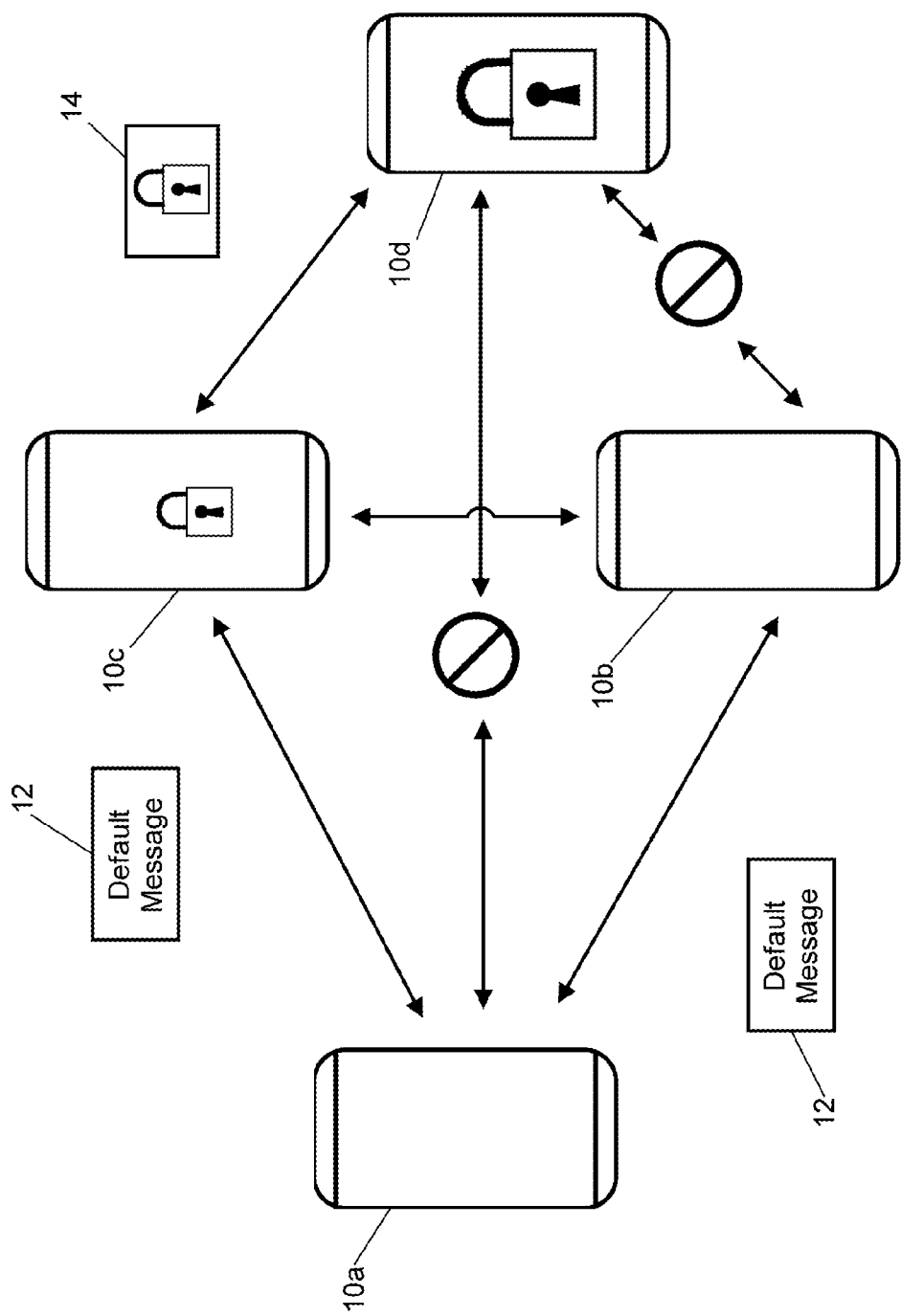
FIG. 1 is a schematic diagram illustrating messaging between mobile devices in accordance with various example policy types.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

While examples provided below may relate to mobile devices, it can be appreciated that the principles discussed herein are equally applicable to any electronic device capable of participating in messaging.

Existing instant messaging encryption methods either require device specific identifiers stored at a central repository or rely exclusively on security associated with establishing a connection between the wireless communication device and a wireless network.

In accordance with one aspect, there is provided a method of operating an electronic device, the method comprising: enabling a shared secret to be sent to a contact to initiate a key exchange to protect messages exchanged in an instant messaging conversation, the shared secret being sent using a communication medium other than instant messaging; and after the shared secret has been sent, displaying a pending protected instant messaging conversation user interface prior to receiving a confirmation associated with receipt of the shared secret by the contact, the pending protected instant messaging conversation user interface comprising an option to resend the shared secret.

In another aspect, there is provided an electronic device comprising a processor, memory, and a display, the memory comprising computer executable instructions for: enabling a shared secret to be sent to a contact to initiate a key exchange to protect messages exchanged in an instant messaging conversation, the shared secret being sent using a communication medium other than instant messaging; and after the shared secret has been sent, displaying a pending protected instant messaging conversation user interface prior to receiving a confirmation associated with receipt of the shared secret by the contact, the pending protected instant messaging conversation user interface comprising an option to resend the shared secret.

In yet another aspect, there is provided a non-transitory computer readable storage medium comprising computer executable instructions for operating an electronic device, the computer executable instructions comprising instructions for: enabling a shared secret to be sent to a contact to initiate a key exchange to protect messages exchanged in an instant messaging conversation, the shared secret being sent using a communication medium other than instant messaging; and after the shared secret has been sent, displaying a pending protected instant messaging conversation user interface prior to receiving a confirmation associated with receipt of the shared secret by the contact, the pending protected instant messaging conversation user interface comprising an option to resend the shared secret.

In accordance with yet another aspect, a flexible, enhanced protection system for instant messaging that allows an organization to have more control over their sensitive and confidential information is provided. In one example, an instant messaging (IM) application can select the type of protection scheme for each contact listed in the IM application. The selection is based on an Information Technology (IT) policy which is generally set and stored on an enterprise server operated by the organization or stored in a web-based (i.e. the "cloud") management console.

In accordance with still another aspect, a method of establishing secure communications between a first wireless communication device and a second wireless communication device for an instant messaging application is provided. Contact information representing a contact associated with a second wireless communication device is received at the first device. The contact information includes capability information. The first device determines from the capability information whether the second device is capable of communicating using an enhanced encryption scheme, and if so, establishes a protected communication session by sending a pass phrase to the second device via an out of band channel and receiving the pass phrase back from the second device via the instant messaging application. Communication between the devices is performed using an enhanced encryption scheme.

In accordance with another aspect, a method, communication device and computer program product communicate between the communication device and a second communication device using an instant messaging application. Contact information identifying the second communication device is received at the first communication device and a contact type for the second communication device from the contact information. Responsive to determining that the contact type is a first contact type, the contact information is stored in a first partition of a memory of the first communication device. Responsive to determining that the contact type is a second contact type, the contact information is stored in a second partition of the memory of the first communication device.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

FIG. 1 illustrates a messaging environment in which various mobile devices 10 communicate with each other according to multiple different security policies, modes, states, or levels (hereinafter referred to commonly as "policies"). First and second mobile devices 10a, 10b are operating in this example according to a default, base, or lowest level policy (hereafter referred to as a "default" policy) having a lowest or baseline level of security among a plurality of policy levels. For example, the default policy can have encryption based on an encryption/decryption key stored on the mobile device 10 at the time of manufacture, which is common to all mobile devices 10 of a particular type. It can be appreciated that the default policy can include a lowest level of security or no security at all.

As shown in FIG. 1, the first and second mobile devices 10a, 10b can communicate default IM messages 12 between each other, but have limited if any capability of communicating with mobile devices 10 having a higher level policy. In the example shown in FIG. 1, two additional policy levels are shown, each applying additional cryptographic protection as will be explained in greater detail below, but having different policy rules for the manner in which IM messages can be communicated. For example, a third mobile device 10c is operating according to an intermediate policy which allows the third mobile device 10c to communicate with other mobile devices 10 that are operating according to a policy level that is higher than the default policy using protected IM messages 14, e.g., a further mobile device 10d. The third mobile device 10c can communicate with the first mobile device 10a (or second mobile device 10b) using default messages 12, namely messages that utilize the default cryptographic protocols, in which case the additional or strengthened security is not utilized. The fourth mobile device 10d in this example is subjected to a highest policy level and can only communicate with other mobile devices 10 that are capable of exchanging protected IM messages 14, for example only the third mobile device 10c in FIG. 1. It can be appreciated that a policy can include multiple different levels with that policy. For example, one policy level can be used for assigning a level of encryption, and another policy level can be used for indicating whether or not the user can message a contact having a lower level of encryption.

The intermediate policy can be applied by organizations or individuals that wish to be able to exchange protected IM messages 14 in appropriate circumstances, e.g., when communicating sensitive content with work colleagues. The highest restriction level can be applied by organizations who wish to completely limit communications for that particular device under all circumstances, e.g., for government employees or those in a highly regulated industry.

It can be appreciated that the number of policy levels shown in FIG. 1 is for illustrative purposes only. For example, two policy levels may be used in which a default policy level and one additional higher security level are available. Similarly, more than three policy levels may be used, e.g., to provide a gradient of cryptographic security according to the applied policy level.

Figure 2:
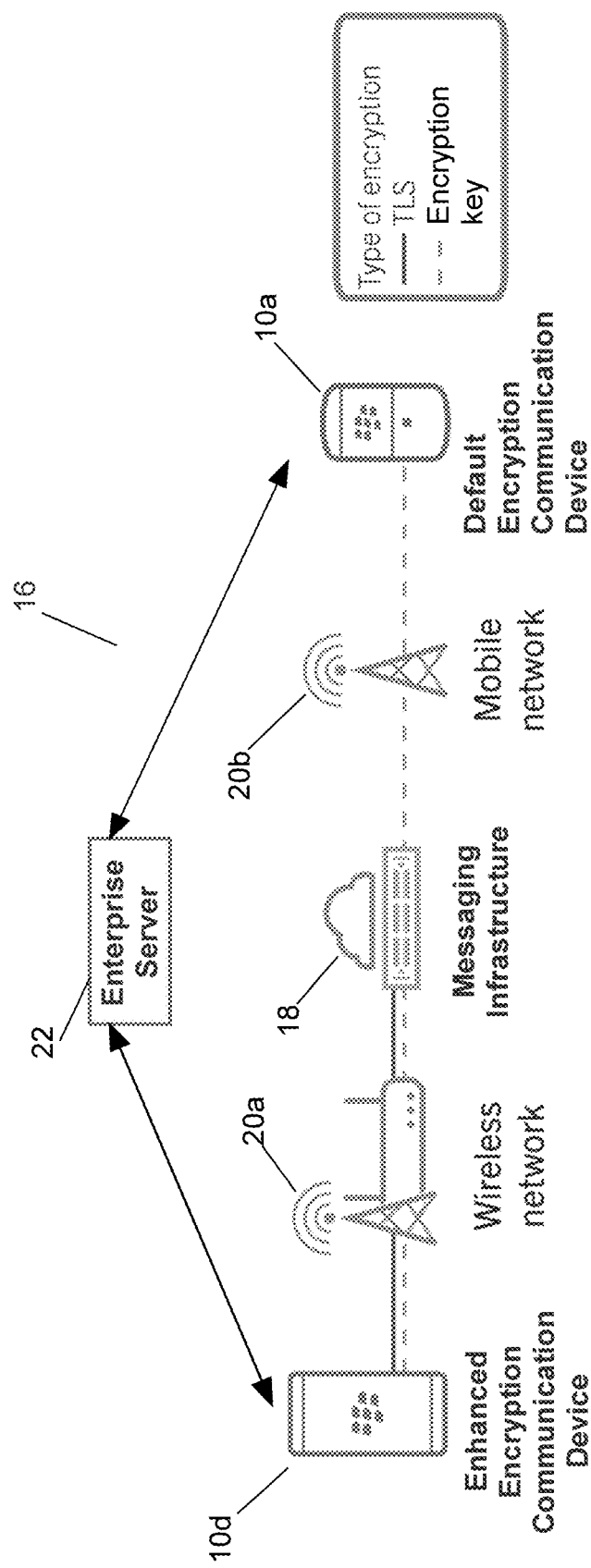
FIG. 2 is a schematic diagram of a wireless communication system in accordance with various example instant message (IM) protection schemes.

Referring now to FIG. 2, a wireless communication system 16 includes a multiplicity of wireless communication devices 10d (one shown for the sake of clarity) capable of communicating in a protected mode using enhanced encryption methods. The wireless communication system 16 also includes a multiplicity of wireless communication devices 10a (one shown for the sake of clarity) which are operating in this example according to a default, base, or lowest level policy (hereafter referred to as a "default" policy) having a lowest or baseline level of security among a plurality of policy levels. For example, the default policy can have encryption based on an encryption/decryption key stored on the mobile device 10d at the time of manufacture, which is common to all mobile devices 10 of a particular type. It can be appreciated that the default policy can include a lowest level of security or no security at all. The wireless communication devices 10 are coupled to a messaging infrastructure 18 through a variety of wireless networks 20a and mobile (cellular) networks 20b. Additionally, an enterprise server 22 is coupled to each wireless communication device 10d that is capable of operating in a protected mode using an enhanced encryption scheme. The enterprise server 22 maintains an IT policy 24 which determines and stores the capability of each wireless communication device 10d monitored by the enterprise server 22, generally through the use of a protection parameter (e.g., Protection mode="ON"). Additionally, the IT policy 34 may be stored in a web-based (i.e. the "cloud") management console. It should be noted that the IT policy 24 may selectively disable the use of the protected mode in a specific wireless communication device by setting the protection mode parameter to "OFF" even if the wireless communication device 10d has the ability to use enhanced encryption. For wireless communication devices 10a not monitored by an enterprise server, the protection mode parameter is automatically set to "OFF" and a default protection scheme will be used.

Figure 59:
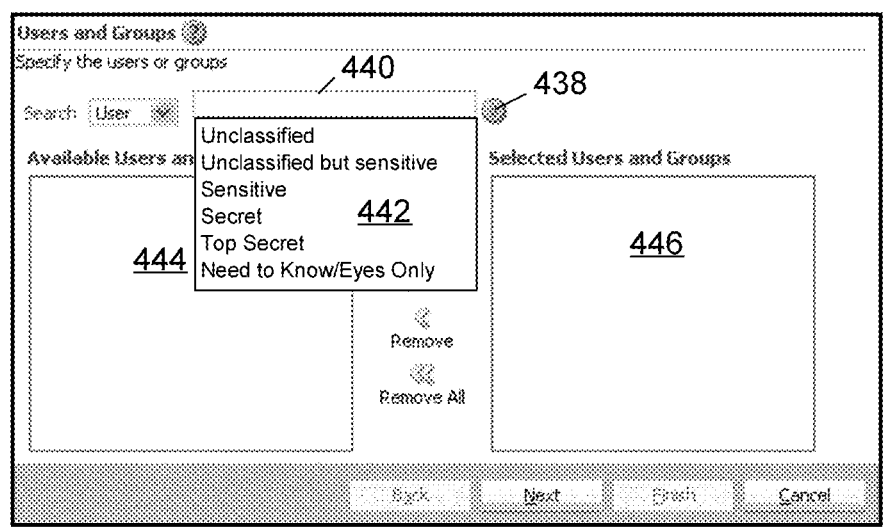
FIG. 59 is an example graphical user interface for granting capabilities to a user.
Figure 61:
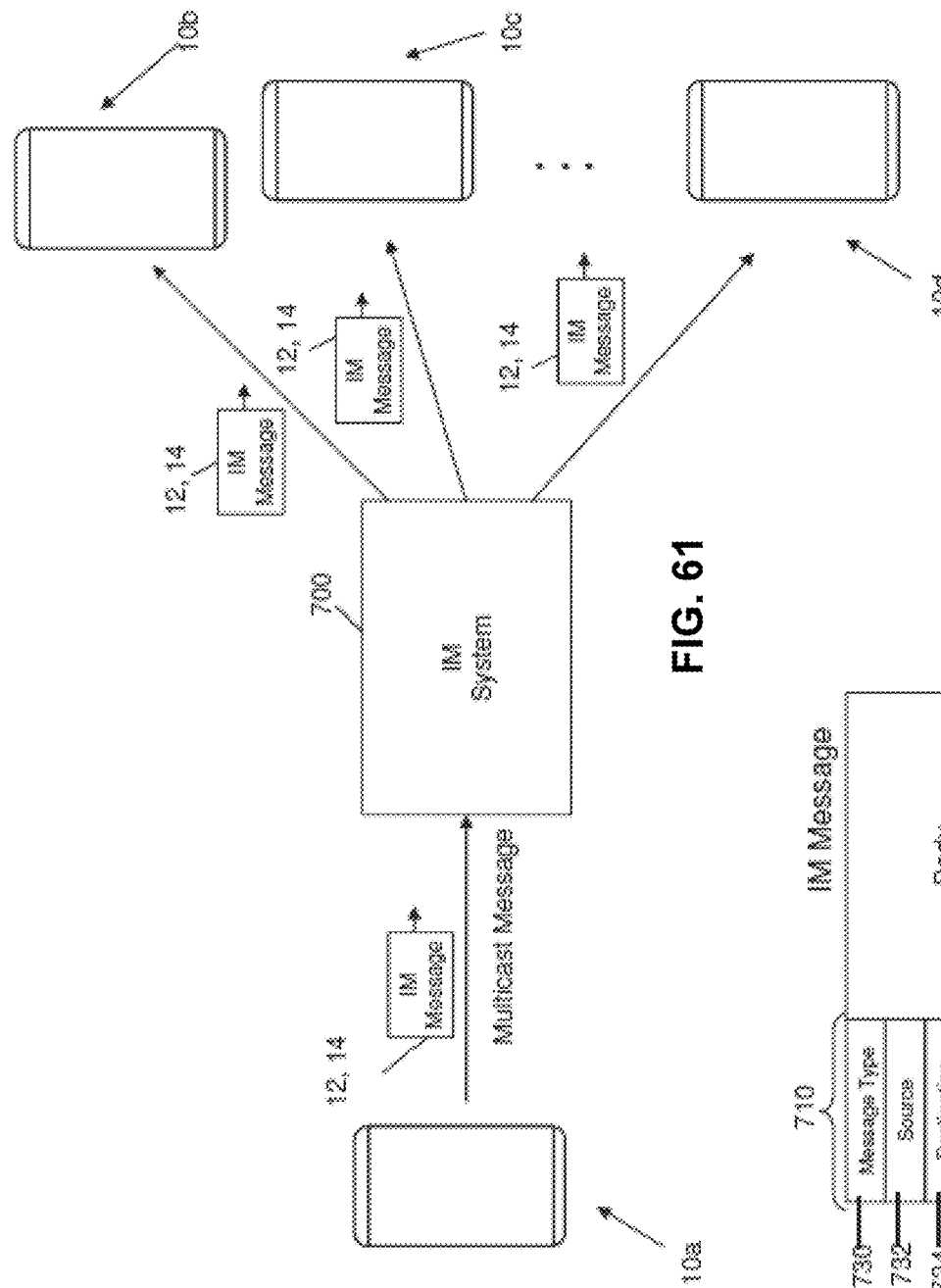
FIG. 61 is a schematic diagram illustrating multi-cast messaging.

An example of a default level of cryptography used to generate default IM messages 12 is illustrated in FIG. 3. In the messaging scenario depicted in FIG. 3, a first mobile device 10a exchanges messages with a second mobile device 10b via a messaging infrastructure 18 (e.g., PIN-based messaging as illustrated in FIGS. 59-61 below). The first mobile device 10a communicates over at least one first network 20a (e.g., WiFi, cellular, Internet, etc.) in order to have the messaging infrastructure 18 facilitate delivery of messages to the second mobile device 10b over at least one second network 20b. A policy authority 24 (e.g., running on an enterprise server or a web-based console) is in communication with the first and second mobile devices 10a, 10b to facilitate the provision of keys and/or keying material, digital certificates, etc. Two security mechanisms are used in the default scenario shown in FIG. 3, namely encryption 26 and transport security 28. For example, the transport security 28 can be applied using transport layer security (TLS) or similar protocols such as secure sockets layer (SSL), a TLS predecessor. The messaging infrastructure 18 may also use a user identifier (ID) to perform authentication, e.g., using a single sign-on identity service. The user identifier can also be tied to a device ID, e.g., a PIN. The encryption 26 can be applied using any suitable cryptographic protocol. For illustrative purposes, each mobile device 10 can store a symmetric messaging encryption key, which is used to encrypt and decrypt messages exchanged with other mobile device 10, e.g., a symmetric-key block cipher such as a Triple Data Encryption Standard (DES) key having a desired key size. The symmetric messaging encryption key can also be used to authenticate received default messages 12. As noted above, the symmetric messaging encryption key can be a global encryption key added to each mobile device 10 at the time of manufacture to ensure each device is capable of exchanging default messages 12 and thus utilize at least a default level of security.

When implementing multiple levels of security, the policy authority 24 can be used to issue, revoke, renew, and otherwise manage security policies for the mobile devices 10. The policy authority 24 can be a third party service such as an application server, website or storefront, or can be implemented at an enterprise level where IT policies are controlled within an enterprise.

The relatively more secure cryptography applied to protected IM messages 14 is illustrated in FIG. 4. As can be seen in FIG. 4, in addition to encrypting messages using the default encryption 26 and applying transport security 28, an additional cryptographic mechanism 30 is utilized to further protect confidentiality and data integrity. The additional cryptographic mechanism 30 can be selected according to any desired or imposed security regulations, guidelines, standards, etc. In the present example, elliptic curve cryptography (ECC) is utilized, for example an Elliptic Curve Password-Authentication Key Exchange (EC-SPEKE) to securely exchange a symmetric key by protecting the exchange using a password, a key derivation function (KDF) to securely derive message keys from shared secrets, messaging signing using the Elliptic Curve Digital Signature Algorithm (ECDSA), and a one-pass Elliptic Curve Diffie-Hellman (ECDH) protocol to derive new shared secrets between two correspondents using a private key of one correspondent and a public key of the other. It can be appreciated that such an additional cryptographic mechanism 30 is illustrative and various other cryptographic mechanisms 30 can be used to utilize protected IM messages 14.

One example for utilizing protected IM messages 14 will now be described by way of example, in which the mobile device 10 may utilize a default policy or a "protected" policy. Each mobile device 10 that is subjected to the protected policy utilizes two long-term public/private key pairs that are static for the device and associated user, namely an encryption key pair and a signing key pair. To communicate protected IM messages 14, the mobile device 10 creates a pair-wise key with each contact that is also using the protected policy. For one-to-one communications, the pair-wise key can be considered a session key. The session key is used to encrypt all messages within an IM conversation. The pair-wise key is derived from the initiator's private encryption key and the recipient's public encryption key, e.g., using one-pass ECDH. Each session key is combined with unencrypted (but signed) keying material in the protected IM message 14 to produce a message encryption key. The message encryption key is derived from the keying material and session key, using a KDF.

Figure 5:
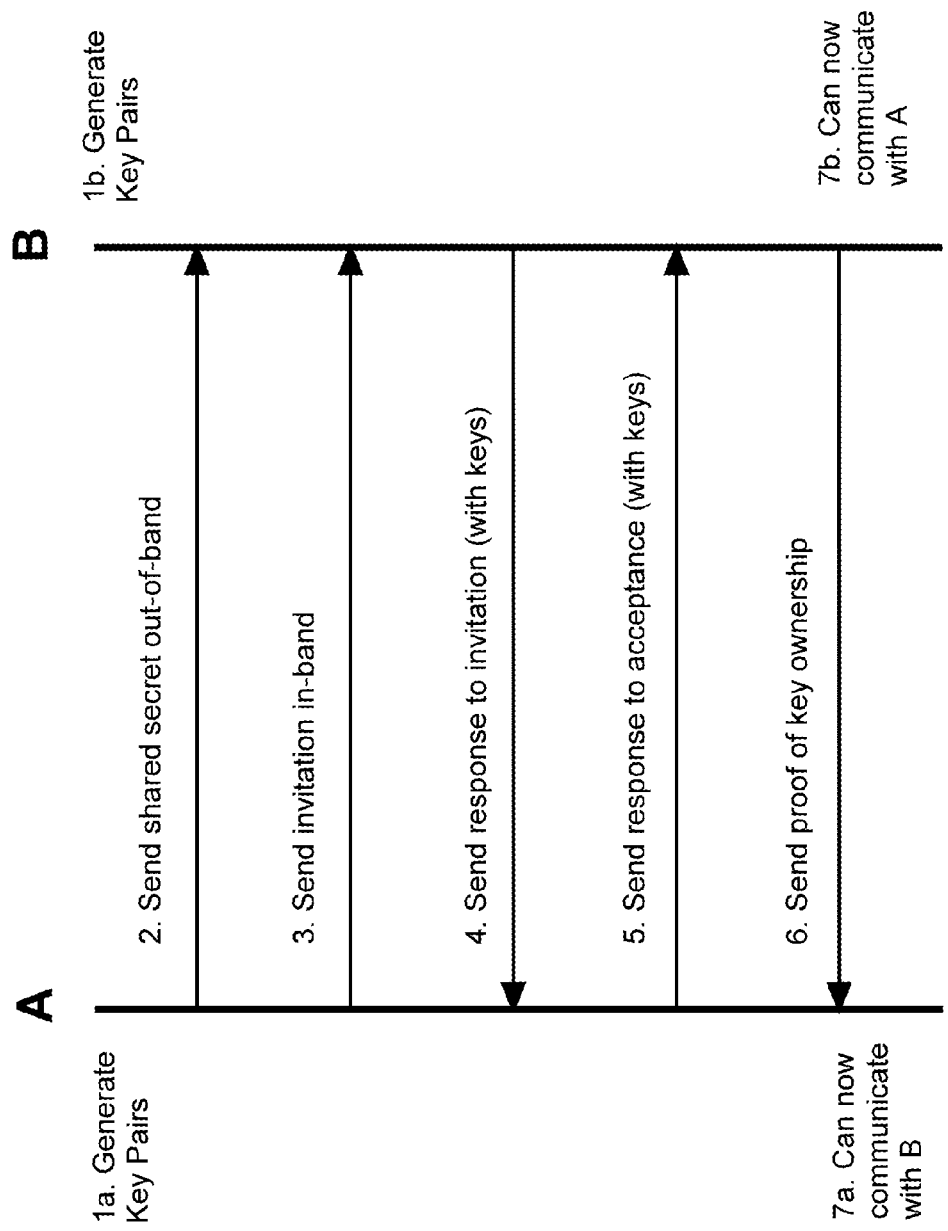
FIG. 5 is a flow chart illustrating a key exchange protocol between two mobile devices.

FIG. 5 illustrates an example of an ECDH key exchange process. The key exchange process is used to establish contact-specific keys for each IM contact with which a particular mobile device 10 wishes to communicate in accordance with the protected policy. In order to exchange keys, the parties exchange a shared secret (referred to hereinafter as a "pass phrase", which illustrates one example of such a shared secret) using an out-of-band communication channel, i.e., using a communication medium other than the messaging infrastructure 18 used to conduct IMing. For example, the out-of-band mechanism can include email, SMS, telephone, manual delivery (in person), short-range communications (e.g., NFC, WiFi, Bluetooth, infrared, etc.), etc. The shared secret can be generated in various ways, for example, using an auto-generated pass phrase. As discussed below, the pass phrase can be editable and/or can be user-supplied. It can also be appreciated that the pass phrase can be utilized in its original format, or can be converted to another format such as binary, hexadecimal, etc. The out-of-band exchange makes malicious third party attacks more difficult since such a third party should not know when or how the secret will be shared. The attacker would need to intercept connectivity over both the messaging infrastructure 18 and the out-of-band channel used for the shared secret exchange in order to compromise the key exchange. The use of an out-of-band channel can also enable the messaging infrastructure 18 to be removed from the key management process, thus allowing further flexibility for enterprise and individual entities.

The key exchange process shown in FIG. 5 begins with correspondent A generating the encryption and signing key pairs at 1*a* and correspondent B generating encryption and signing key pairs at 1*b*. In this example, correspondent A is the initiator and sends a shared secret (e.g., pass phrase) at step 2 using an out-of-band communication channel. After sending the shared secret, correspondent A sends a first IM message 12 at step 3 using the messaging infrastructure 18, which can be considered an invitation to begin a "protected" chat or conversation. The invitation can include contact information and an indication of the highest protocol version the associated mobile device 10 supports. Correspondent B in this example responds to the invitation at step 4 with an acceptance, including an indication of the highest protocol version they support, proof that correspondent B knows the secret password (i.e., an indication that the user or device has entered or accepted entry of the supplied shared secret), and correspondent B's long-term public encryption and public signing keys. Correspondent A then responds to the acceptance at step 5 with proof that correspondent A knows the secret password (i.e. to prove that another party did not supply the shared secret), correspondent B's long-term public encryption and public signing keys, and proof that correspondent A has the private keys corresponding to the public keys they claim to own, e.g., by performing a verifiable cryptographic operation using the private keys. Similarly, at step 6, correspondent B sends proof to correspondent A of ownership of the public keys they have provided. Once correspondent A verifies the proof sent in step 6, both parties know each other's public keys and that they belong to an entity that also knows the corresponding private keys, and an entity that knows the correct shared secret. At steps 7*a* and 7*b*, the correspondents A, B can begin exchanging protected IM messages 14.

Figure 6:
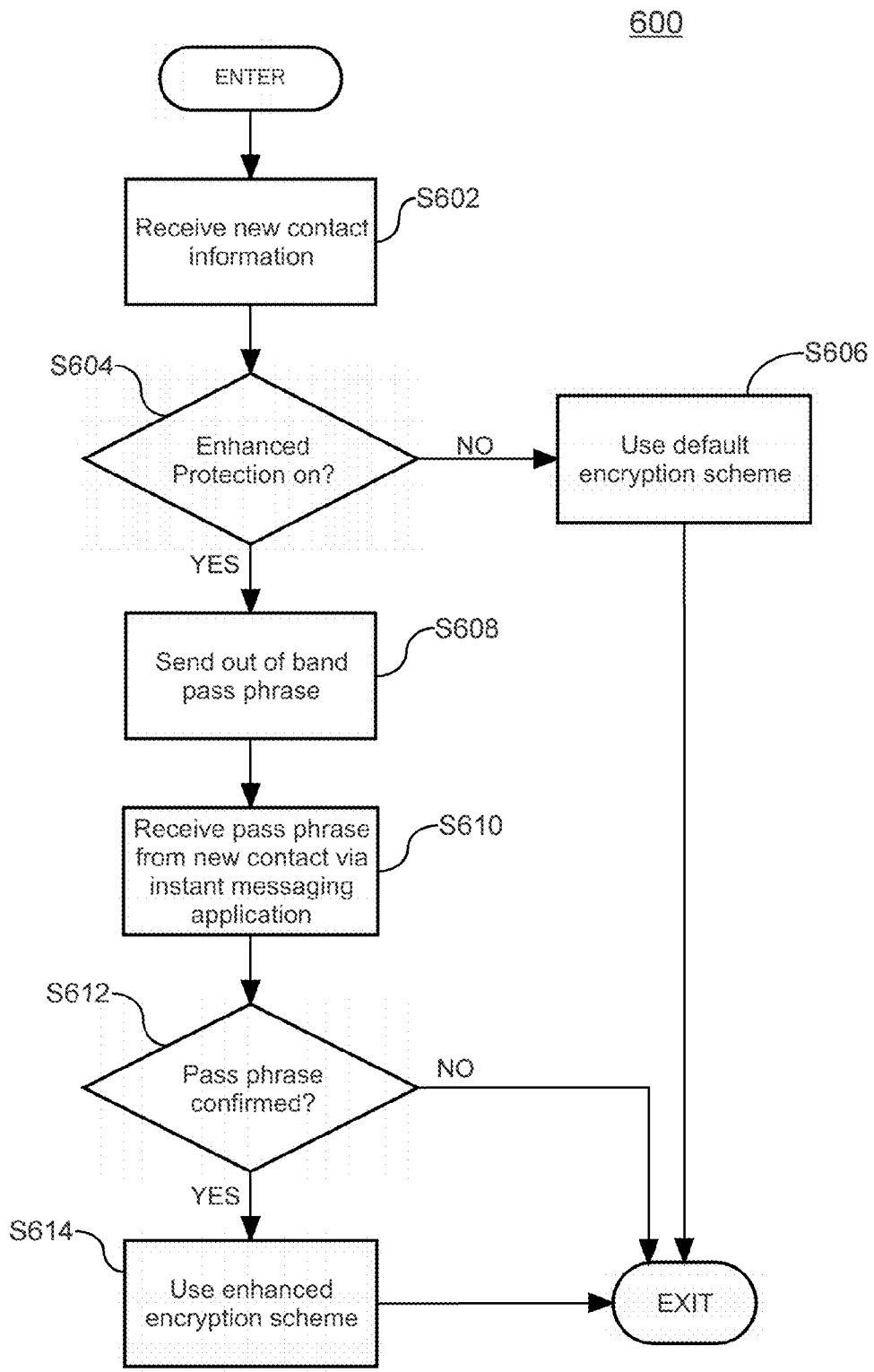
FIG. 6 is a flow chart illustrating computer executable operations that may be performed in an IM protection selection between two wireless communication devices.

Referring now to FIG. 6, a flow chart 600 is shown which illustrates computer executable operations that may be performed in an IM protection selection method between two wireless communication devices. One example for utilizing protected IM messages will now be described by way of example, in which the mobile device 10 may utilize either a default policy or a "protected" policy. The "protected" policy adds additional encryption measures. Each mobile device 10 that is subjected to the protected policy utilizes two long-term public/private key pairs that are static for the device and associated user, namely an encryption key pair and a signing key pair. To communicate protected IM messages, the mobile device creates a pair-wise key with each contact that is also using the protected policy. For one-to-one communications, the pair-wise key can be considered a session key. The session key is used to encrypt all messages within an IM conversation. The pair-wise key is derived from the initiator's private encryption key and the recipient's public encryption key. It should be noted that each public/private key pair may be generated by or stored on the communication device or received from a third party, such as a key store. Each session key is combined with unencrypted (but signed) keying material in the protected IM message to produce a message encryption key. The message encryption key is derived from the keying material and session key, using a key derivation function (KDF).

The key exchange process is used to establish contact-specific keys for each IM contact with which a particular mobile device 10 wishes to communicate in accordance with the protected policy. The process begins, at step S602, when the wireless communication device initiating the IM conversation receives contact information for a new contact. The contact information may include a name, phone number, address, or other device identifier (such as a personal identification number (PIN)) for the invited contact. The contact information may be received wirelessly via any messaging platform, or manually input by the device user using a user interface. The IM application sends capability messages between the wireless communication devices. One of these capabilities is whether or not IM Protected is on. In order to use the enhanced protection scheme, both the inviting device and the invited device must have the enhanced protection on (at step S604). If one of the devices does not have enhanced protection on (at step S604), a default encryption scheme is used (at step S606) to transfer IM messages between those two devices.

In order to exchange keys, the parties exchange a shared secret (referred to hereinafter as a "pass phrase," which illustrates one example of such a shared secret) using an out-of-band communication channel, i.e., using a communication medium other than the messaging infrastructure 18 used to conduct IM communications. For example, the out-of-band mechanism can include email, Short Message Service (SMS), telephone, manual delivery (in person), short-range communications (e.g., Near Field Communications (NFC), WiFi, Bluetooth, infrared, etc.), etc. The inviting device sends (at step S608) the out-of-band pass phrase to the invited device. Alternatively, the out-of-band pass phrase may be sent using any of the above mentioned means with or without the involvement of the inviting device.

The shared secret can be generated in various ways, for example, using an auto-generated pass phrase. As discussed below, the pass phrase can be editable and/or can be user-supplied. The out-of-band exchange makes malicious third party attacks more difficult since such a third party should not know when or how the secret will be shared. The attacker would need to intercept both communications over the messaging infrastructure 18 and the out-of-band channel used for the shared secret exchange in order to compromise the key exchange. The use of an out-of-band channel can also enable the messaging infrastructure 18 to be removed from the key management process, thus allowing further flexibility for enterprise and individual entities.

The inviting device receives (at step S610) a pass phrase from the invited device via the IM application. If the pass phrase matches (at step S612) the pass phrase established for the invited device, any future IM communication between the two devices will use (at step S614) the enhanced protection scheme. Public/private encryption and signing key pairs are exchanged between devices. These keys are stored on the devices.

Figure 7:
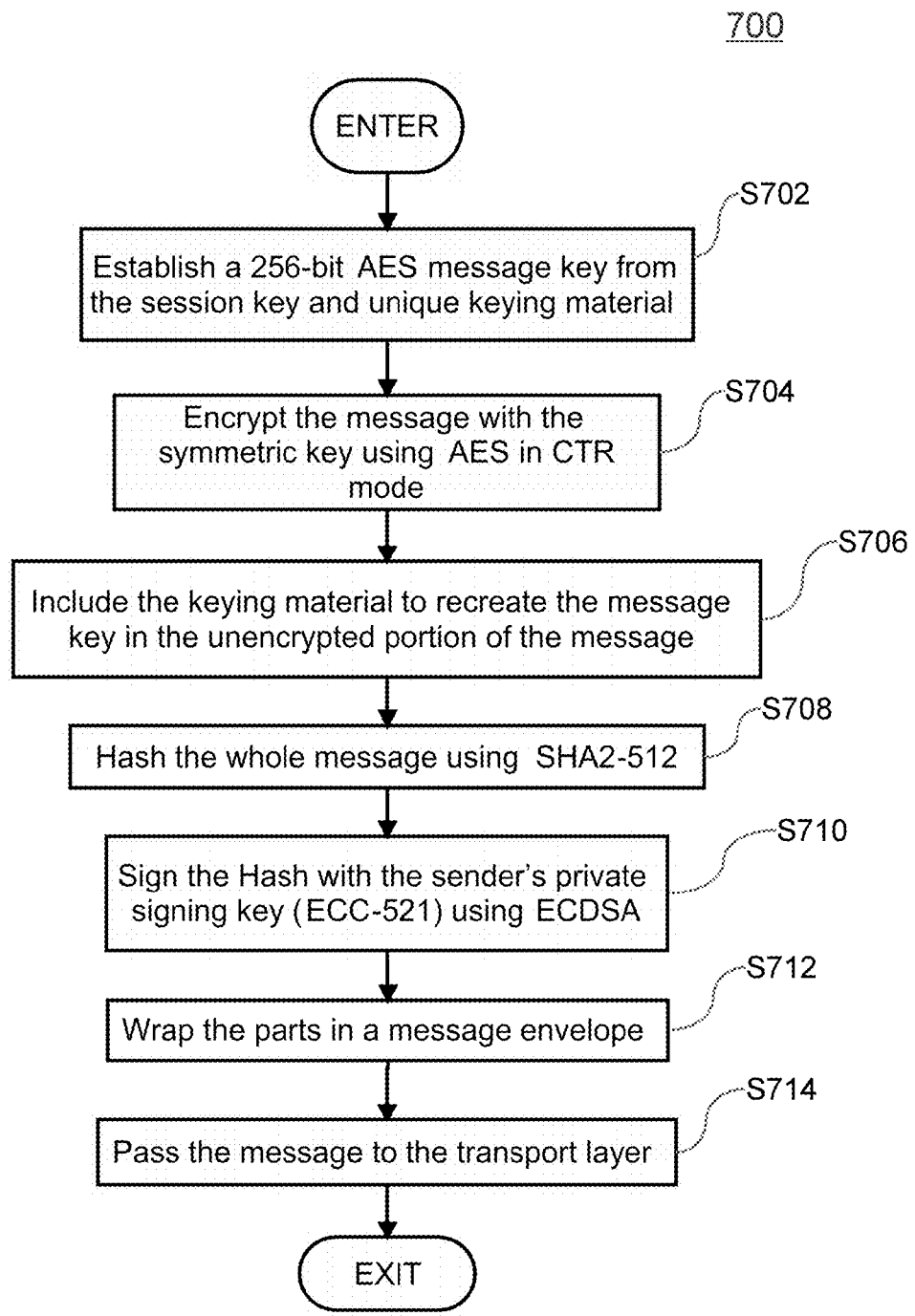
FIGS. 7 and 8 are flow charts illustrating computer executable operations that may be performed in encrypting an IM under an enhanced encryption scheme such as the second policy level illustrated in FIG. 4.
Figure 8:
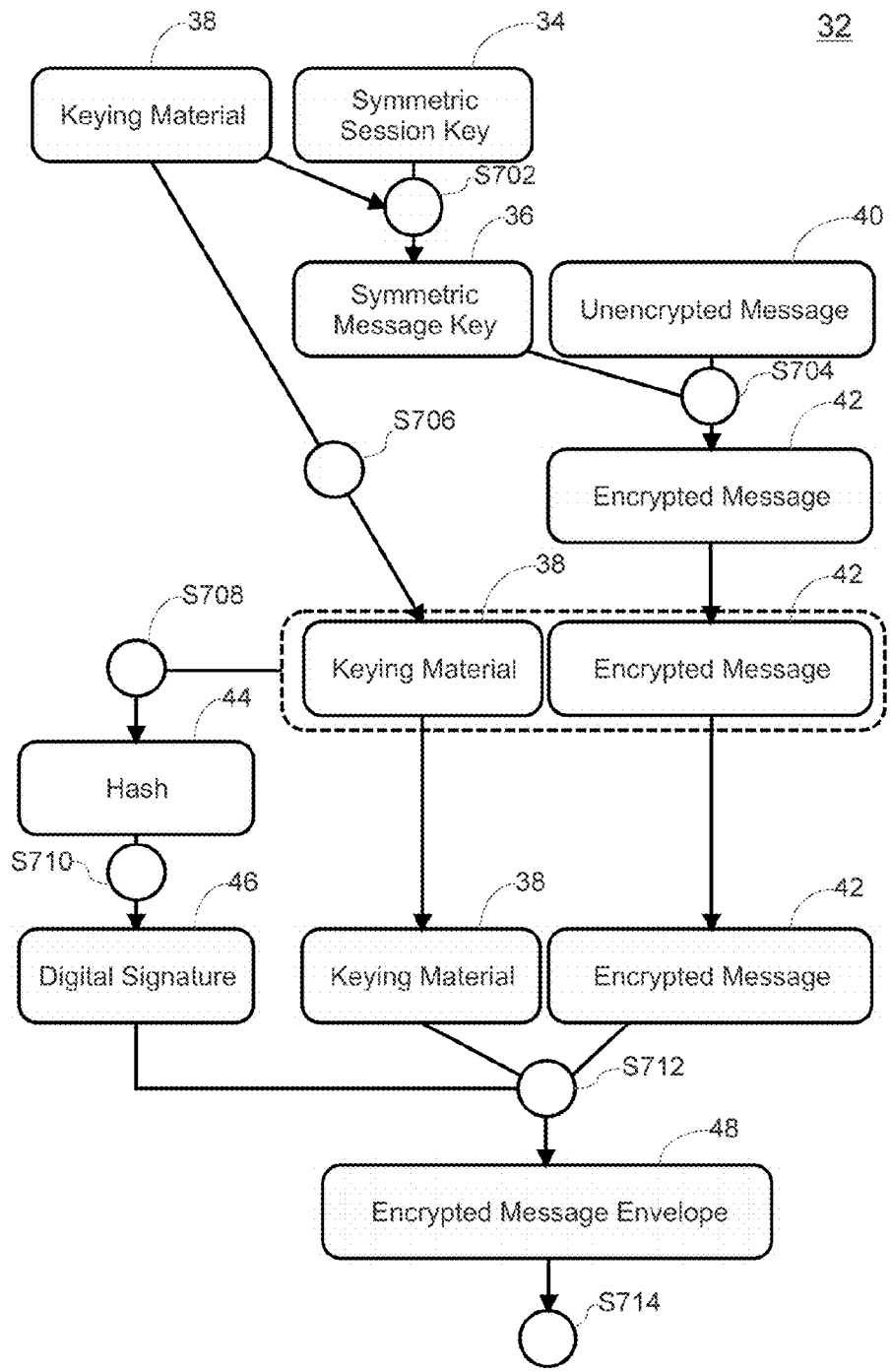

Referring now to FIGS. 7 and 8, a flow chart 700 and state diagram 32 illustrate a process for encrypting an outgoing instant message using an enhanced protection scheme. The public encryption key of the receiving device and the private encryption key of the sending device are used to establish a session key 34. A unique per message key 36 is established (at step S702) by applying a key derivation function (KFD) to the session key 34 and the random keying material 38. The message key may 36 be a 256-bit Advanced Encryption Standard (AES) key, but there are no restrictions on the length of the message key 36 or encrypting algorithm used. The message key 36 is used to encrypt (at step S704) the unencrypted message 40. The random keying material 38 is included (at step S706) with the encrypted message 42 in an unencrypted form and then hashed (at step S708) together (e.g., using a secure hash algorithm such as SHA-512) to form a hash 44. The hash 44 is signed (at step S710) with the private signing key of the sending device. The signed hash 46, random keying material 38 and the encrypted message 42 are then wrapped (at step S712) in a message envelope and the encrypted message envelope 48 is passed (at step S714) to the transport layer for delivery to the receiving device.

Figure 9:
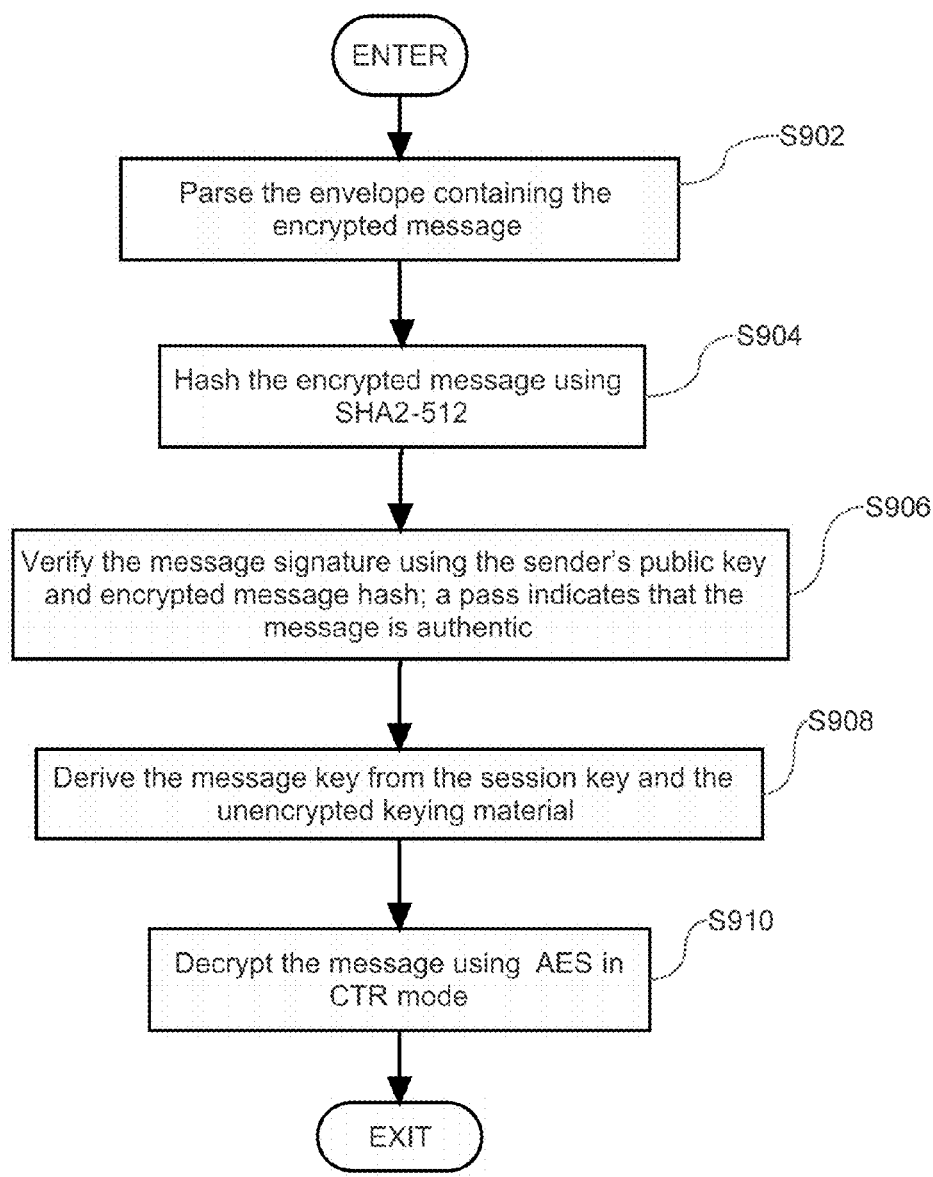
FIGS. 9 and 10 are flow charts illustrating computer executable operations that may be performed in decrypting an IM under an enhanced encryption scheme such as the second policy level illustrated in FIG. 4.
Figure 10:
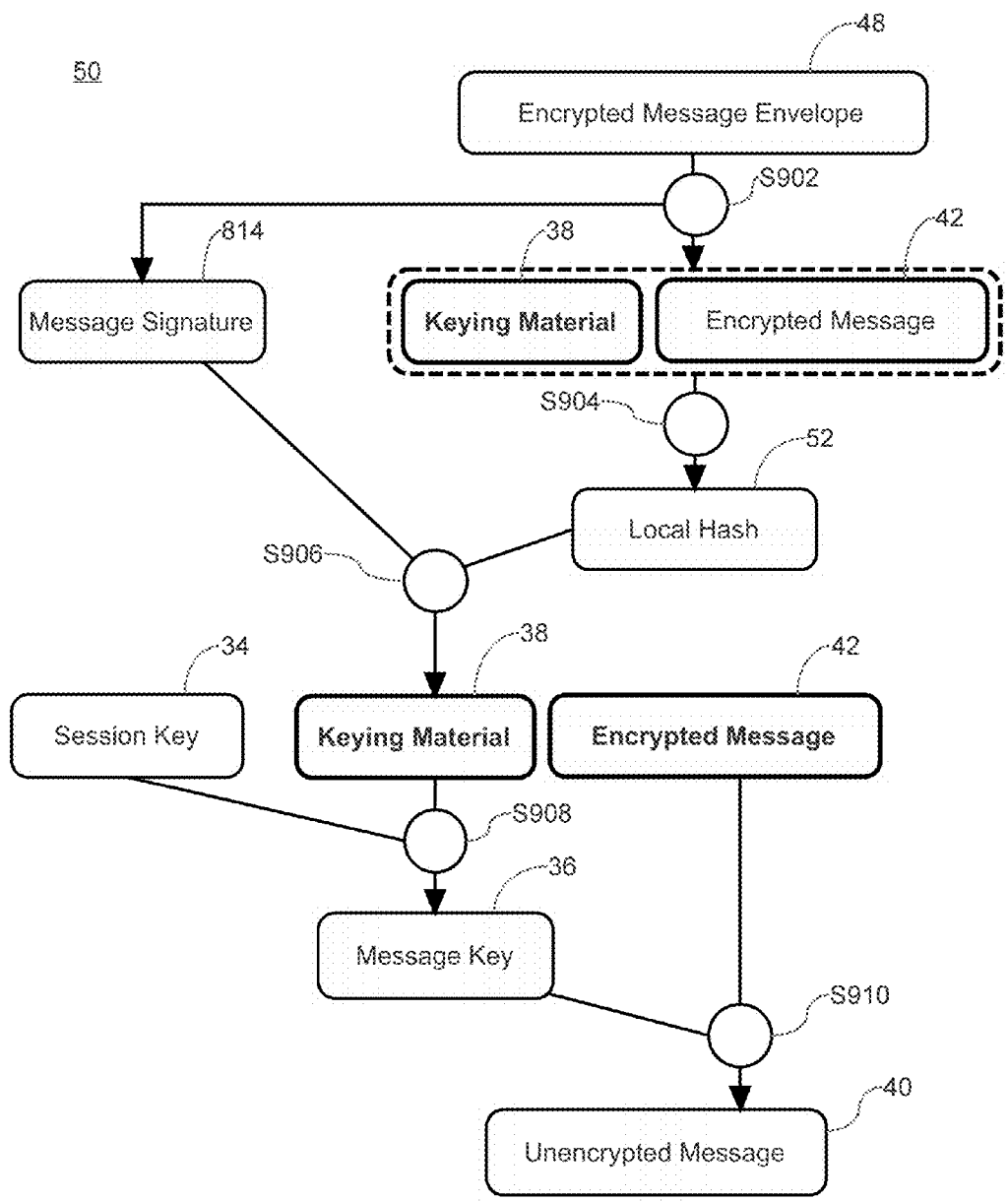

Referring now to FIGS. 9 and 10, a flow chart 900 and state diagram 50 illustrate a process for decrypting an incoming instant message 48 using an enhanced protection scheme. Since the receiving device has the sending device keys, the receiving device parses (at step S902) the incoming encrypted message envelope 48 to obtain the encrypted message 42, the random keying material 38 and the signed digital hash 46. The keying material 38 and the encrypted message 42 are hashed (at step S904) to obtain a local hash 52 using, for example, SHA2-512. The receiving device verifies (at step S906) the message signature by decrypting the signed hash 46 with the sender's public signing key to get the sent hash 44. If the hashes match then the receiving device 10 has verified that the received hash was sent using the sender's private signing key. The receiver uses the random keying material 38 in combination with the sender's public encryption key and the receiver's private encryption key (a.k.a. session key 34) to regenerate (at step S98) the message key 36. The message key 36 is used to decrypt (at step S910) the encrypted message 42. The message 42 may be decrypted using, for example, AES in Counter (CTR), but any decryption protocol will suffice.

Figure 11:
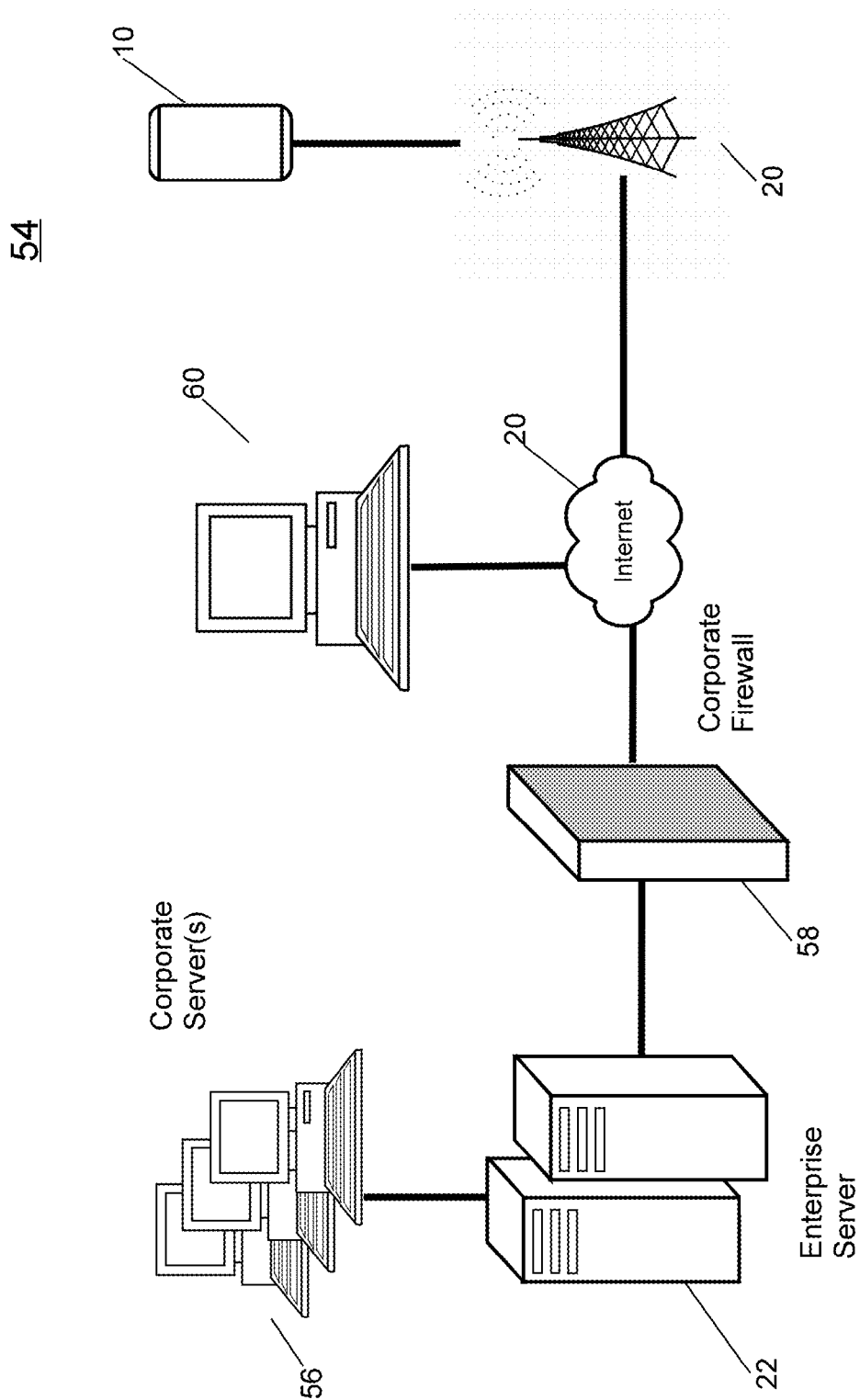
FIG. 11 is a schematic diagram illustrating an enterprise environment.

As discussed above, the protected policy can be utilized in an enterprise environment 54, an example of which is shown in FIG. 11. The enterprise environment 54 includes an enterprise server 22 and one or more corporate servers (e.g., mail server) 56 behind a corporate firewall 58 which enables individuals within the enterprise to communicate using the Internet and wireless networks 20, using mobile devices 10 and other computing devices 60. The enterprise server 22 or web-based console (not shown) can be used to deploy the protected policy, e.g., by pushing the policy out to enterprise devices. In this way, the enterprise server 22 can be used to enforce a higher level of security to be used by devices within the enterprise.

Figure 12:
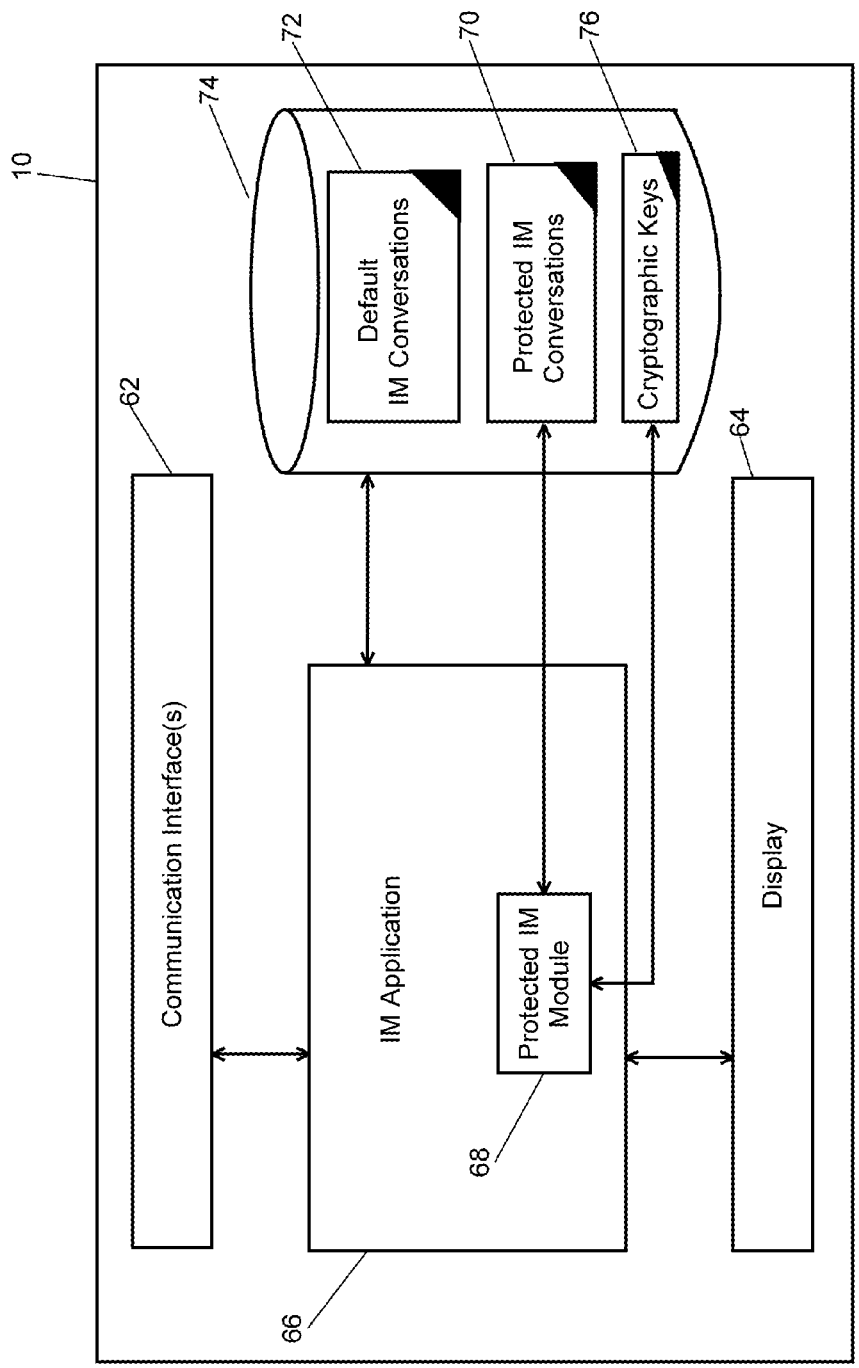
FIG. 12 is a block diagram illustrating an example of a configuration for a mobile device having an IM application.

Turning now to FIG. 12, an example of a configuration for a mobile device 10 is shown. The mobile device 10 includes one or more communication interfaces 62 to enable the mobile device 10 to communicate with other devices, services, and domains, e.g. to communicate via one or more networks 20 as shown in FIGS. 2 through 4. The one or more communication interfaces 62 in this example generally represents any one or more short-range, wide-area, wired, or wireless communication connections utilizing a connection/connector/port, wireless radio, etc. The mobile device 10 also includes a display component 64, which may be used by various applications and services on the mobile device 10 including an IM application 66 in the example shown in FIG. 12. The IM application 66 is also configured to utilize the one or more communication interfaces 62 to enable "IMing" on the mobile device 10.

The IM application 66 includes or otherwise has access to a protected IM module 68 for enabling participating in a protected IM conversations 70 with other protected devices, as well as to participate in default IM conversations 72 with devices not subject to a protected policy. An IM storage 74 may therefore be included or otherwise accessible to the IM application 66 for storing protected IM conversations 70, default IM conversations 72, and the various cryptographic keys (and/or keying material) as discussed above. The cryptographic keys 76 would include a pair-wise key for each contact associated with the IM application 66 which can also communicate according to a protected policy. It can be appreciated that the delineation between components shown in FIG. 12 is for illustrative purposes and various other configurations are possible. It can also be appreciated that the allocations of memory storage are shown for illustrative purposes and various separate memory allocations and/or devices may be used, e.g., to securely store cryptographic keys in a hardware security module or other higher security component.

Figure 14:
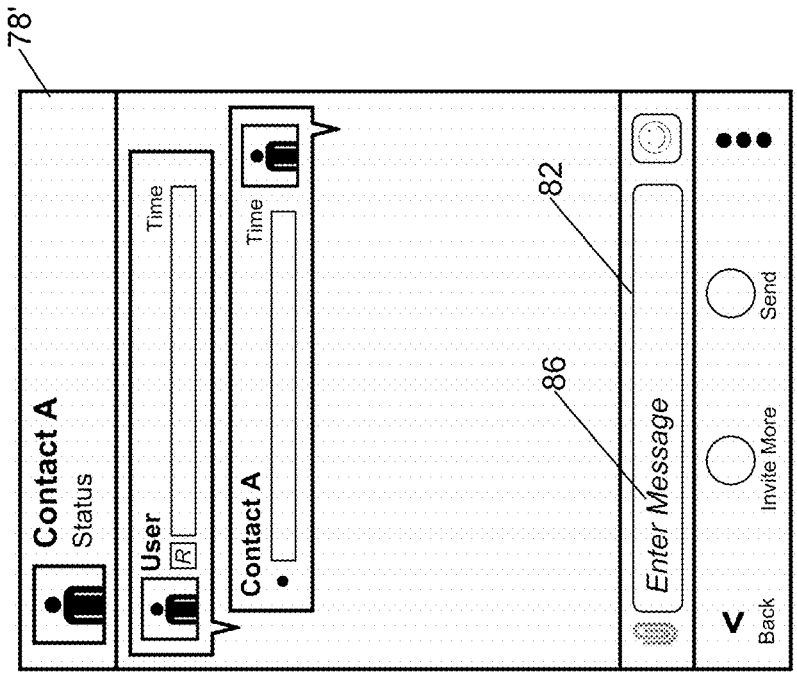
FIG. 14 is a screen shot of an example of a graphical user interface for a default IM conversation.
Figure 13:
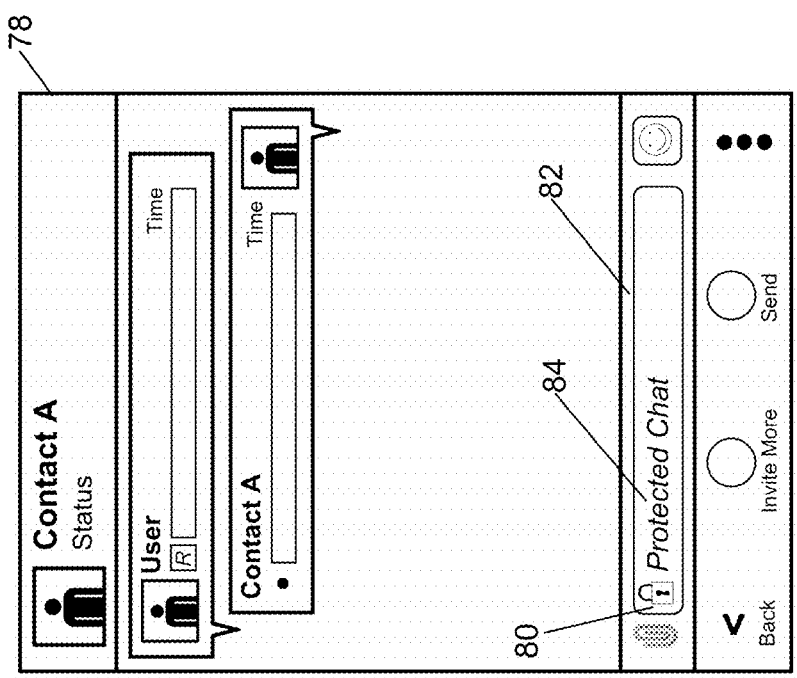
FIG. 13 is a screen shot of an example of a graphical user interface for a protected IM conversation.

An example of a protected IM conversation user interface (UI) 78 is shown in FIG. 13. The protected IM conversation UI 78 includes a badge 80 or icon or other identifying feature in an input field 82 as well as the text "Protected Chat" 84 in order to identify the protected IM conversation UI 78 as being related to a protected conversation with a contact who is also subjected to a protected policy. It can be appreciated that other visual identifiers can be used such as different text colors, different fonts, border coloring, background coloring, etc. Moreover, the badge 80 could be placed in other locations within the UI 78, such as in a header portion near the avatar and contact name. FIG. 14 illustrates a default IM conversation UI 78', which does not include the badge 80 or text 84, but instead uses the text "Enter Message" 86 to differentiate between default and protected conversations. The protected IM conversation UI 78 is used subsequent to performing a key exchange with the corresponding contact, e.g., as shown in FIG. 5.

Figure 15:
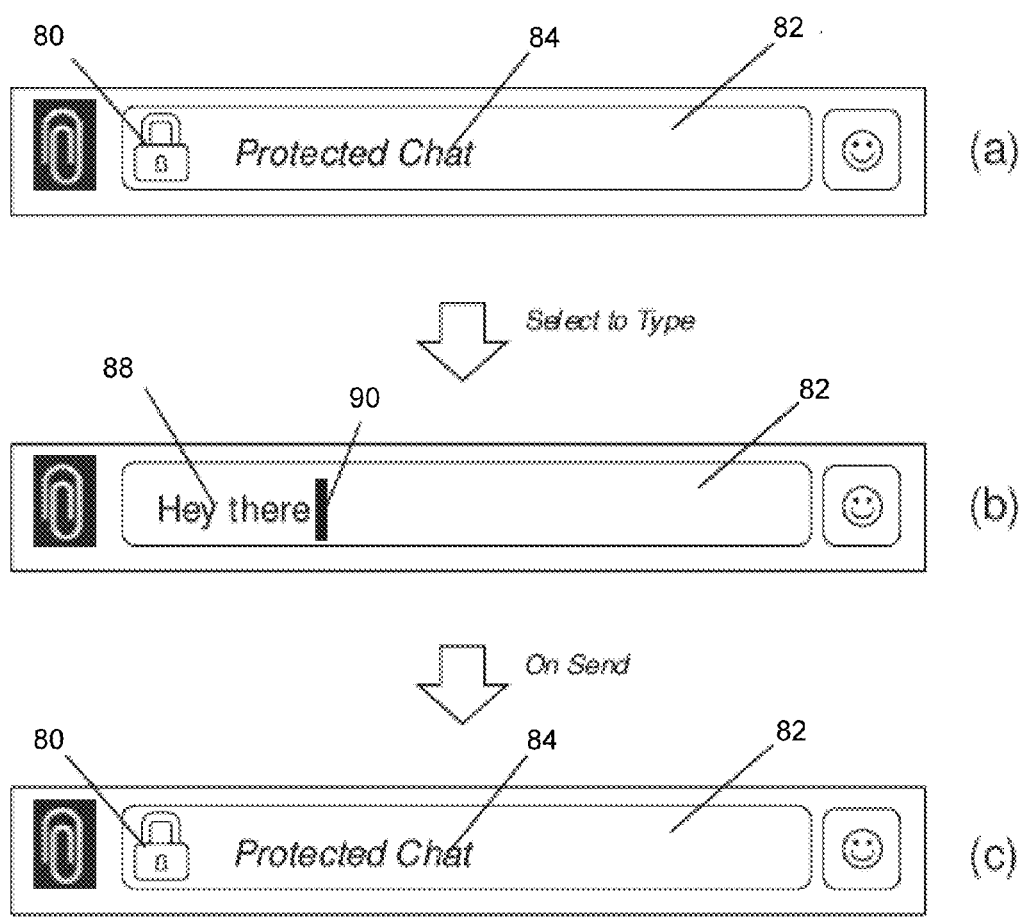
FIG. 15 illustrates a series of enlarged views of an input field for a protected IM conversation.

FIG. 15 illustrates an enlarged view of the input field 82 during message composition. In view (a), the badge 80 and "Protected Chat" text 84 are shown. When the input field 82 is selected for typing, the badge 80 and text 84 are removed as shown in view (b) to enable the message to be composed. After sending the composed message, the badge 80 and text 84 may be reinstated as shown in view (c). It can be appreciated that while the badge 80 is removed, the text 88 being typed into the input field 82, the end of which is denoted by a cursor 90, can be changed (with respect to default text) to incorporate a consistent color to further extend the "protected" connotation when the badge 80 is removed. It can also be appreciated that in other examples the badge 80 can be caused to remain in the input field 82 at all times.

Figure 16:
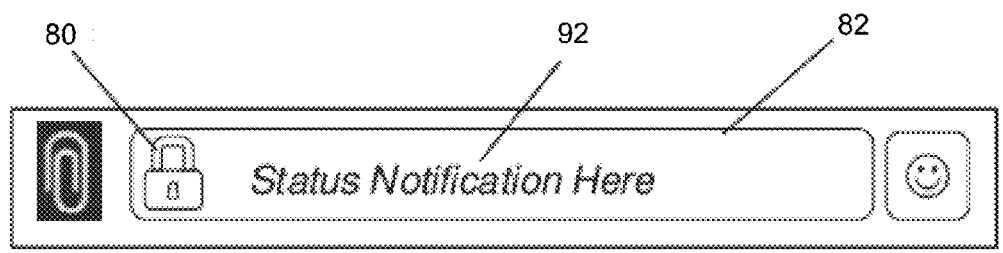
FIG. 16 is an enlarged view of an input field for a protected IM conversation including a status notification.
Figure 17:
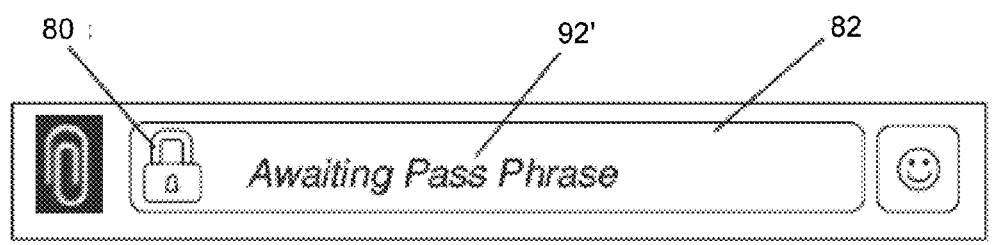
FIG. 17 is an enlarged view of an input field for a protected IM conversation including a status notification indicating that the IM application is awaiting a pass phrase.

As shown in FIG. 16, the input field 82 can also be used to provide status notification text 92. FIG. 17 illustrates a specific example wherein the status notification 92' includes the text "Awaiting Pass Phrase" while the pass phrase (shared secret) is awaiting confirmation from the contact, details of which will now be described making reference to FIGS. 18 through 37.

Figures 18, 19:
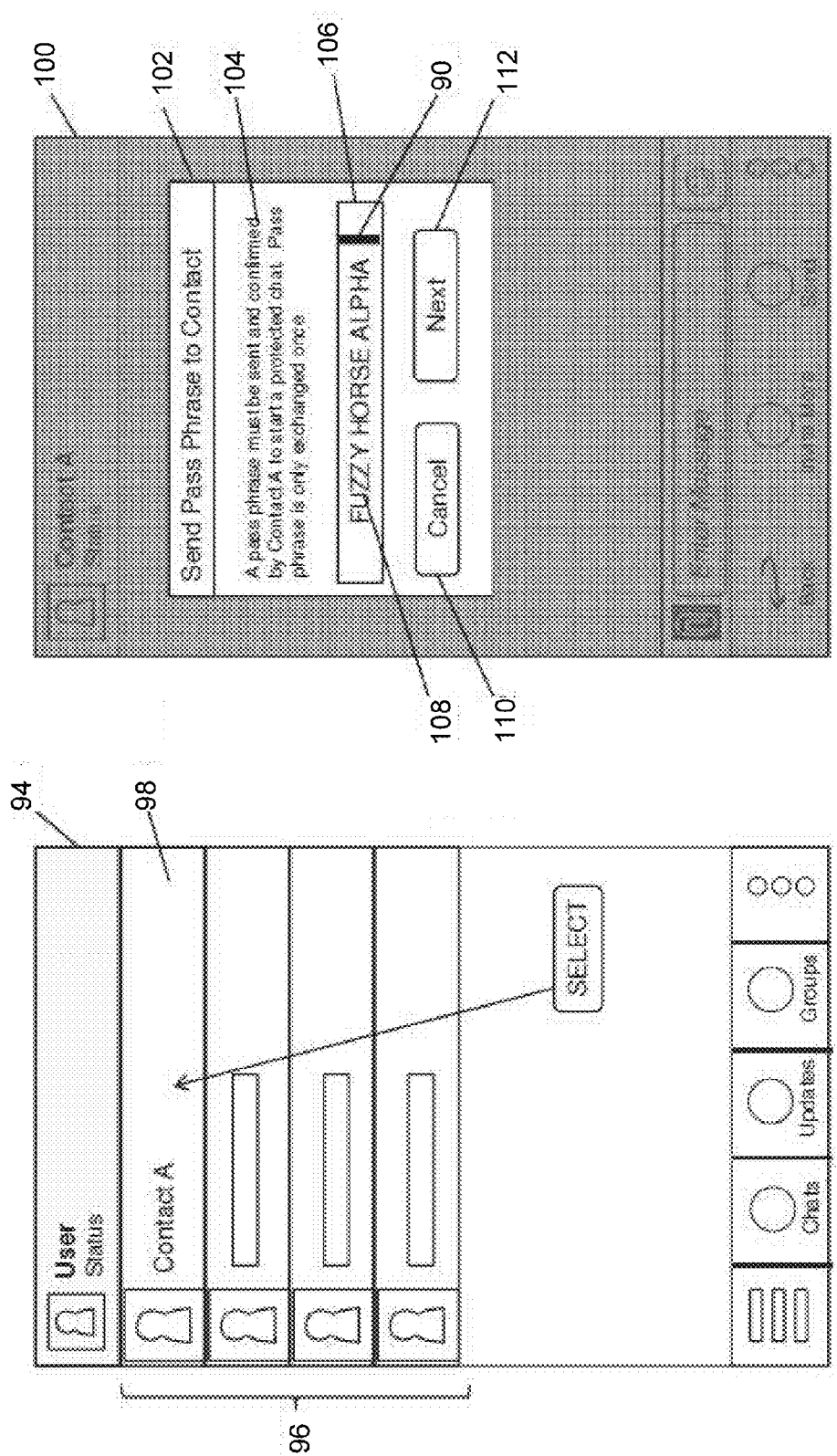
FIG. 18 is a screen shot of an example of a graphical user interface for a conversation list user interface for a selecting a contact.
FIG. 19 is a screen shot of an example of a graphical user interface for an IM conversation displaying a pass phrase entry dialog for a sending an out of band pass phrase.

FIG. 18 illustrates a chats list UI 94 which includes a number of chat list entries 96 each corresponding to an IM conversation with an IM contact. In the example shown in FIG. 18, both protected and default IM conversations are listed together and without distinguishing between the two types of chats. However, it can be appreciated that separate chat lists could also be used, or a distinguishing feature applied to either the default or protected chats (e.g., color, font, badge, etc.). It can be appreciated that other IM UIs can also be modified to include distinguishing features applied to either the default or protected chats, e.g., contact lists (listing contacts), notifications/updates lists, etc. Moreover, the various IM UIs shown and/or discussed herein can be updated to include status information regarding key exchanges, pass phrase exchanges, invitation exchanges, and other processes involving communications between the mobile device 10 and one or more contacts. By selecting the list entry 98 associated with Contact A as shown in FIG. 18, a pending protected IM conversation UI 100 is displayed as shown in FIG. 19, in which a pass phrase entry dialog 102 is provided. The pass phrase entry dialog 102 includes an explanatory message 104 to instruct the user as to the purpose of the pass phrase and procedure for beginning a protected chat. The pass phrase entry dialog 102 also includes a pass phrase entry field 106, for entering a pass phrase 108. The pass phrase 108 can be automatically generated and populated by the IM application 66, or can be created and/or edited by the user, e.g., by selecting the pass phrase entry field 106 to begin typing as illustrated with the provision of a cursor 90 in FIG. 19. By selecting a cancel button 110 the protected chat initiation (and thus key exchange with Contact A) can be aborted. By selecting a next button 112, the pass phrase 108 is sent to Contact A to initiate the key exchange process.

Figure 21:
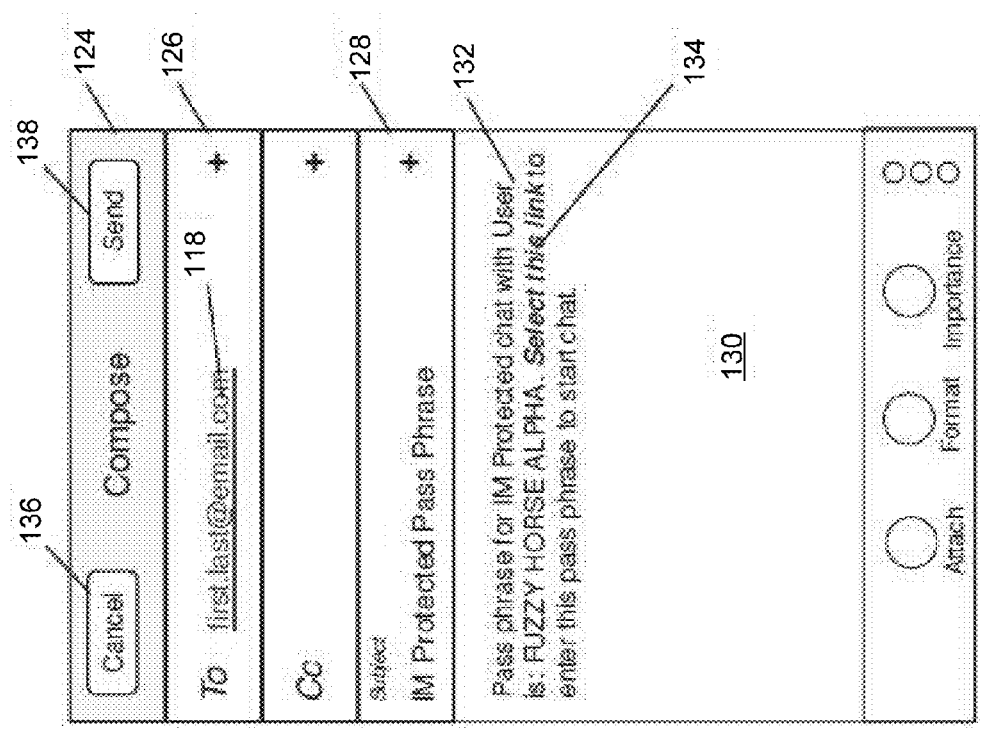
FIG. 21 is a screen shot of an example of a graphical user interface for a message composition which generates an email to send a pass phrase for a protected IM conversation.
Figure 20:
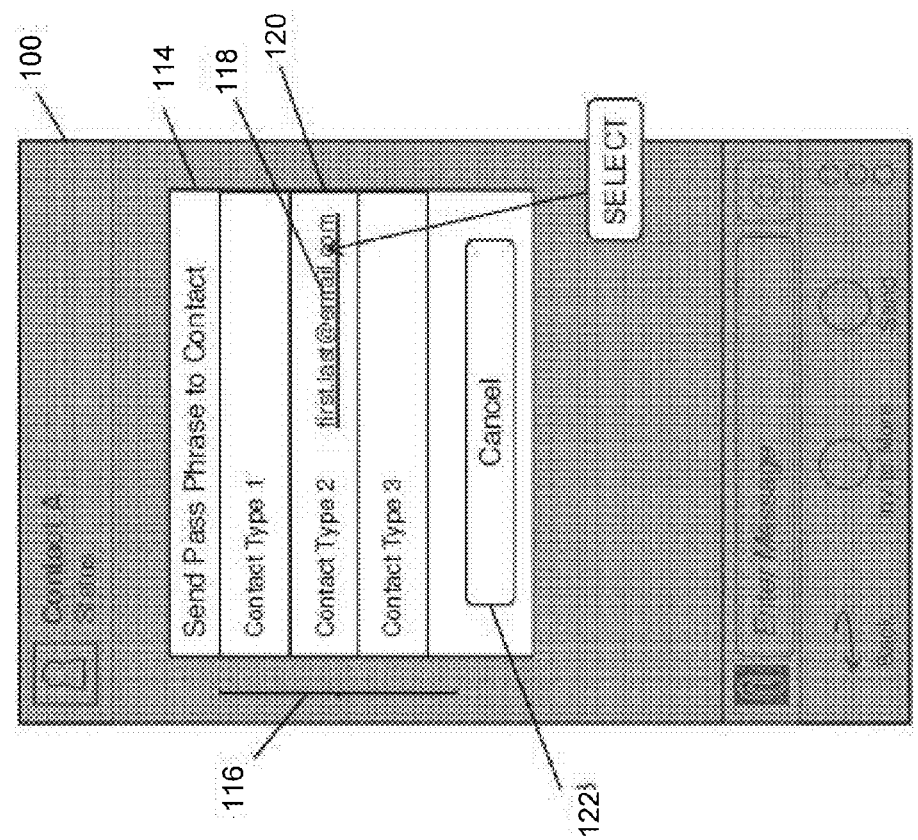
FIG. 20 is a screen shot of an example of a graphical user interface for a an IM conversation displaying a contact address selection dialog for selecting an out of band channel for sending the pass phrase of FIG. 19.

In some examples the user can be provided with an opportunity to select from a plurality of available out-of-band communication channels, for example, if permitted by the protected policy and if available on the mobile device 10. FIG. 20 illustrates a contact type selection dialog 114 that is displayed after selecting the next button 112. The contact type selection dialog 114 includes a list 116 of available contact types, which can identify the communication medium and/or an associated address (e.g., phone number, email address, etc.). In this example, an entry 118 for Contact Type 2 is selected, which includes an email address 120, namely "first.last@email.com." A cancel button 122 is also provided to enable the send pass phrase process to be aborted. By selecting the entry 118 as shown in FIG. 20, an email message composition UI 124 is displayed as shown in FIG. 21. It can be appreciated that for other contact types, other corresponding message composition UIs would be displayed. It can also be appreciated that a default message may be sent automatically to thereby skip the message composition step.

The email composition UI 124 includes a "To" entry field 126 that is, in this example, pre-populated with the selected email address 120. If Contact A has more than one email address in an associated contact details, other mechanisms can be utilized to allow the user to select from one of a plurality of available addresses. Similarly, if an email address is not stored, or the user wishes to use a different email address, the "To" entry field 126 can be used to manually enter an address. A subject line 128 is also pre-populated in this example to identify the email message as being related to the IM protected pass phrase process. The content 130 of the email message is also pre-populated with an invitation message 132. The invitation message 132 indicates what the pass phrase 108 is, and may optionally include a link 134 to direct the recipient to a pass phrase entry UI (described below). By selecting a cancel button 136 the protected chat initiation (and thus key exchange with Contact A) can be aborted. By selecting a send button 138, the invitation message 132 is sent to Contact A to initiate the key exchange process.

Figure 23:
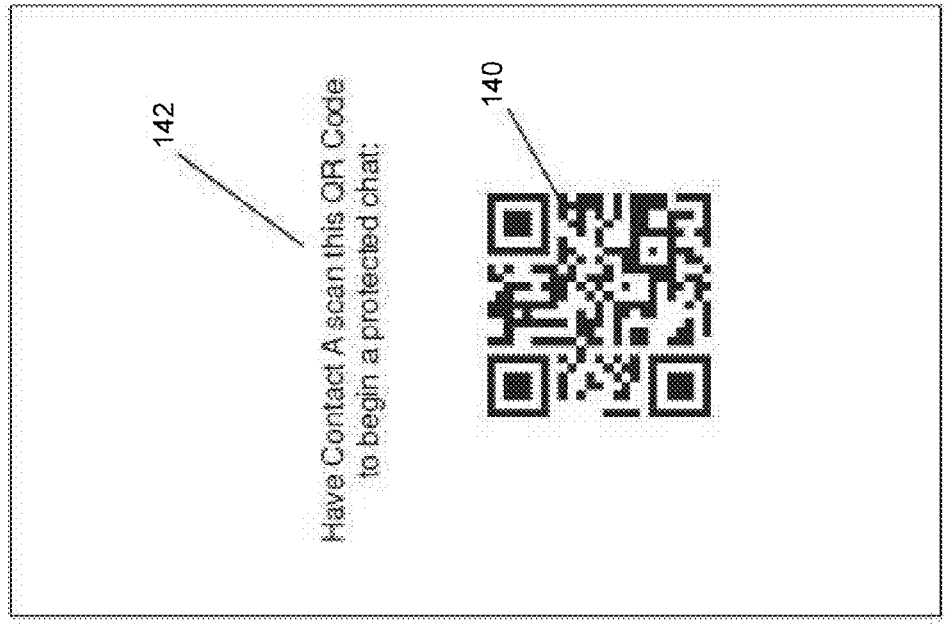
FIG. 23 is a screen shot of an example of a graphical user interface displaying a quick response (QR) code representing a shared secret.
Figure 22:
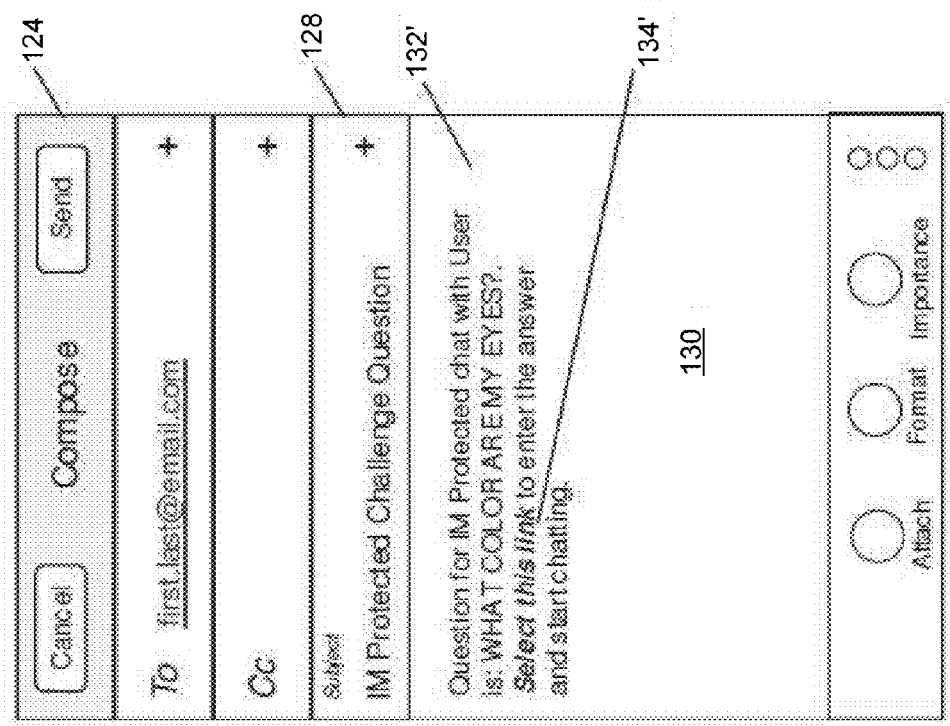
FIG. 22 is a screen shot of an example of a graphical user interface for a message composition user interface including a challenge question.

While the example shown in FIGS. 19, 20, and 21 illustrates the provision of a shared secret using an out-of-band passphrase delivery, it can be appreciated that other mechanisms for mutual authentication can be used, such as a challenge/response mechanism, captcha mechanism, biometric (e.g., fingerprint), image selection, etc. FIG. 22 illustrates one such example wherein the message composition UI 124 includes a challenge question 132' to be sent to the selected address, in this example "What Color are my Eyes?". A link 134' can also be provided in this scenario, which when selected displays a UI for entering a response to the challenge. The challenge question can be generated automatically or can be user-supplied. FIG. 23 illustrates yet another example in which the shared secret is provided using a QR code 140 which can be displayed by User to Contact A to initiate the key exchange and begin a protected chat. As shown in FIG. 23, the QR code 140 can be displayed with an instructional message 142 indicating how to use the QR code 140 to provide the shared secret. It can be appreciated that options can be provided to utilize a plurality of mechanisms for sharing the shared secret. For example, User may be provide with an option to use a pass phrase 108 via a communication, or a QR code scan or other short-range mechanism such as an NFC tap.

After sending the pass phrase 108 (or other form of shared secret), the pending protected IM conversation UI 100 is updated to provide the user with useful information regarding the status of the pass phrase provision and underlying key exchange process. In FIG. 24, a message content portion 144 of the pending protected IM conversation UI 100 is updated to include a first notification message 146 indicating that the pass phrase 108 has been sent, and which contact address was used. This allows the user to determine after the fact how the pass phrase was sent in case they wish to retry with a new address or to remind the contact of the pending confirmation. To further assist the user, a check mark 148 or other visual indicator can be used to signify that the pass phrase was sent. Since the pass phrase was sent using an out-of-band channel, an indication of whether the message was delivered and/or received would require communication between the IM application 66 and the corresponding out-of-band application. A first timestamp 150 is also displayed with the first notification message 146 to enable the user to determine how long it has been since the pass phrase was sent to Contact A.

As also shown in FIG. 24, a resend button 152 is embedded or otherwise included in the pending protected IM conversation UI 100 to allow the user to initiate a resending procedure. For example, the user may select the resend button 152 to send a new pass phrase to a different email account or using a different communication medium. It can be appreciated that to maintain security, the pass phrase should only be used once and selection of the resend button 152 should trigger generation of a new pass phrase or otherwise enable selection or composition of a new pass phrase, e.g., by returning to the UI shown in FIG. 19. It can be appreciated that the notifications and resend button 152 can also be included for other exchange mechanisms such as a challenge/response.

The message content portion 146 can also be used to display other types of notifications, such as an unsuccessful delivery message 154 as shown in FIG. 25. For example, if the pass phrase is sent when a server or system is unavailable or the mobile device 10 is out-of-coverage for at least the corresponding out-of-band channel, the user may be notified conveniently within the pending protected IM conversation UI 100. Similar to what is shown in FIG. 24, the resend button 152 can be displayed while the protected conversation establishment is pending to allow the user to resend a new pass phrase, e.g., using a different address or medium. For example, the pass phrase may be unsuccessfully delivered if an incorrect email address is used which "bounces back" to the mobile device 10. In such a scenario, the user would be able to resend the pass phrase and correct the error. Although not shown in FIG. 25, the address used in the unsuccessful attempt can also be displayed to enable the user to ascertain whether or not there was an error in the address used.

Figure 27:
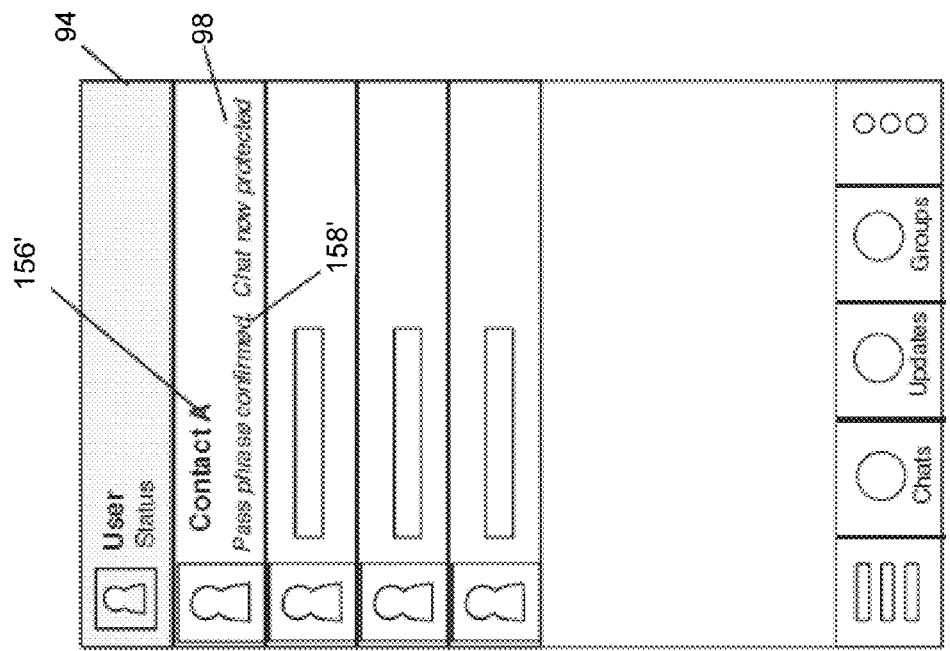
FIG. 27 is a screen shot of an example of a graphical user interface for a conversation list user interface illustrating a confirmed pass phrase notification.
Figure 26:
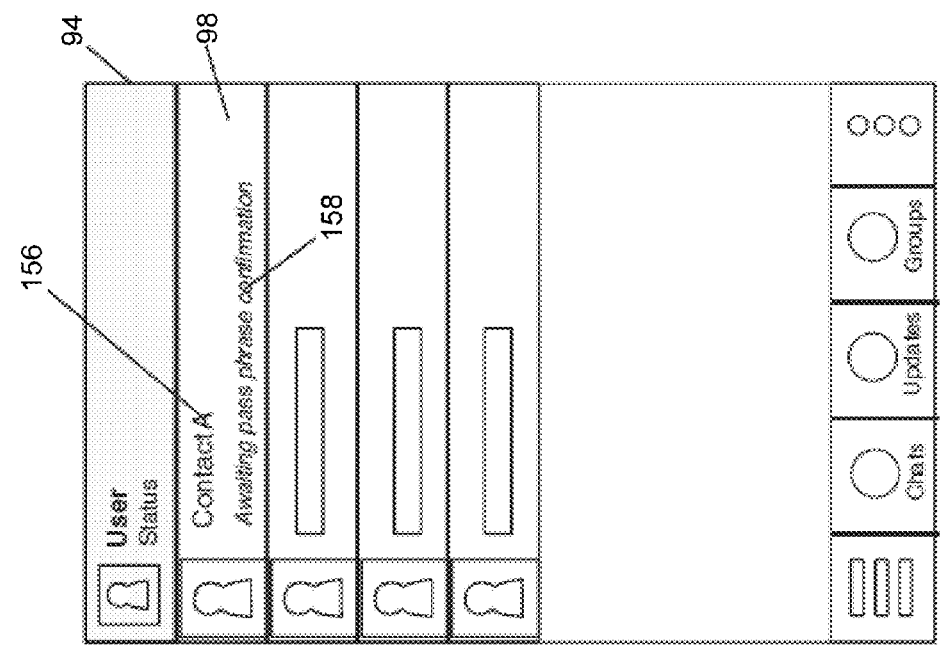
FIG. 26 is a screen shot of an example of a graphical user interface for a sender conversation list user interface illustrating a pending pass phrase notification.

After sending the pass phrase, notifications can be populated in other UIs. For example, as shown in FIG. 26, the list entry 98 for Contact A in the chats list UI 94, in addition to displaying the contact name 156 can provide a status notification 158 associated with the pass phrase, in this example: "Awaiting pass phrase confirmation." In this way, the user can ascertain whether or not they may begin a protected chat without having to necessarily select and display the pending protected IM conversation UI 100. FIG. 27 illustrates the same list entry 98 upon receiving confirmation of the pass phrase from Contact A. In this example, the contact name 156' is highlighted similar to when a new message is received to draw attention to the associated updated notification 158' which indicates: "Pass phrase confirmed. Chat now protected". The user may then access the pending protected IM conversation UI 100 by selecting the list entry 98 to display a new protected IM conversation UI 78 as shown in, for example, FIG. 35.

Figures 28, 29:
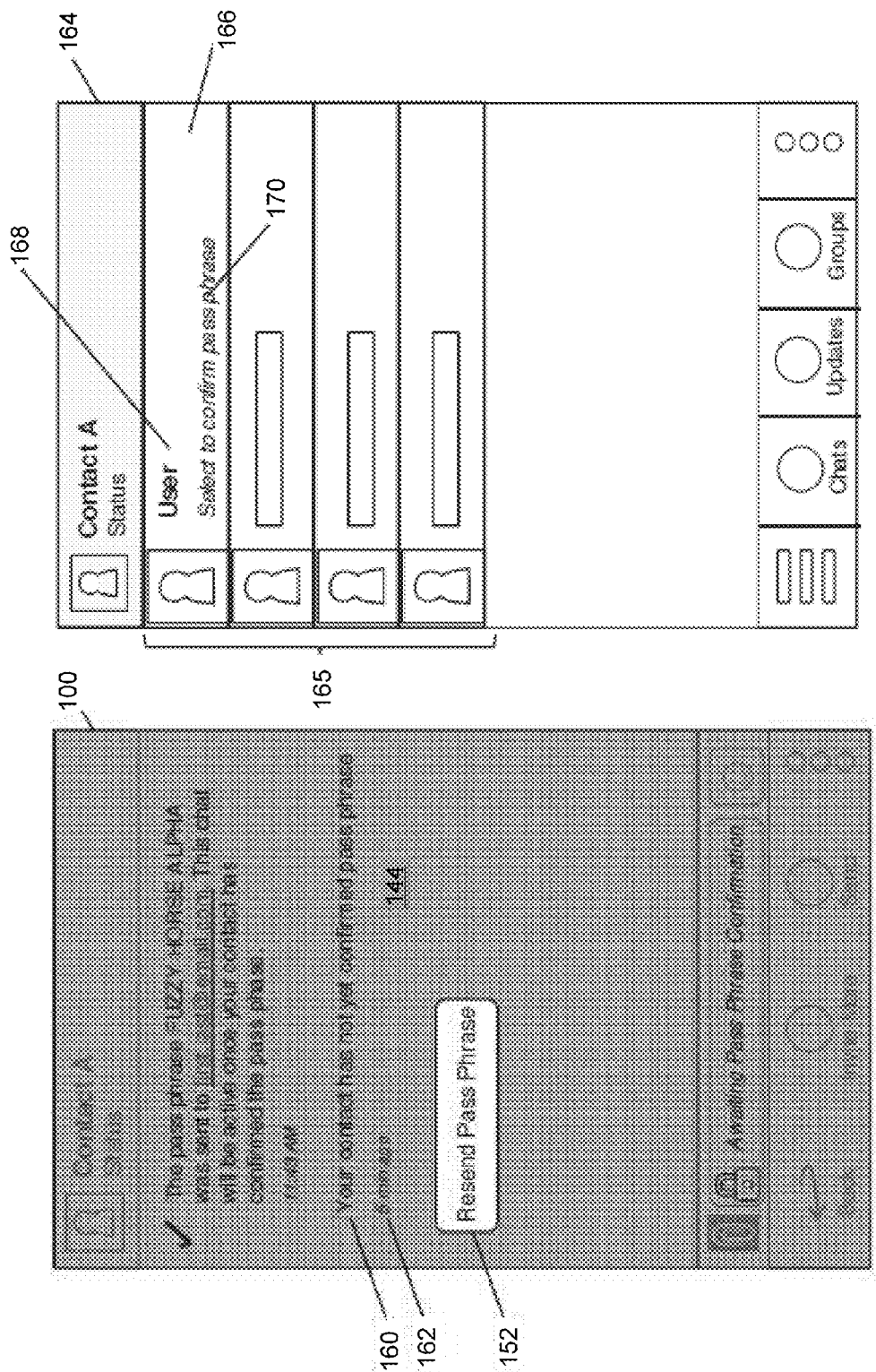
FIG. 28 is a screen shot of an example of a graphical user interface for a protected IM conversation pending confirmation of a pass phrase sent to a contact illustrating a follow up status notification.
FIG. 29 is a screen shot of an example of a graphical user interface for a recipient conversation list user interface illustrating a pending pass phrase notification.

Turning now to FIG. 28, the pending protected IM conversation UI 100 can also be periodically updated to provide additional status notifications, e.g., a second status notification 160 and second time stamp 162 in the message content portion 144. The second status notification 160 in this example indicates that the contact has not yet confirmed the pass phrase. The second time stamp 162 allows the user to determine how long the pending confirmation has taken so far, in order to determine whether or not to use the resend button 152 which is again displayed in the message content portion 144. As noted above, the pending protected IM conversation UI 100 can also be updated to include additional information to inform the user of the progress of the pass phrase or other data and information exchanges with the contact.

Figure 31:
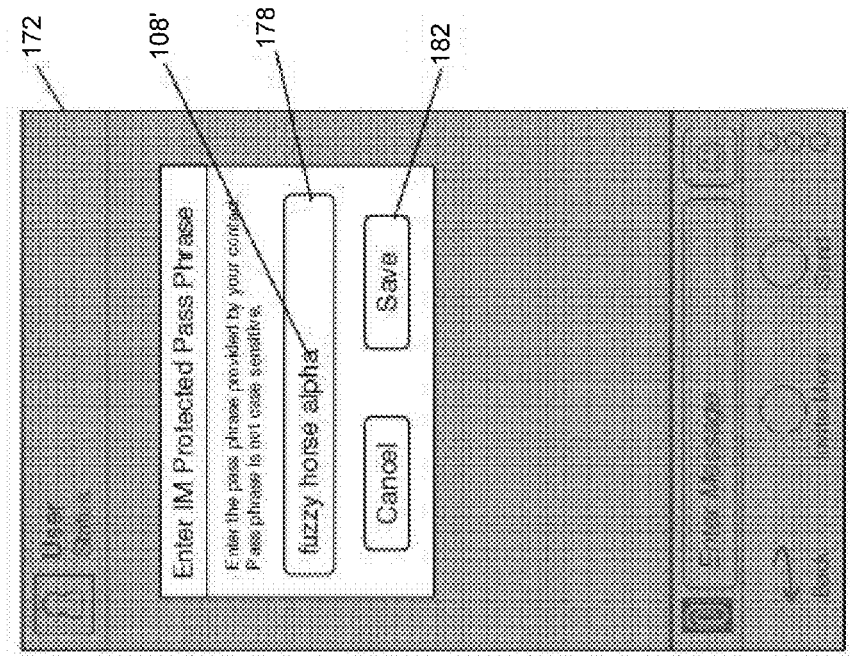
FIG. 31 is a screen shot of an example of a graphical user interface for an IM conversation for a recipient displaying a populated pass phrase entry dialog.
Figure 30:
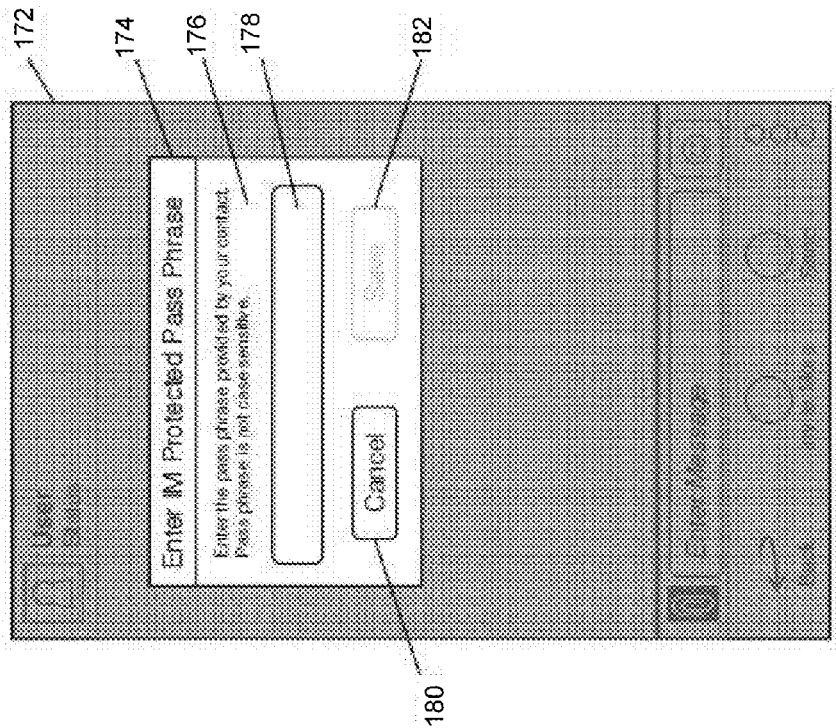
FIG. 30 is a screen shot of an example of a graphical user interface for an IM conversation for a recipient displaying a pass phrase entry dialog for input of an out of band pass phrase.

FIG. 29 illustrates an IM chats list UI 164 for Contact A, which contains chat list entries 165 including a list entry 166 associated with "User," namely the initiator of the pass phrase process. Similar to what is shown in FIG. 27, a contact name 168 associated with the sender of the pass phrase 108 can be highlighted in a manner similar to a conversation with a newly received message. A notification 170 can also be provided, in this example indicating: "Select to confirm pass phrase." By selecting the list entry 166, a pending protected IM conversation UI 172 for the recipient is displayed as shown in FIG. 30. The pending protected IM conversation UI 172 also displays a recipient pass phrase entry dialog 174 that includes an instruction message 176 indicating that the pass phrase was sent using another communication channel and in this example that the pass phrase is not case sensitive. An input field 178 is provided to enable the recipient user to enter the pass phrase. A cancel button 180 is provided to allow the recipient user to abort the pass phrase provision process. A save button 182 is also provided, which can be kept inactive as shown in FIG. 30 until a pass phrase is entered, as shown in FIG. 31. In FIG. 31 a recipient-entered pass phrase 108' is provided in the input field 178 and the save button 182 becomes active to allow the recipient to submit the pass phrase 108'.

Figure 32:
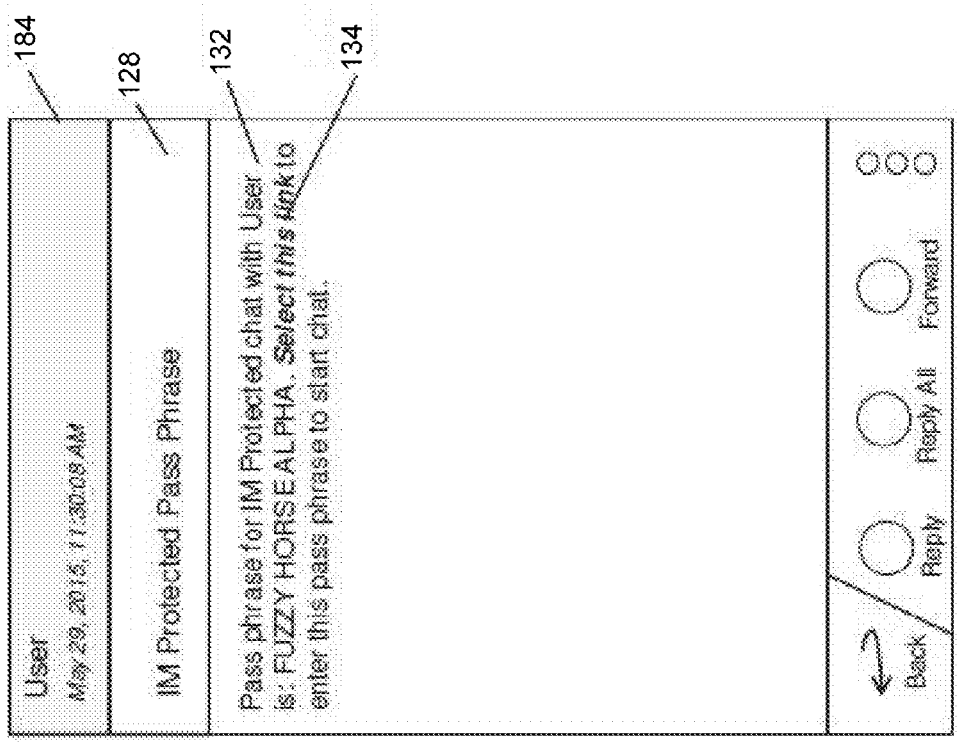
FIG. 32 is a screen shot of an example of a graphical user interface for an out-of-band message including an invitation to begin chatting in a protected IM conversation.

The pass phrase 108' can also be automatically populated and the pending protected IM conversation UI 172 accessed from the received invitation message. FIG. 32 illustrates an example of an email message UI 184 which includes a subject line 128 and message 132 corresponding to what was composed and sent by the initiator. As indicated above, a link 134 can be embedded into the invitation message 132. By selecting the link 134, the entry dialog 174 shown in FIG. 31 can be automatically displayed, and can include a pre-populated input field 178 with the supplied pass phrase 108' to minimize the steps used to confirm the pass phrase and thus minimize interruptions experienced by the recipient. As discussed above, the pass phrase can be provided using various out-of-band channels, including using personal interactions between the initiator and the recipient. For example, the pass phrase or other secret can be exchanged transparently to the user using a QR scan, NFC tap, etc.

Figure 33:
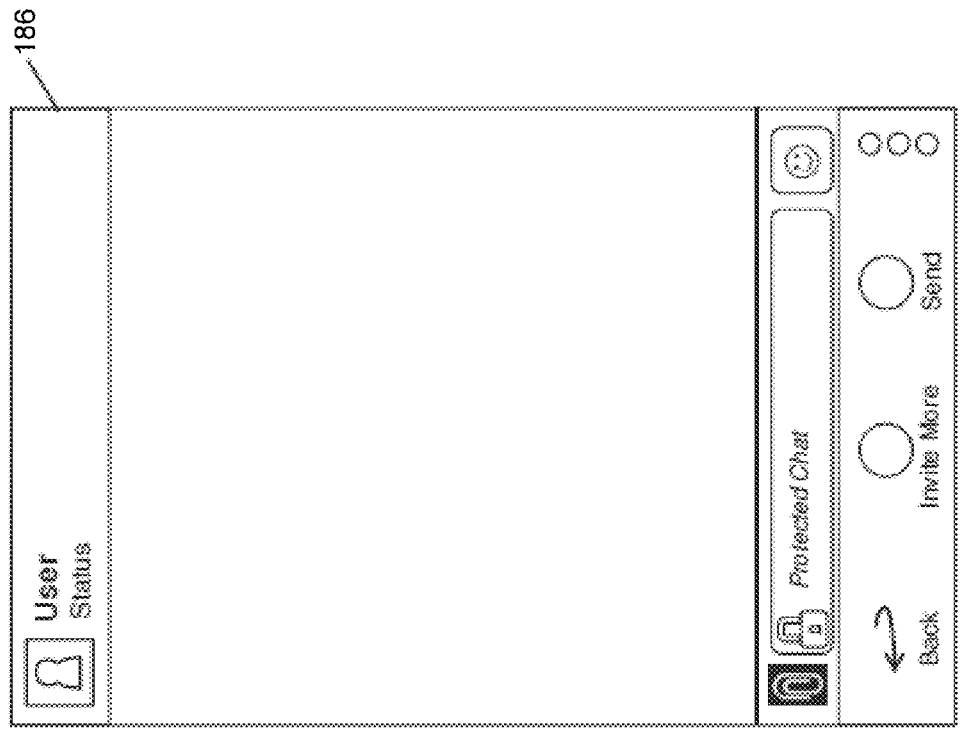
FIG. 33 is a screen shot of an example of a graphical user interface for a protected IM conversation subsequent to a successful pass phrase entry.

After confirming the pass phrase 108', using which ever mechanism the recipient uses, a new protected chat UI 186 for the recipient, with "User" (i.e., the initiator) is displayed as shown in FIG. 33, which can thereafter be used to conduct a protected conversation between User and Contact A.

Various other notifications can be utilized to convey the status of the pass phrase process. For example, as shown in FIG. 34 a unified or amalgamated inbox or message repository, hereinafter a message "hub" UI 188 is shown, which includes various list entries 190, which may include, for example, incoming or outgoing messages from a plurality of different messaging or communication media, notifications, updates, alerts, missed phone calls, etc. In the example shown in FIG. 34, an IM list entry 192 corresponding to the pending protected IM conversation UI 100 with Contact A is shown, in which the contact name 194 is highlighted to indicate a new message, and a notification 196 is provided, indicating: "Pass phrase confirmed. Chat is now protected." Similar to the UI flow described above with respect to the IM chats list UI 94, by selecting the list entry 192, the now-enabled protected IM conversation UI 78 is displayed as shown in FIG. 35 to enable the user to begin the protected conversation.

The message hub UI 188 can also be used to provide other types of notifications, as shown in FIG. 36 in which a list entry 198 includes a notification that is distinct from identifying pass phrase confirmation as shown in FIG. 34. In this example, the list entry 198 includes a notification badge 200, a contact name 202 (highlighted when unread/unattended), and a notification message 204, indicating: "Contact has not yet confirmed pass phrase." It can be appreciated that similar notifications can be provided at the recipient's end. For example, as shown in FIG. 37, a recipient message hub UI 206 may also include a notification list entry 208 that includes a notification badge 210, an indication of the sender by way of a contact name 212 in this example, and a notification message 214, in this example: "Pass phrase needed for IM protected chat."

Figure 38:
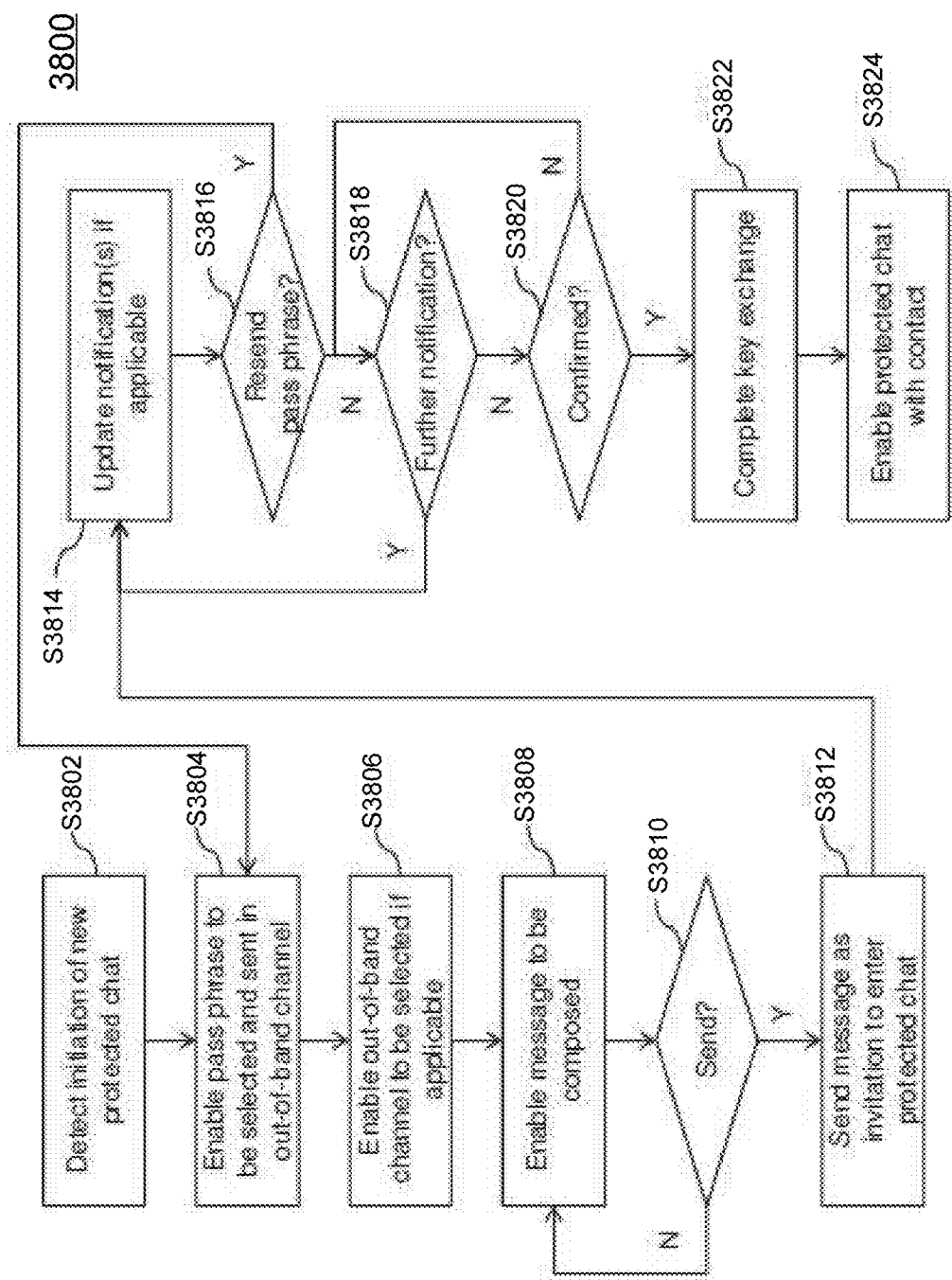
FIG. 38 is a flow chart illustrating computer executable operations that may be performed in initiating a protected chat with a contact.

FIG. 38 illustrates computer executable operations performed by an initiator in initiating a protected chat using the pass phrase 108. At 53802, the IM application 66 detects the initiation of a new protected chat, e.g., by detecting selection of a contact that is known to also by under the protected policy. The IM protected module 68 may then be utilized to perform the pass phrase process by enabling the pass phrase to be selected (i.e. pre-populated text confirmed or text to be entered) and sent in an out-of-band channel at S3804. The IM protected module 68 can also enable the user to select from multiple available out-of-band channels at 52808 and enable a message to be composed at 53808. It can be appreciated that FIG. 38 assumes that the pass phrase exchange proceeds through the illustrated steps but that "cancel" options can be provided to abort the process at any of these stages as illustrated in the UIs. The IM protected module 68 then determines at 53810 whether or not the composed invitation message has been selected to be sent. Once it has been selected to be sent (e.g., by selecting the send button 138), the message is sent at 53812 as an invitation to enter a protected chat.

After sending the invitation, one or more UIs can be updated at S3814, e.g., as discussed above to indicate that the pass phrase has been sent, including providing a notification in the pending protected IM conversation UI 100. While waiting for the pass phrase to be confirmed, the IM protected module 68 determines at S3816 whether or not to resend the pass phrase, e.g., if detecting selecting of the resend button 152. If so, the process may repeat from S3804. If not, the IM protected module 68 determines at S3818 whether or not to provide an additional notification, e.g. by adding another notification message to the pending protected IM conversation UI 100 and repeating S3814. The IM protected module 68 also determines at S3820 whether or not the pass phrase has been confirmed by the recipient contact, e.g., by looking for received messages or other data indicating the pass phrase was successfully entered by the recipient. Once confirmed, the key exchange process is completed at S3822, which should be performed transparently to the user, and the protected chat is enabled at S3824.

Figure 39:
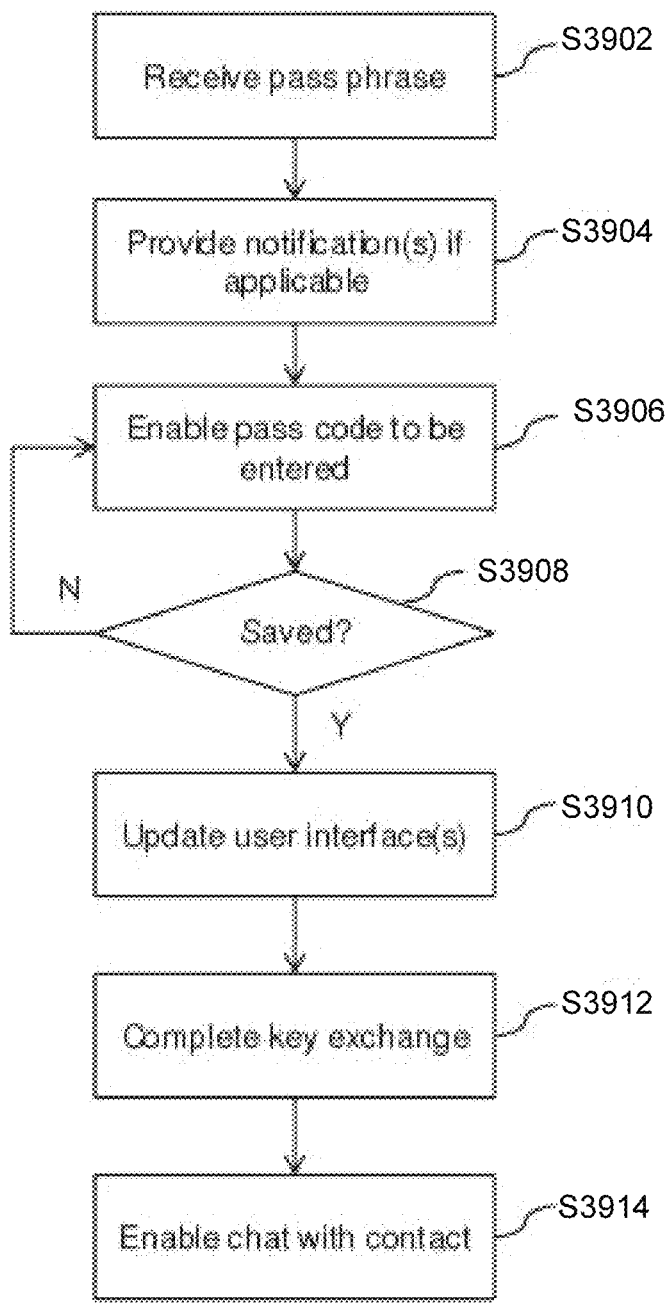
FIG. 39 is a flow chart illustrating computer executable operations that may be performed in receiving and utilizing a pass phrase from a contact.

FIG. 39 illustrates computer executable operations performed by a recipient contact in participating in the pass phrase process to establish the key exchange. At S3902 the recipient mobile device 10 receives the pass phrase 108 in an out-of-band communication, e.g., via email. The IM application 66 and/or IM protected module 68 may also provide one or more notifications to the recipient at S3904, e.g., in a message hub, chats list, etc. The IM protected module 68 at the recipient then enables the pass code to be entered at S3906 and determines at S3908 whether or not the correct pass phrase has been saved. If not, re-entry (e.g., up to a predetermined number of times) can be performed by repeating S3906. Once successfully saved, the UIs for the IM application 66 are updated at S3910, e.g., to enable the protected chat UI to be accessed via a notification, and the key exchange is completed at S3912, which should be transparent to the user. The protected chat with the initiator contact is then enabled at S3914.

Accordingly, it can be seen that the pass phrase exchange and confirmation process can be made convenient to the user by incorporating various notifications both within and outside of the pending protected IM conversation UI 100, and be enabling the user to conveniently resend a pass phrase 108 if desired.

Figure 40:
FIG. 40 is a screen shot of an example of a graphical user interface for a inviting contacts to a protected multi-cast conversation.

The concepts described above in relation to an individual IM chat may also be applied to a multi-cast chat. FIG. 40 illustrates an example screen shot of a user interface for inviting contacts to a multi-cast chat. After indicating that a multi-cast chat is desired, a section box appears displaying a listing of available contacts for selection. A badge or other indicator appears by the name of contacts that may communicate in a protected IM mode using enhanced security. Contacts that do not have this capability are indicated without a badge. In order to have a protected multi-cast IM chat, each participant in the chat must be able to communicate using enhanced encryption protocols. If any selected participant is unable to communicate using enhanced protection, the multi-cast conversation will only be secured via the default encryption method.

Figure 41:
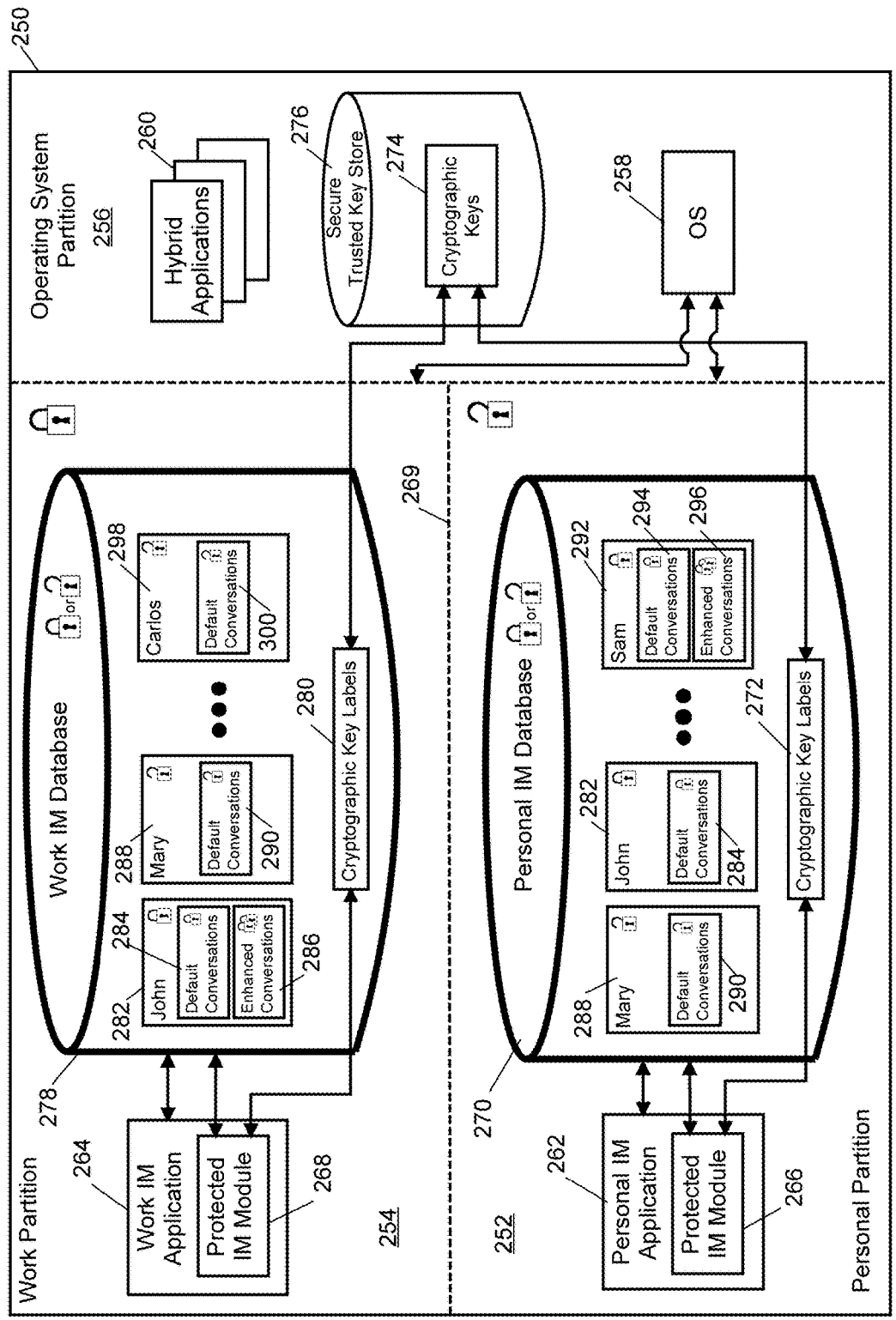
FIG. 41 is a schematic diagram illustrating an example instant messaging architecture across multiple partitions according to one aspect of the present disclosure.

Referring now to FIG. 41, an example mobile device memory 250 may be partitioned to virtually split the mobile device 10 into seemingly different devices using a "balance" scheme. The file structure of the memory 250 is partitioned into multiple sections, each of which may employ a different encryption scheme. This arrangement allows the user to control which applications, contacts, documents, media files, etc. are stored on one partition, i.e. the personal partition 252, while allowing a third party, such as a user's workplace running an enterprise server 22 or a web-based console, to have access and control over the content authorized for use and stored on a separate partition, i.e. the work partition 254. The entire work partition 254 has some form of "at rest" encryption, while the personal partition 252 typically has no default at rest encryption (i.e. unencrypted). However, in some instances, the personal partition 252 may also have some form of encryption, though generally at a lower security than the work partition 254. The operating system partition 256 contains the operating system 258 which controls the common functionality of the device 10 and thus, has access to both the personal partition 252 and the work partition 254. Certain hybrid applications 260 (e.g. a message hub 188, calendar application, etc.) may also be stored in the operating system partition 256 and have special access to both the personal partition 252 and the work partition 254.

In the example shown in FIG. 41, the IM application 66 is implemented as two separate IM applications, i.e. a personal IM application 262 stored in the personal partition 252 and running when the mobile device 10 is operating in a personal mode and a work IM application 264 stored in the work partition 254 and running when the mobile device 10 is operating in a work mode. The personal IM application 262 includes or otherwise has access to a personal protected IM module 266 for enabling participation in protected IM conversations 70 with personal contacts operating other protected devices 10a according to a security policy, as well as to participate in default IM conversations 72 with personal contacts having devices 10d not subject to a protected policy. Similarly, the work IM application 264 includes or otherwise has access to a work protected IM module 268 for enabling participation in protected IM conversations 70 with work contacts having protected devices 10a, as well as to participate in default IM conversations 72 with work contacts having devices 10d not subject to a protected policy.

Generally, applications are unable to cross the partition boundary 269. Thus, there are also two IM databases, one for the work partition 254 and one for the personal partition 252, both of which may or may not be further encrypted. A personal IM database 270 may therefore be included in the personal partition 252 or otherwise be accessible to the personal IM application 262 for storing protected personal IM conversations, default personal IM conversations, and cryptographic key labels 272 which reference various cryptographic keys 274 (and/or keying material) stored in a secure trusted key store 276 in the operating system partition 256, as discussed above. The cryptographic keys 272 include a pair-wise key for each contact associated with an IM application 66 (e.g., personal IM application 262 or work IM application 264) which can also communicate according to a protected policy. Likewise, work IM database 278 may therefore be included in the work partition 254 or otherwise be accessible to the work IM application 264 for storing protected personal IM conversations, default work IM conversations, and cryptographic key labels 280 which reference the cryptographic keys 272 stored in the secure trusted key store 274.

Contacts can fall into one of many categories: Personal Only, Work Only, Both Work and Personal, Personal Only Protected, Work Only Protected, and Both Work and Personal Protected. The contact type can be identified based on existing characteristics pulled from a local contacts application, a web-based console's contacts database, and information sent from the contact's IM/IM Protected application. Users can also manually set the category of a contact. Administrators can also manually set the category of a contact.

The encryption of data in transit can be dynamically changed based on the above paragraph as well as other characteristics, such as classification levels of the conversation (e.g., Government example: Unclassified, Unclassified but sensitive, Sensitive, Secret, Top Secret, and Need to know/Eyes only). This classification also applies to files which can be classified separately from the current, past, or future conversations. Each of these options can also be configured locally by the user or remotely via enterprise server 22 or web-based console by an administrator.

Data at rest protection can take many forms as well. None, one, or many of the messages can be encrypted at rest. The database itself can also be encrypted or not. Additionally the underlying file system (i.e. work partition 254 or personal partition 252) can be encrypted or not. Each of these options can also be configured locally by the user or remotely via enterprise server 22 or web-based console by an administrator. Additionally, files sent and received via the IM application 66 can be saved to either the personal partition 252 or work partition 254 of the device 10. These files can also be selectively encrypted at rest by the user, based on the classification level of the file or based on administrative control.

Data at rest protection also applies when turning On and Off Protected IM. Each of the previously discussed options (i.e. message, database, underlying file system) can be applied when IM Protected is turned On or Off. Data at rest protection may also be accomplished by moving the database from an unencrypted file system to an encrypted file system or vice versa. Another option is to sanitize or delete messages, conversations, database, and files when specifically going from On to Off.

At any time the work partition 254 on the device can be deleted remotely by an administrator (e.g., an enterprise server 22 or web-based console administrator) or locally by the user. In addition, the enterprise server 22 or web-based console administrator may add, delete or modify contact information directly from the work IM database 278 (e.g., upon addition of a new employee or end of employment for an existing employee); add, delete or modify applications in the work partition; or delete the work partition 254 entirely (e.g., upon termination of the user's employment). Data (contacts, messages, conversations, and files) residing in the work perimeter may be copied as-is to the personal side, may be sanitized or deleted based on classification, may be sanitized or deleted based on contact category, or the entire database holding all information may be purged.

In the example of FIG. 41, contact "John" 282 is both a "work protected" and a "personal protected" contact, thus John 282 has an entry in both the personal IM database 270 and the work IM database 278. Every message 284 sent to or received from John 282, whether the user's device 10 is running the personal IM application 262 or the work IM application 264, is encrypted with a default level of encryption and these messages are stored with a default level of encryption. However, in certain circumstances, the user (or John) may wish to increase the level of security for a particular conversation 286 and may elect to encrypt the message with a more complex algorithm (e.g., the message needs "Top Secret" security classification). Thus in the work partition 254, there are certain messages which are stored as enhanced conversations 286 which may be encrypted, for example, using a longer key. It should be noted that there may be cases where a contact is both a work and personal protected contact where the security level associated with a work contact is different than the security level associated with a personal contact (i.e. the encryption schemes are different). In those instances, communication between the devices is performed using the higher security level.

Contact "Mary" 288 is both a work and personal contact, but she is not a protected contact, thus all messages 290 with Mary are sent using a default level of encryption and are stored without additional encryption beyond that of the partition or database.

Contact "Sam" 292 is a "personal only protected" contact. His messages are stored on the personal partition 252 of the device 10 and sent via protected IM using some level of encryption. Thus his messages 294 default while at rest to being stored using the level of encryption of the protected IM. Additionally, the user (or Sam) may determine other messages 296 should have a different level of protection and may encrypt these messages using a more complex algorithm. Those enhanced messages 296 are stored at rest using the higher level of encryption.

Contact "Carlos" 298 is a "work only non-protected" contact, thus his conversations 300 are not normally protected.

Figure 42:
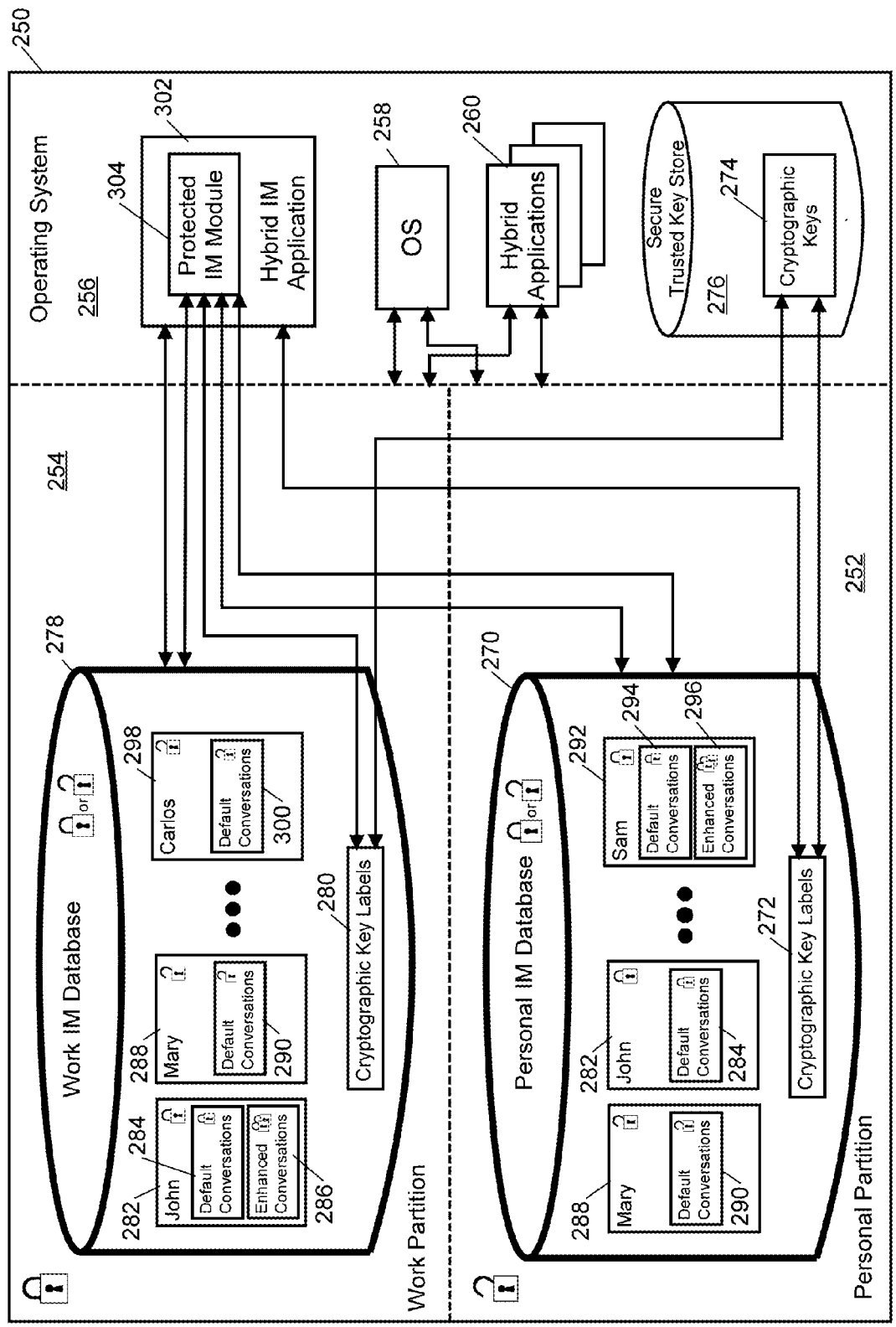
FIG. 42 is a schematic diagram illustrating an example instant messaging architecture across multiple partitions according to another aspect of the present disclosure.

An alternate example of the device memory 250 is shown in FIG. 42. Like the example shown in FIG. 41, the memory is partitioned into a personal partition 252, a work partition 254 and an operating system partition 256. However, in this case, the IM application 66 is a hybrid IM application 302 stored in the operating system partition 256 and having access to both the personal IM database 270 and the work IM database 270. The hybrid IM application 302 includes or otherwise has access to a hybrid protected IM module 304 for enabling participation in protected IM conversations 70 with personal and work contacts operating other protected devices 10a, as well as to participate in default IM conversations 72 with personal and work contacts having devices 10d not subject to a protected policy.

Figure 43:
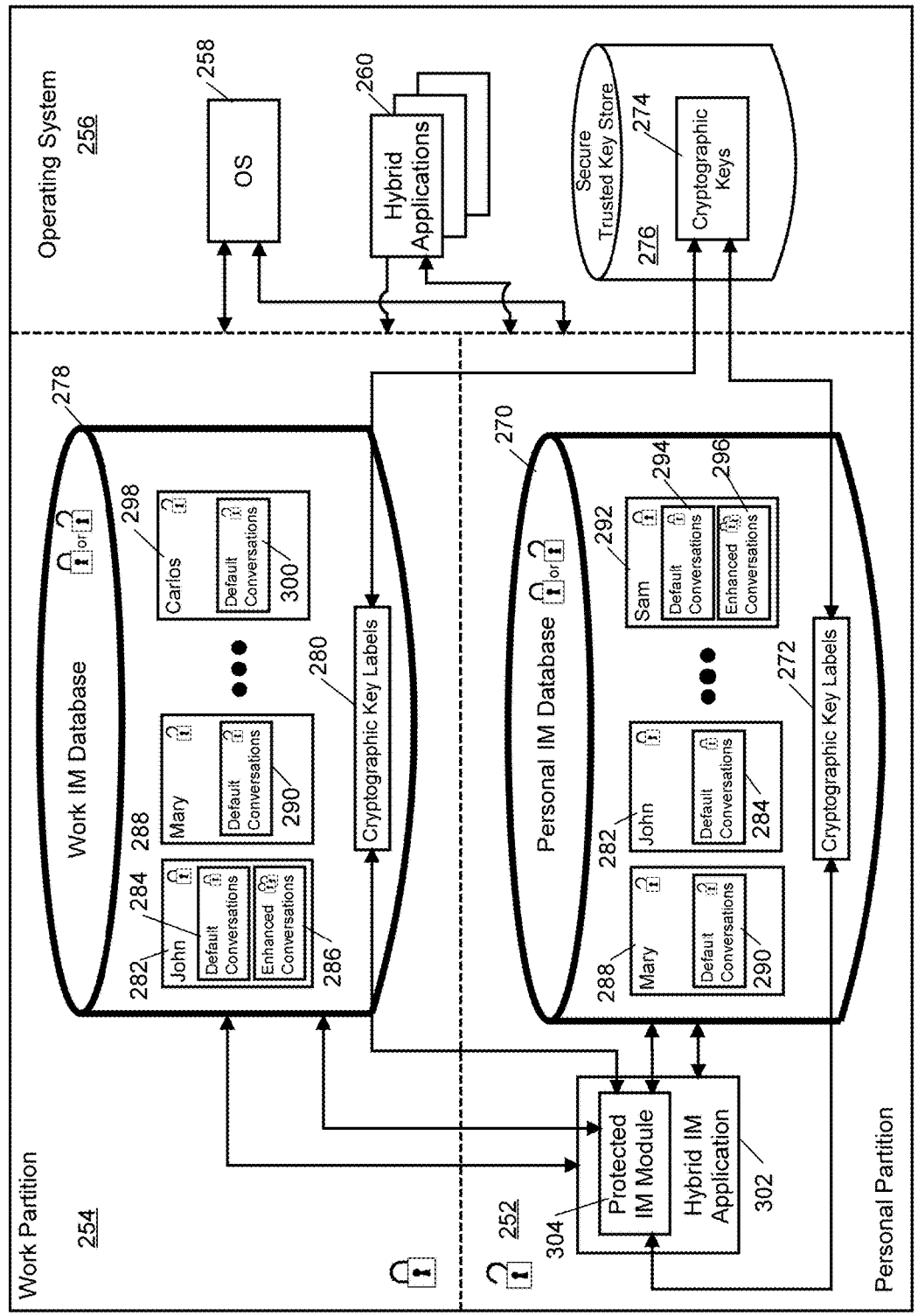
FIG. 43 is a schematic diagram illustrating an example instant messaging architecture across multiple partitions according to yet another aspect of the present disclosure.

Another alternative example of the device memory 250 is shown in FIG. 43. Again, like the examples shown in FIGS. 41 and 42, the memory is partitioned into a personal partition 252, a work partition 254 and an operating system partition 256. As in FIG. 42, the IM application 66 is a hybrid IM application 302, but stored in the personal partition 256 and having special access to both the personal IM database 270 and the work IM database 270. In this manner, the hybrid IM application 302 may operate across the partition boundary 269, but is not susceptible to deletion by an administrator of the enterprise server 22 or other web-based console. The hybrid IM application 302 may also be located in the work partition 254, but could be deleted by such administrator.

It can be appreciated that the delineation between components shown in FIGS. 41 through 43 is for illustrative purposes and various other configurations are possible. It can also be appreciated that the allocations of memory storage are shown for illustrative purposes and various separate memory allocations and/or devices may be used, e.g., to securely store cryptographic keys in a hardware security module or other higher security component.

An example of a work contact list user interface (UI) 306 is shown in FIG. 44. The work contact list UI 306 may be shown when the device 10 is operating in a "work" mode (i.e. all applications running and all data shown are accessible to or stored in the work partition 254). The work contact list UI 306 may include a ribbon area 308 identifying the device user by a badge 310 or icon or other identifying feature and a username 312 as well as a current status 314 of the user. Additionally, the ribbon area 308 may further include an "Add Contact" icon 316, which upon selection, launches an interface in which a user may enter contact information for adding a new work contact. The work contact list UI 306 is identified as "Work Contacts" by text in a label area 318 as well as a "Contacts" button 320. The work contact list UI 306 may be navigated to from any UI within the work IM application 264 by selecting the "Contacts" button 320. When the contacts list UI 306 is active (i.e. showing on the display 64), the "Contacts" button is highlighted. Various other interfaces may be accessed by selecting corresponding buttons. For example, a "Chats" button 322 may launch a chats list UI, a "Feeds" button 324 may launch a feeds UI, a "Groups" button 326 may launch a groups UI, a "Channels" button 328 may launch a channels UI, and an ellipses button 330 may list further options.

Each contact in the work IM database 254 may be identified by a photograph 332 or other icon and their contact name. For example, from the work IM database 264 of FIGS. 41-43, "John" 282 and "Mary" 288 are both work and personal contacts, and "Carlos" 298 is work contacts, as such, each of them are represented in the work contact list UI 306. Additionally, as "John" is a protected contact, he is identified as such in the work contact list UI 306 by a lock badge 334. It can be appreciated that other visual identifiers can be used such as different text colors, different fonts, border coloring, background coloring, etc. Moreover, the badge 334 could be placed in other locations within the UI 306, such as on the associated photograph 332.

The total number 336 of work contacts may also be displayed in the label area 318. Additionally, an input field 338 displaying the text "Search work contacts" 340 further identifies the work contact list UI 306 as being related to contacts listed in the work IM database 278 and allow a user to search for a particular work contact.

FIG. 45 illustrates example of a personal contact list user interface (UI) 342. The personal contact list UI 342 may be shown when the device 10 is operating in a "personal" mode (i.e. all applications running and all data shown are accessible to or stored in the personal partition 252). The personal contact list UI 342 may include the features discussed above with relation to the work contact list UI 306, however, only contacts for whom information is stored in the personal IM database 270 are shown (i.e. "personal" contacts). Thus, as "John" 282 and "Mary" 288 are both work and personal contacts and "Sam" 292 is a personal contact, each of them are represented in the personal contact list UI 342.

The personal contact list UI 342 is identified as "Personal Contacts" by text in the label area 318 and the total number 344 of personal contacts is also displayed in the label area 318. Additionally, an input field 338 displaying the text "Search work contacts" 340 further identifies the personal contact list UI 342 as being related to contacts listed in the personal IM database 270 and allows a user to search for a particular personal contact.

Figures 46, 47:
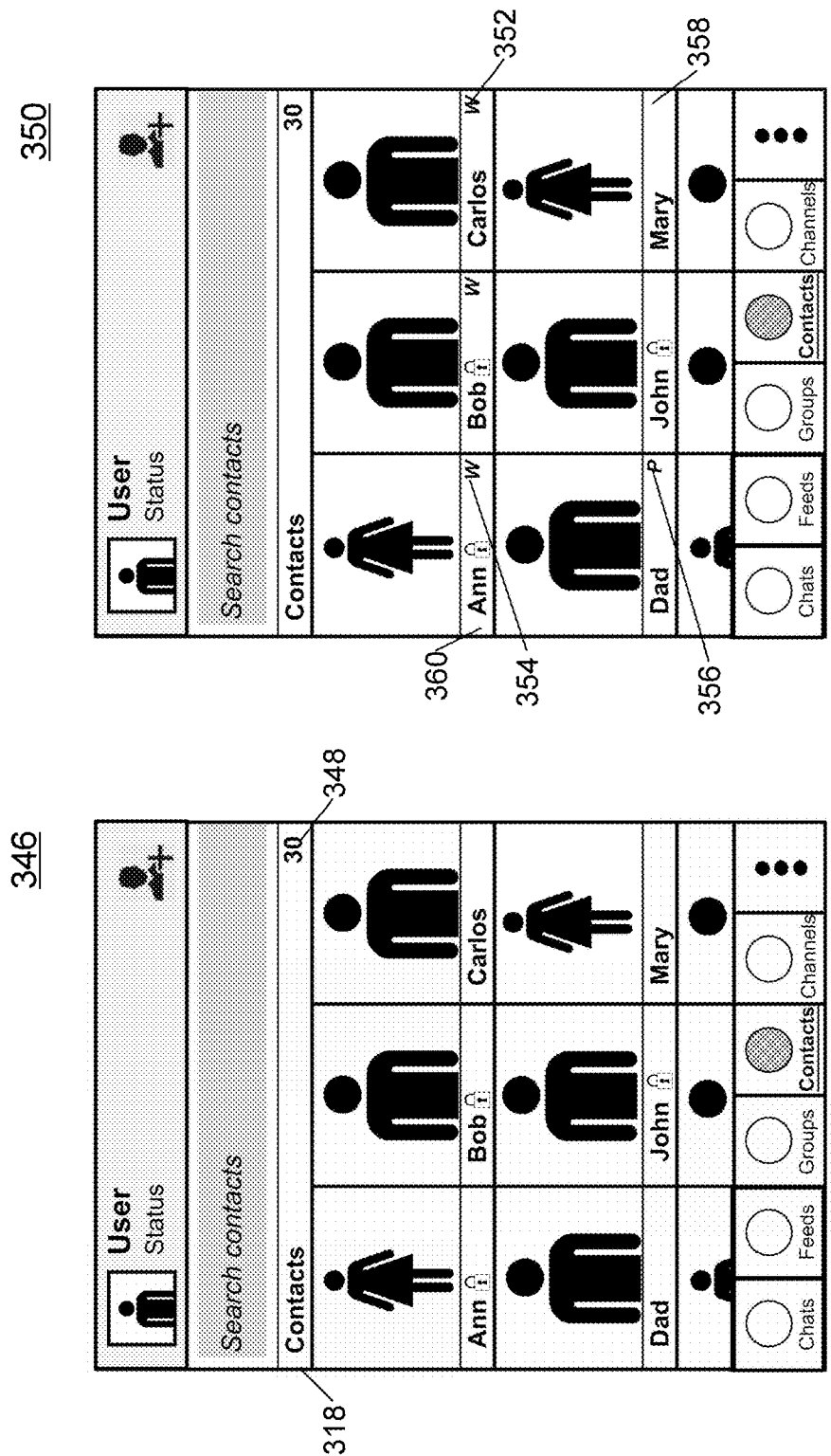
FIGS. 46 and 47 are screen shots of examples of graphical user interfaces for displaying work and personal contacts together.

An example of a contact list UI 346 for a hybrid IM application 302 is shown in FIG. 46. In this example, all contacts (i.e. both work and personal contacts) are shown in a single interface. Although the contact type for each contact is known to the hybrid IM application 302, there is no visible distinction between the contact types displayed to the user. Personal contacts are stored in the personal IM database 270 and work contacts are stored in the work IM database 278. The label area 318 identifies the list by the test "Contacts" and displays the total number 348 of unique contacts in the combined databases 270, 278.

An alternative example of a contact list UI 350 is shown in FIG. 47. In this example, personal and work contacts are displayed together; however, an indicator 352 designates the contact type. For example, a "W" 354 may indicate that the contact is a "work only" contact, while a "P" 356 may indicate that the contact is a "personal only" contact. The absence of an indicator 358 may indicate that the contact is both a work and personal contact. It should be noted that the example indicators expressed here are for illustrative purposes only and is not limiting in any way. Any number of techniques may be used to indicate contact type, for example, a change in font or color for the contact name, a change in color of the label area 360 in which the contact name is provided, a change in color surrounding the photograph 332 or icon associated with a contact, sorting the list by contact type and displaying the list sequentially according to contact type, etc.

Figure 48:
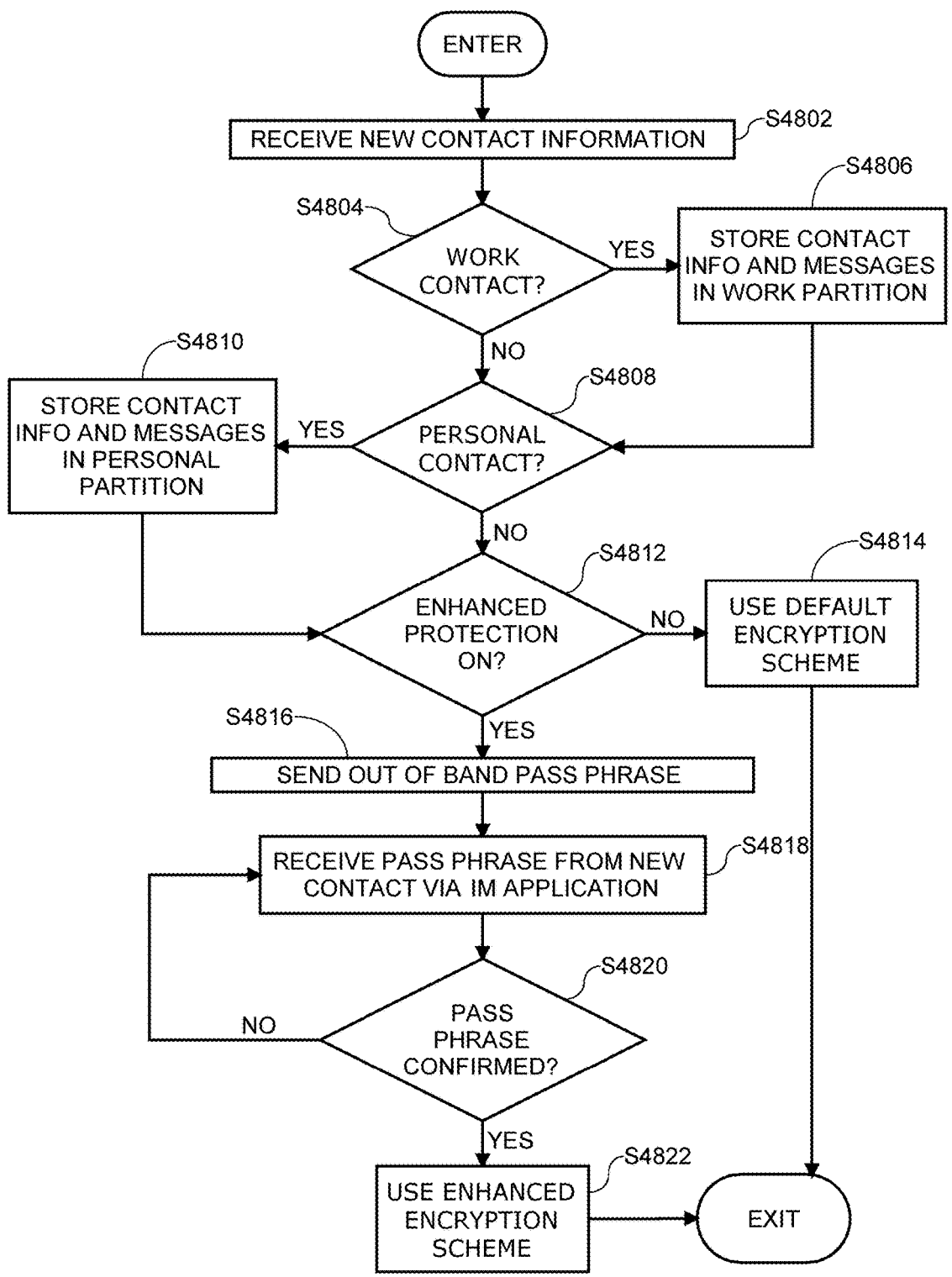
FIG. 48 is a flow chart illustrating an example process for adding a contact to an instant messaging application and automatically assigning a security level to the new contact based on contact type.

Turning now to FIG. 48, a flowchart 4800 is provided which illustrates a process for adding a contact to an instant messaging application and automatically assigning a security level to the new contact based on contact type. The mobile device 10 receives (at step S4802) new contact information associated with a new contact. The contact information may include a name, phone number, physical address, IP address, personal identification number or other device identifier for a device associated with the new contact. The contact information may be received wirelessly via any messaging platform transport medium including text messaging (e.g., Short Message Service (SMS), Multimedia Message Service (MMS), instant messaging (e.g., BLACKBERRY MESSAGING (BBM®), IMESSAGE®, etc.), vCard, email, near-field communications (NFC), Bluetooth, a direct update to the work IM database 278 from an enterprise server 22 or web-based console administrator, or manually input directly by the device user using a user interface, etc. The IM application 66 determines (at step S4804) whether or not the new contact information is a work contact. This determination may be made by identifying the source of the information (e.g., the information was sent from the enterprise server 22 or the web-based console administrator), by identifying certain characteristics of the contact information content (e.g., the contact information contains a specific identifying tag, a selected keyword, a particular email domain, etc.), identifying that the contact information was received via a particular transport channel (e.g., a direct update to the work IM database 278, originating from a dedicated IP address, etc.), manual identification from the user via an input interface, etc.

If the new contact information is for a work contact, the new contact information and any messages exchanged with any device identified by the new contact information is stored (at step S4806) in the work IM database 278 on the work partition 254. The IM application 66 then proceeds to determine (at step S4808) if the new contact information is also associated with a new personal contact or even a pre-existing personal contact already having an entry in the personal IM database 270 in the personal partition 252. Additionally, if the new contact information is determined (at step S4804) not to be associated with a work contact, the IM application proceeds to determine (at step S4808) whether the new contact information is associated with a personal contact. This determination may be made by comparing the new contact information with data already stored in the personal IM database 270, identifying the source of the information (e.g., the information was sent from an address associated with the user), by identifying certain characteristics of the contact information content (e.g., the contact information contains a selected keyword, a particular email domain, etc.), identifying that the contact information was received via a particular transport channel (e.g., text messaging, Bluetooth, NFC, etc.), manual identification from the user via an input interface, etc. If the new contact information is determined (at step S4808) to be associated with a personal contact, the new contact information and all messages exchanged with any device identified by the new contact information will be stored (at step S4810) in the personal IM database 270 in the personal partition 252. It should be noted that if the contact is both a work contact and a personal contact, duplicate copies of the contact information and messages will be stored in both the personal IM database 270 and the work IM database 278.

The IM application 66 sends capability messages between the wireless communication device 10 (i.e. the "inviting device") and the device identified by the new contact information (i.e. the "invited device"). One of these capabilities is determining (at step S4812) whether or not enhanced IM Protection is on. In order to use the enhanced protection scheme, both the inviting device and the invited device must have the enhanced protection on. If one of the devices does not have enhanced protection on (at step S4810), a default encryption scheme is used (at step S4814) to transfer IM messages between those two devices.

In order to exchange keys, the parties exchange a shared secret (referred to hereinafter as a "pass phrase," which illustrates one example of such a shared secret) using an out-of-band communication channel, i.e., using a communication medium other than the messaging infrastructure 18 used to conduct IM communications. For example, the out-of-band mechanism can include email, SMS, telephone, manual delivery (in person), short-range communications (e.g., NFC, WiFi, Bluetooth, infrared, etc.), etc. The inviting device sends (at step S4816) the out-of-band pass phrase to the invited device. Alternatively, the out-of-band pass phrase may be sent using any of the above mentioned means with or without the involvement of the inviting device. The shared secret can be generated in various ways, as described above, for example, using an auto-generated pass phrase or a user-supplied pass phrase as described above in relation to FIGS. 19 through 21.

The inviting device receives (at step S4818) a pass phrase from the invited device via the IM application. If the pass phrase matches (at step S4820) the pass phrase established for the invited device, any future IM communication between the two devices will use (at step S4822) the enhanced protection scheme. If the received pass phrase does not match (at step S4820) the established pass phrase, the inviting device may request the invited device to enter the pass phrase again, allowing a pre-determined number of tries before preventing communication between the devices.

Figures 51, 52:
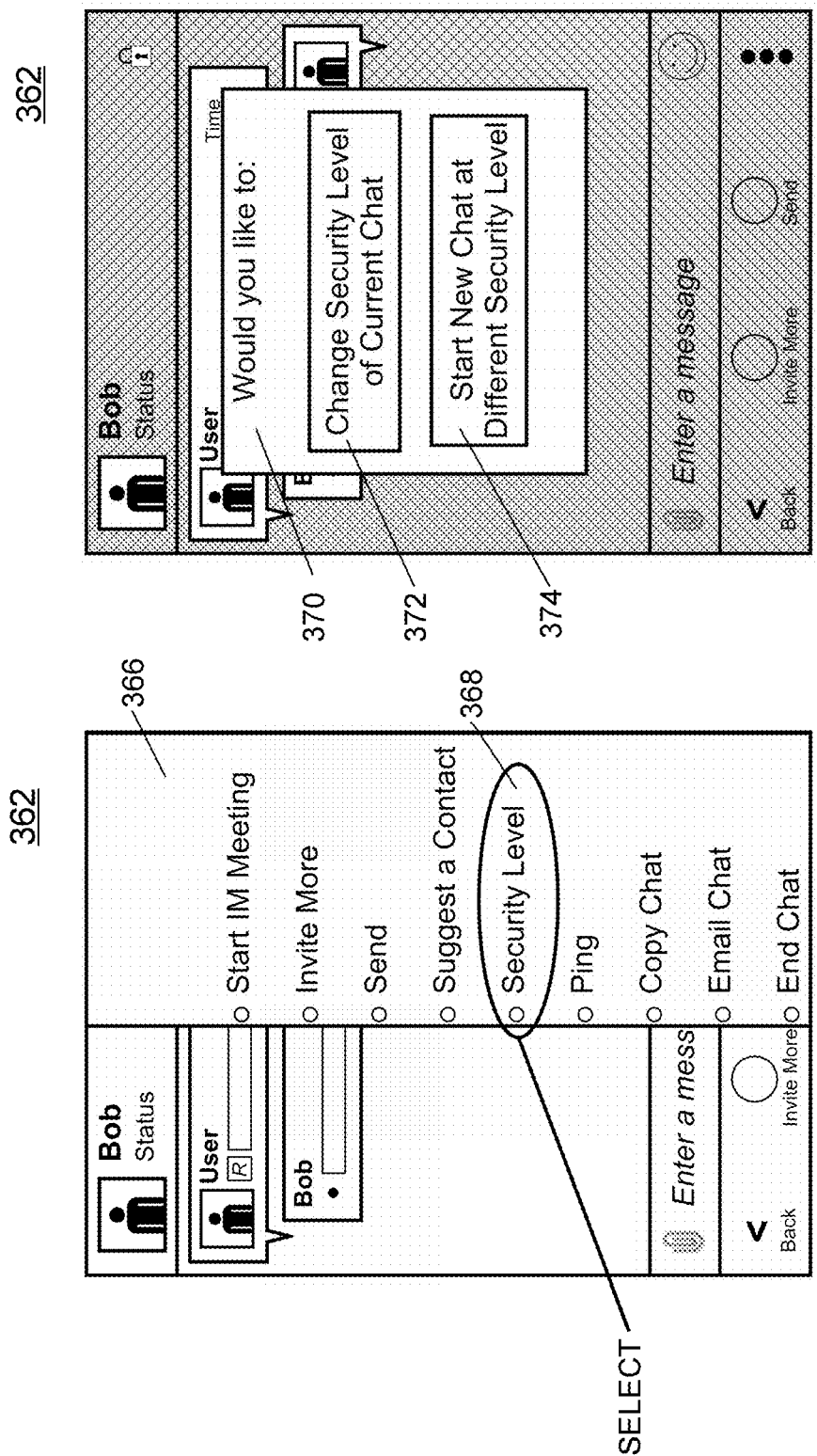

In certain circumstances, a user may desire to increase the security level for particular conversations with a protected contact. It should be noted that the IM application 66 is unable to increase the security level for a non-protected contact unless the non-protected contact enables enhanced IM Protection on their device, which changes their contact type. FIGS. 49 through 54 illustrate a sequence of screen shots illustrating an example procedure for changing a security level of an IM conversation with a protected contact. In FIG. 49, an example protected chat UI 362 is shown for displaying a conversation with contact "Bob" 364. Note that a single lock badge 366 indicates that the current conversation is protected using an enhanced protection scheme according to a default level for protected IM. To change from the default level protection scheme, the user selects the ellipses button 330, as shown in FIG. 50, which triggers a sliding options panel 366 with additional selectable options to appear, as shown in FIG. 51. To change the protection level, the user selects the option "Security Level" 368, which causes a pop-up security selection window 370 to appear, as shown in FIG. 52. If the user selects the "Change Security Level of Current Chat" button 372, keys for a higher level of security than the default level will be exchanged and the entire conversation, including previously stored messages will be re-encrypted and stored at the new security level. Any new messages exchanged with Bob's device will also be encrypted at the new security level for both transmission and storage. In contrast, if the user selects the "Start New Chat at Different Security Level" button 374, a new conversation will be initiated, keys exchanged for the higher security level, and future messages will be transmitted and stored at the higher security level as a new conversation. The current conversation is retained in memory and remains encrypted at rest using the lower security level.

Figures 53, 54:
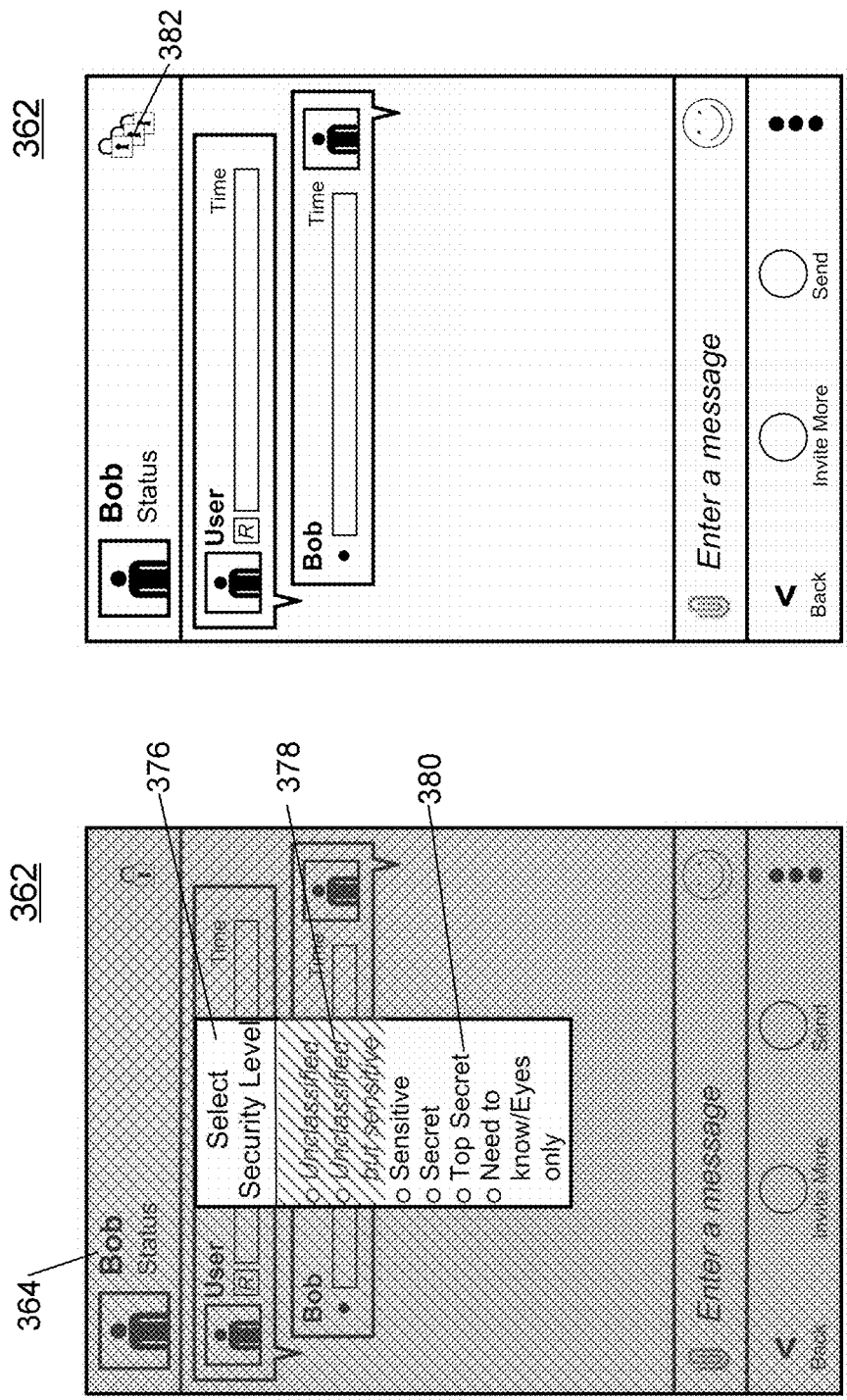

When either button 372 or button 374 is selected, a security level selection menu 376 is displayed, as shown in FIG. 53. The user may select a higher level of security than the default security level, but may not select a lower level. For example, the standard U.S. government security levels (i.e. "Unclassified," "Unclassified but sensitive," "Sensitive," "Secret," "Top Secret," and "Need to know") are offered as potential security levels for the protected IM depicted in FIG. 53. It should be noted that the names of the levels offered could be different depending upon the enterprise preferences or other factors, but each level represents a hierarchical increase in encryption scheme, such as the key size recommendations set by the National Institute of Standards and Technology (NIST). For example, "Unclassified" could indicate no encryption (e.g., TLS plus a low-level encryption algorithm such as 3DES with 156 bit keys), "Unclassified but sensitive" could indicate a basic encryption scheme (e.g., TLS plus AES using 80 bit keys, and RSA using 1024 bit keys or ECC using 160 bit keys), "Sensitive" could indicate a slightly more complex encryption scheme by increasing the key size (e.g., TLS plus AES using 112 bit keys, and RSA using 2048 bit keys or ECC using 224 bit keys), "Secret" could indicate an even higher level encryption scheme (e.g., TLS plus AES using 128 bit keys, and RSA using 3072 bit keys or ECC using 256 bit keys), "Top Secret" is still more complex (e.g., TLS plus AES using 192 bit keys, and RSA using 7680 bit keys or ECC using 384 bit keys), and "Need to Know/Eyes only" may be such a high level that transmitted messages have the highest level of security (e.g., TLS plus AES using 256 bit keys, and RSA using 15360 bit keys or ECC using 521 bit keys), but the messages are not permanently stored. It should be noted that the encryption scheme and key sizes indicated are used solely for illustrative purposes only and are not to be taken as limiting in any manner. Other encryption schemes, such as Advanced Encryption Standard (AES), RSA, Diffie-Hellman, elliptic curves, etc., using various key sizes may be implemented. The important characteristic is only that increasing security levels correlate to increased complexity in the encryption scheme.

In the example of FIG. 53, "Sensitive" is the default security level for protected contact "Bob" 364. Any level below "Sensitive" (i.e. "Unclassified" and "Unclassified but sensitive") is not available for selection and appears grayed or hashed out 378. If the user selects, for example, security level "Top Secret" 380 as the new security level, future message exchanges with Bob's device will be encrypted at a security level two levels above the default security level. As shown in FIG. 54, the protected chat UI 362 will depict the increased security level by displaying a triple lock badge 382 indicating the protection is two levels above default (i.e. default lock plus two). It should be noted that the increased security level may be depicted in other manners (e.g., change of color of ribbon area or lock, text, etc.) or not indicated to the user.

Figure 55:
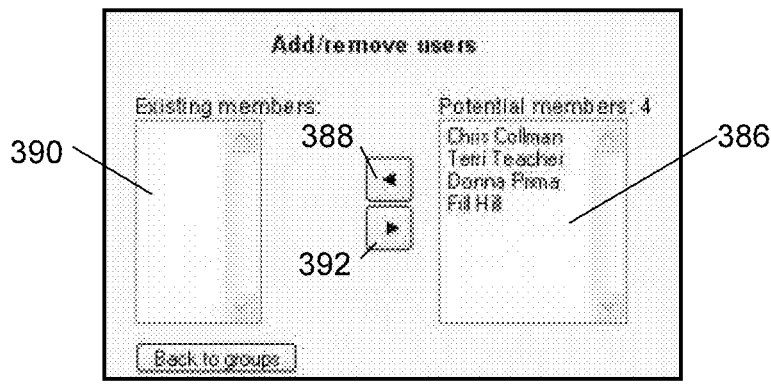
FIG. 55 is an example graphical user interface for adding contacts to a group.

All of the above discussion can apply to ad hoc multi-party chat conversations and file transfers, as well as to more permanent group conversations and file transfers. In reference to FIG. 55, a user, enterprise administrator or web-based console administrator may create or alter members of a group using a group editing interface 384. For any particular group, potential group members 386 are presented. The potential group members 386 are selected from a user's total contacts based on certain characteristics. For example, an enterprise administrator can only access work contacts, therefore, a work group will only have potential group members 386 selected from work contacts. Additionally, if the group conversation is to be protected, all potential group members 386 need devices with IM protection enabled, thus, only protected work contacts would be presented as potential group members. In contrast, as a user has access to both work and personal contacts, the user may create work groups, personal groups and a combination of both. A potential member may be added to the group by selecting the name of the potential group member and then clicking the left arrow 388. The name of the added group member will appear as an existing member 390. Likewise, an existing member 390 may be removed from the group by clicking the right arrow 392. The name of the removed member will appear once again as a potential member 386.

Figure 56:
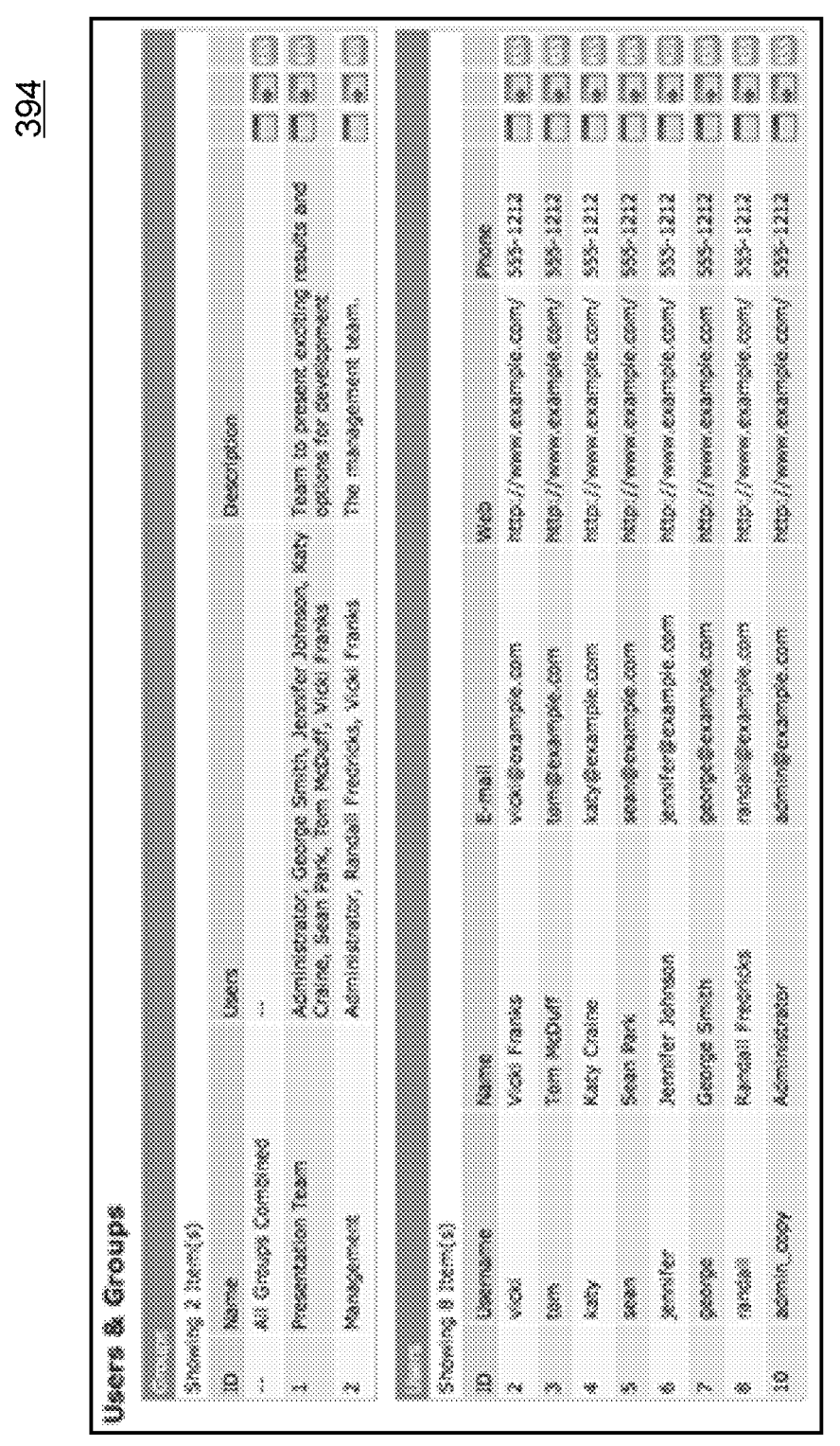

FIG. 56 illustrates an example groups and users interface 394 which provides a summary of all groups and users for an enterprise for use by its administrator. All existing groups and users, as well as contact information for each user and the members of each group is provided. The administrator may assign group membership to the individual users of an enterprise by designating a classification for that user, for example, as shown by group selection interface 396 in FIG. 57. For example, as indicated by the group selection interface 396, this particular enterprise has a number of groups, namely Executive 398, Sales 400, General 402, Staff 404, Manufacturing 406, Development 408 and Managers 410. Each user in the group may have access or editing privileges to particular content of the group. The group selection interface 396 lists every member of the enterprise in the left-most column 412, and the various groups in a row 414 along the top. By clicking a check box 416 corresponding to a particular user and group, the administrator may assign one or more groups to each member of the enterprise. In this manner, messages may be easily distributed to an entire subset of the enterprise organization based on group classification.

Figures 57, 58:
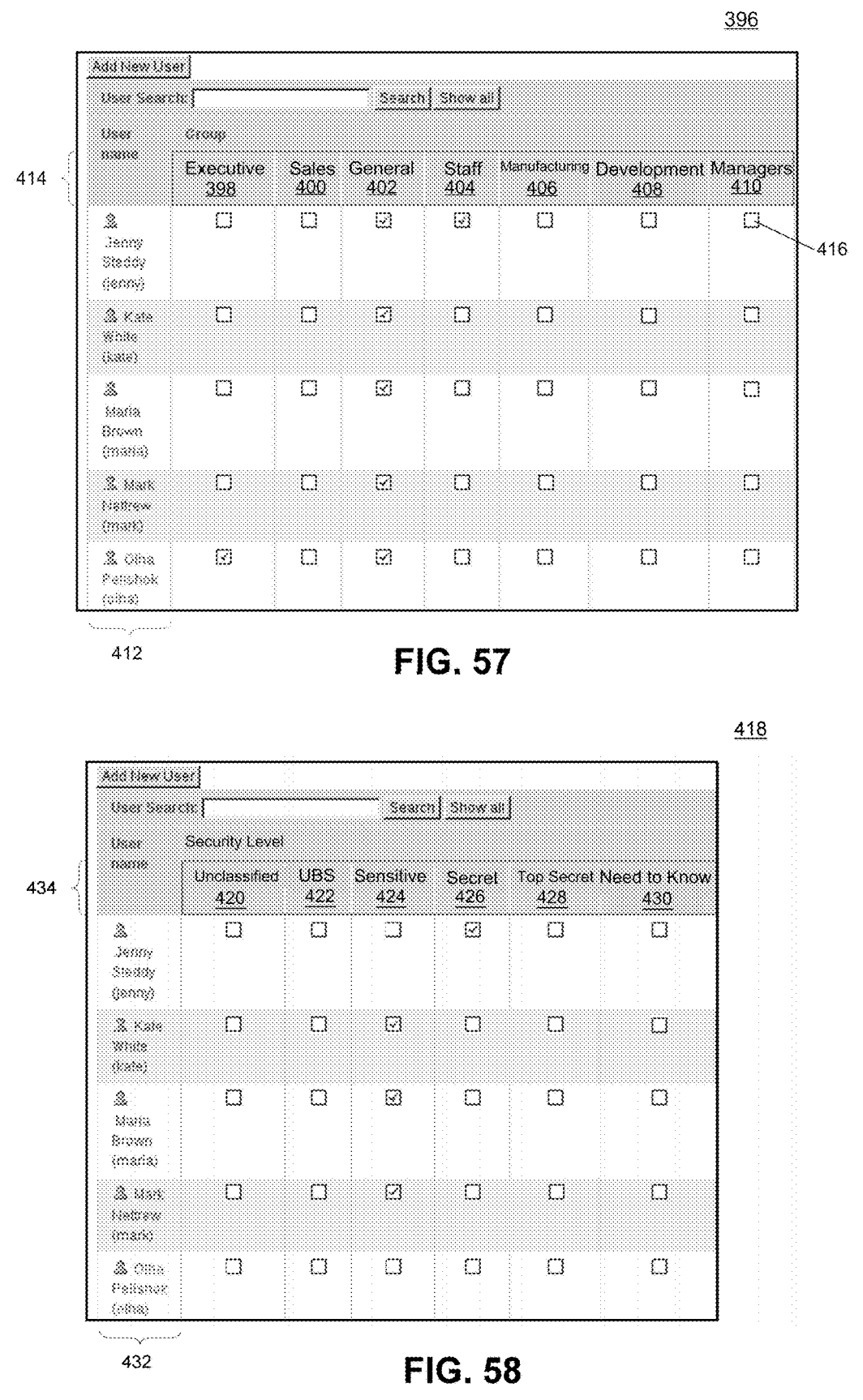

Likewise, default security levels may easily assign default security levels to users and groups using a security level interface 418, as shown in FIG. 58 Security level interface 418 allows the administrator to set the default security level for each member of the enterprise. In this case, the enterprise allows security levels "Unclassified" 420, "Unclassified but sensitive" 422, "Sensitive" 424, "Secret" 426, "Top Secret" 428, and "Need to Know/Eyes Only" 430 in accordance with the US Government security levels as described above. The security level interface 418 lists every member of the enterprise in the left-most column 432, and the various available security level settings in a row 434 along the top. By clicking a check box corresponding to a particular user and security level, the administrator may assign each user a default security level to each member of the enterprise.

Additionally, the administrator may assign different characteristics, such as different default security levels, to large groups of users or groups using a characteristics editor 436 as shown in FIG. 59. By selecting the arrow 438 associated with the input field 440, a drop-down menu 442 is displayed showing a listing of possible characteristics, such as default security levels. When a characteristic is selected, a listing of available users and groups 444 is populated with users and groups that are able to have that characteristic but are not yet assigned, as well as a listing of selected users and groups 446 that are already assigned that characteristic. Other characteristics may be assigned to users and groups in a similar manner.

For illustrative purposes, an example of a communication system including a messaging infrastructure 18 that enables mobile devices 10a, 10b to communicate via an IM (or other P2P-type) messaging system 700 over a wireless network 20, is shown in FIG. 60. It will be appreciated that the mobile devices 10a, 10b shown in FIG. 34 are shown as such for illustrative purposes and many other mobile devices 10 (not shown) may also be capable of communicating with or within the communication system. It will also be appreciated that although the examples shown herein are directed to mobile communication devices, the same principles may apply to other devices capable of communicating with the IM system 700. For example, an application (not shown) hosted by a desktop computer or other "non-portable" or "non-mobile" device (e.g., computer 60 shown in FIG. 11) may also be capable of communicating with other devices (e.g. including mobile devices 10) using the IM system 700.

The IM system 700 is, in this example, a component of the messaging infrastructure 18 associated with the wireless network 20. The messaging infrastructure 18 in this example includes, in addition to the IM system 700, and among other things not shown for simplicity, a personal identification number (PIN) database 702. The PIN database 702 in this example embodiment is used to store one or more PINs associated with respective mobile devices 10, whether they are subscribers to a service provided by the messaging infrastructure 18 or otherwise.

A first mobile device 10a may communicate with a second mobile device 10b and vice versa via the IM system 700, in order to perform IM messaging or to otherwise exchange IM-based communications. For ease of explanation, in the following examples, any IM-based communication may also be referred to as an IM message 12, 14 as shown in FIG. 60. It can be appreciated that only two mobile devices 10a, 10b are shown in FIG. 60 for ease of illustration and, for example, in an electronic group conversation, three or more mobile devices 10 would be participating in the group conversation. The IM system 700 in the example shown is configured to facilitate communication of both regular or default IM messages 12 utilizing a first level of security, and protected IM messages 14, utilizing a second level of security that is higher than the first level of security as discussed above by way of example. For example, the IM system 700 can identify from information included in the messages 12, 14 whether the message is a regular IM message 12 or a protected message 14 for the purpose of determining how to store a copy of the message 12, 14.

In some example embodiments, the IM system 700 may be capable of sending multi-cast messages, i.e. forwarding a single message from a sender to multiple recipients without requiring multiple IM messages 12, 14 to be generated by such a sender. For example, as shown in FIG. 61, the IM system 700 can be operable to enable a single IM message 12, 14 to be sent to multiple recipients by addressing the IM message 12, 14 to multiple corresponding IM addresses, and having the IM system 700 multicast the message 12, 14 to those recipients.

Figure 62:
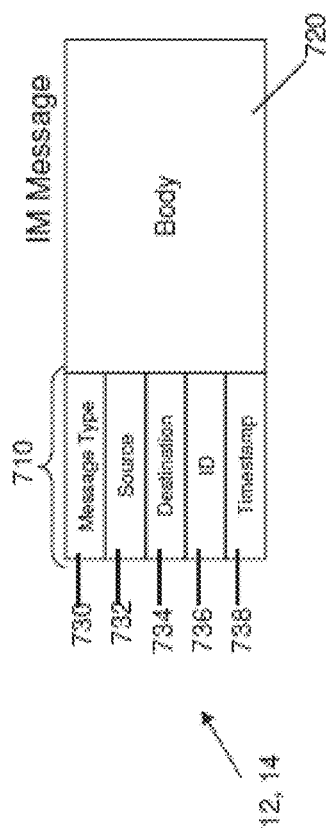
FIG. 62 is a block diagram illustrating an example of a peer-to-peer message configuration.
Figure 63:
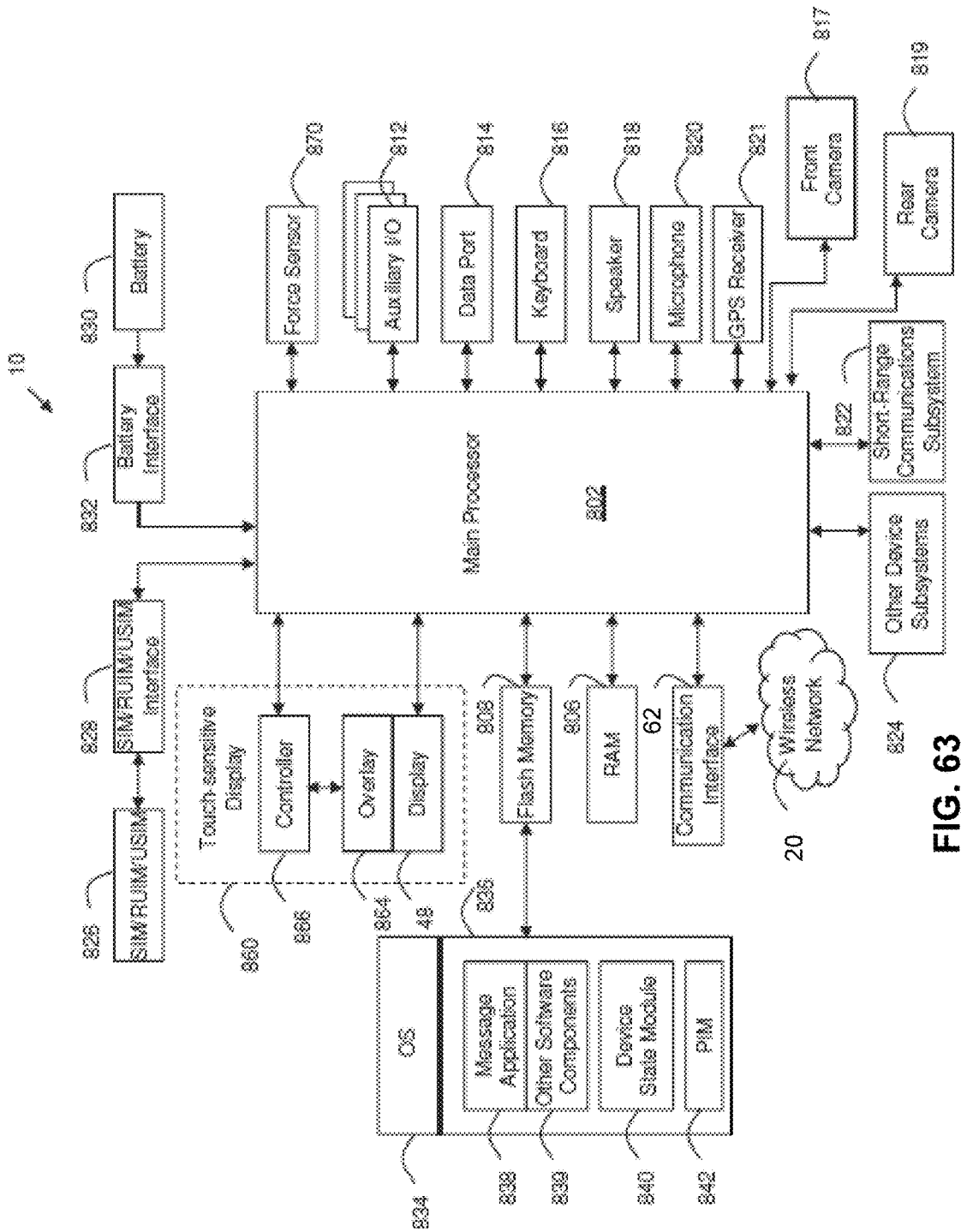
FIG. 63 is a block diagram of an example of a configuration for a mobile electronic communication device, in accordance with one aspect of the present disclosure.

An example of an IM message 12, 14 is shown in greater detail in FIG. 62, and has a format that is particularly suitable for a PIN-to-PIN based system. In a typical IM protocol, each IM message 12, 14 has associated therewith a source corresponding to the mobile device 10 which has sent the IM message 12, 14 and includes a destination identifying the one or more intended recipients. Each IM message 12, 14 in this example includes a body 720, which contains the content for the IM message 12, 14 (e.g. text, audio, images, video, or other data), and a header 710, which contains various fields used for transmitting and processing each IM message 12, 14. In this example, the header 30 includes a message type field 730 to specify the type of transmission (e.g. chat, registration, block, presence, etc.), a source field 732 to specify the device address for the sender, a destination field 734 to specify the device address(es) for the one or more intended recipients, an ID field 736 to identify the corresponding IM application (e.g., see IM application 66 in FIG. 11) and a timestamp field 738 to indicate the time (and if desired, the date) at which the IM message 12, 14 was sent by the designated sender. The message type field 730 may be used to designate whether the message 12, 14 is a regular IM message 12 or a protected IM message 14. However, the ID field 740 could also be used with a particular ID type being recognizable as a protected-type message 14. Another field could also be added to the header 710 to indicate protected IM messages 14.

It can be appreciated that in this example, the ID field 736 can be used to specify the application ID to identify a IM application on the mobile device 10. Where the IM application relates to, for example, an IM system, the message type field 730 can also be used to designate an IM communication, and the ID field 736 would then correspond to a conversation ID, i.e. a conversation thread the message 12, 14 corresponds to (e.g. such that each message 12, 14 is identified by the conversation in which it was sent).

Other information or attributes may be included in the IM message 12, 14, such as a subject field (not shown) to enable a subject for part or all of a conversation (in an IM example) to be transported with the IM message 12, 14 (e.g. to create new subjects, modify subjects, notify others of subjects, etc.), or application details field (not shown) to provide application-specific information such as the version and capabilities of the application.

The IM system 700 can utilize any suitable IM protocol operated by, for example, a IM router (not shown), which may be part of the messaging infrastructure 18. It can be appreciated however that a stand-alone IM configuration (i.e. that does not rely on the messaging infrastructure 18—not shown) may equally apply the principles herein. The IM system 700 may also enable mobile devices 10 to communicate with desktop computers thus facilitating, for example, communications such as instant messaging (IM) between mobile applications and desktop applications on the desktop computer.

The IM system 700 can be implemented using a router-based communication infrastructure, such as one that provides email, SMS, voice, Internet and other communications. Particularly suitable for hosting a IM messaging router, is a wireless router or server used in systems such as those that provide push-based communication services. In FIG. 59, the messaging infrastructure 18 facilitates IM communications such as instant messaging between mobile devices 10. IM messaging, such as IMing, is provided by an associated application stored on each mobile device 10, e.g. an IM application 66 as shown in FIG. 11, which can be initiated, for example, by highlighting and selecting an icon from a display as is well known in the art. The IM system 700 routes messages between the mobile devices 10 according to the IM protocol being used. For example, the IM protocol may define a particular way in which to conduct IM or other types of messaging.

In general, in a IM protocol, the sender of the IM message 12, 14 knows the source address of the intended recipient, e.g. a PIN. This may be established when the two devices request to add each other to their respective contact or buddy lists. A particular mobile device 10 can communicate directly with various other mobile devices 10 through the IM system 700 without requiring a dedicated server for facilitating communications. In other words, the IM system 700 enables the mobile devices 10 to communicate with each other directly over the network 16 in accordance with the IM protocol.

When conducting an IM session according to the example shown in FIG. 59, the mobile devices 10a, 10b can communicate directly with the messaging infrastructure 18 in a client based exchange where, as noted above, an intermediate server is not required. A IM message 12, 14 sent by one mobile device 10 is received by the messaging infrastructure 18, which obtains the source address for the intended recipient (or recipients) from information associated with the message 12, 14 (e.g. a data log) or from the message 12, 14 itself. After obtaining the recipient's address according to the IM protocol, the messaging infrastructure 18 then routes the message 12, 14 to the recipient associated with the mobile device 10 having such address (or recipients having respective addresses). The messaging infrastructure 18 typically also provides a delivery confirmation to the original sender, which may or may not be displayed to the user. The destination device can also provide such delivery information. The messaging infrastructure 18 may be capable of routing IM messages 12, 14 reliably as well as being capable of holding onto the IM messages 12, 14 until they are successfully delivered. Alternatively, if delivery cannot be made after a certain timeout period, the messaging infrastructure 18 may provide a response indicating a failed delivery. The messaging infrastructure 18 may choose to expire a message 12, 14 if a certain waiting period lapses.

Referring to FIG. 62, to further aid in the understanding of the example mobile devices 10 described above, shown therein is a block diagram of an example configuration of a device configured as a "mobile device", referred to generally as "mobile device 10." The mobile device 10 includes a number of components such as a main processor 802 that controls the overall operation of the mobile device 10. Communication functions, including data and voice communications, are performed through at least one communication interface 62. The communication interface 46 receives messages from and sends messages to a wireless network 20. In this example of the mobile device 10, the communication interface 62 is configured in accordance with the Global System for Mobile Communication (GSM) and General Packet Radio Services (GPRS) standards, which is used worldwide. Other communication configurations that are equally applicable are the 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behavior described herein, and it will also be understood by persons skilled in the art that the examples described herein are intended to use any other suitable standards that are developed in the future. The wireless link connecting the communication interface 62 with the wireless network 20 represents one or more different Radio Frequency (RF) channels, operating according to defined protocols specified for GSM/GPRS communications.

The main processor 802 also interacts with additional subsystems such as a Random Access Memory (RAM) 806, a flash memory 808, a touch-sensitive display 860, an auxiliary input/output (I/O) subsystem 812, a data port 814, a keyboard 816 (physical, virtual, or both), a speaker 818, a microphone 820, a GPS receiver 821, a front camera 817, a rear camera 819, short-range communications subsystem 822, and other device subsystems 824. Some of the subsystems of the mobile device 10 perform communication-related functions, whereas other subsystems may provide "resident" or on-device functions. By way of example, the touch-sensitive display 860 and the keyboard 816 may be used for both communication-related functions, such as entering a text message for transmission over the wireless network 20, and device-resident functions such as a calculator or task list. In one example, the mobile device 10 can include a non-touch-sensitive display in place of, or in addition to the touch-sensitive display 860. For example the touch-sensitive display 860 can be replaced by a display 48 that may not have touch-sensitive capabilities.

The mobile device 10 can send and receive communication signals over the wireless network 20 after required network registration or activation procedures have been completed. Network access is associated with a subscriber or user of the mobile device 10. To identify a subscriber, the mobile device 10 may use a subscriber module component or "smart card" 826, such as a Subscriber Identity Module (SIM), a Removable User Identity Module (RUIM) and a Universal Subscriber Identity Module (USIM). In the example shown, a SIM/RUIM/USIM 826 is to be inserted into a SIM/RUIM/USIM interface 828 in order to communicate with a network.

The mobile device 10 is typically a battery-powered device and includes a battery interface 832 for receiving one or more rechargeable batteries 830. In at least some examples, the battery 830 can be a smart battery with an embedded microprocessor. The battery interface 832 is coupled to a regulator (not shown), which assists the battery 830 in providing power to the mobile device 10. Although current technology makes use of a battery, future technologies such as micro fuel cells may provide the power to the mobile device 10.

The mobile device 10 also includes an operating system 834 and software components 836 to 842. The operating system 834 and the software components 836 to 842, that are executed by the main processor 802 are typically stored in a persistent store such as the flash memory 808, which may alternatively be a read-only memory (ROM) or similar storage element (not shown). Those skilled in the art will appreciate that portions of the operating system 834 and the software components 836 to 842, such as specific device applications, or parts thereof, may be temporarily loaded into a volatile store such as the RAM 806. Other software components can also be included, such as IM applications 66, 262, 264 and 302 as described herein, as is well known to those skilled in the art.

The subset of software applications 836 that control basic device operations, including data and voice communication applications, may be installed on the mobile device 10 during its manufacture. Software applications may include a message application 838, a device state module 840, a Personal Information Manager (PIM) 842 and IM applications 66, 262, 264 and 302. A message application 838 can be any suitable software program that allows a user of the mobile device 10 to send and receive electronic messages, wherein messages are typically stored in the flash memory 808 of the mobile device 10. A device state module 840 provides persistence, i.e. the device state module 840 ensures that important device data is stored in persistent memory, such as the flash memory 808, so that the data is not lost when the mobile device 10 is turned off or loses power. A PIM 842 includes functionality for organizing and managing data items of interest to the user, such as, but not limited to, e-mail, contacts, calendar events, and voice mails, and may interact with the wireless network 20.

Other types of software applications or components 839 can also be installed on the mobile device 10. These software applications 839 can be pre-installed applications (i.e. other than message application 838) or third party applications, which are added after the manufacture of the mobile device 10. Examples of third party applications include games, calculators, utilities, etc.

The additional applications 839 can be loaded onto the mobile device 10 through at least one of the wireless network 20, the auxiliary I/O subsystem 812, the data port 814, the short-range communications subsystem 822, or any other suitable device subsystem 824.

The data port 814 can be any suitable port that enables data communication between the mobile device 10 and another computing device. The data port 814 can be a serial or a parallel port. In some instances, the data port 814 can be a Universal Serial Bus (USB) port that includes data lines for data transfer and a supply line that can provide a charging current to charge the battery 830 of the mobile device 10.

For voice communications, received signals are output to the speaker 818, and signals for transmission are generated by the microphone 820. Although voice or audio signal output is accomplished primarily through the speaker 818, the display 64 can also be used to provide additional information such as the identity of a calling party, duration of a voice call, or other voice call related information.

The touch-sensitive display 860 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example, the touch-sensitive display 860 is a capacitive touch-sensitive display which includes a capacitive touch-sensitive overlay 864. The overlay 864 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The display 64 of the touch-sensitive display 860 may include a display area in which information may be displayed, and a non-display area extending around the periphery of the display area. Information is not displayed in the non-display area, which is utilized to accommodate, for example, one or more of electronic traces or electrical connections, adhesives or other sealants, and protective coatings, around the edges of the display area.

One or more touches, also known as touch contacts or touch events, may be detected by the touch-sensitive display 860. The processor 802 may determine attributes of the touch, including a location of a touch. Touch location data may include an area of contact or a single point of contact, such as a point at or near a center of the area of contact, known as the centroid. A signal is provided to the controller 866 in response to detection of a touch. A touch may be detected from any suitable object, such as a finger, thumb, appendage, or other items, for example, a stylus, pen, or other pointer depending on the nature of the touch-sensitive display 860. The location of the touch moves as the detected object moves during a touch. One or both of the controller 866 and the processor 802 may detect a touch by any suitable contact member on the touch-sensitive display 860. Similarly, multiple simultaneous touches, are detected.

In some examples, an optional force sensor 870 or force sensors is disposed in any suitable location, for example, between the touch-sensitive display 860 and a back of the mobile device 10 to detect a force imparted by a touch on the touch-sensitive display 860. The force sensor 870 may be a force-sensitive resistor, strain gauge, piezoelectric or piezoresistive device, pressure sensor, or other suitable device.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method of communicating between a first communication device and a second communication device using an instant messaging application, the method comprising:
receiving, at the first communication device, contact information identifying the second communication device;
determining, by the first communication device, a contact type for the second communication device from the contact information;
responsive to determining that the contact type is a first contact type, storing the contact information in a first partition of a memory of the first communication device;
responsive to determining that the contact type is a second contact type, storing the contact information in a second partition of the memory of the first communication device;
when the contact type is the first contact type, exchanging messages with the second communication device according to a first security policy; and
when the contact type is the second contact type, exchanging messages with the second communication device according to a second security policy.

2. The method of claim 1, wherein the first partition and the second partition employ different encryption schemes.

3. The method of claim 1, wherein the first partition is unencrypted and the second partition is encrypted.

4. The method of claim 1, wherein a third party has access and control over the second partition.

5. The method of claim 1, wherein the contact information stored in the first partition is stored in a first instant messaging database and the contact information stored in the second partition is stored in a second instant messaging database.

6. The method of claim 5, wherein at least one of the first instant messaging database and the second instant messaging database is encrypted.

7. The method of claim 1, wherein:
the first security policy comprises receiving and transmitting a message without encryption; and
the second security policy comprises at least one of receiving and transmitting a message encoded according to an encryption scheme.

8. The method of claim 1, wherein the second security policy uses a higher encryption level than the first security policy.

9. The method of claim 1, wherein:
the first security policy comprises at least one of receiving and transmitting a message encoded according to a first encryption scheme; and
the second security policy comprises at least one of receiving and transmitting a message encoded according to a second encryption scheme.

10. The method of claim 9, wherein the first encryption scheme and the second encryption scheme are different.

11. The method of claim 8, wherein the messages encoded according to a first encryption scheme are stored in the first instant messaging database and the messages encoded according to the second encryption scheme are stored in the second instant messaging database.

12. The method of claim 8, further comprising changing one of the first security policy and the second security policy to a third security policy, the third security policy having a higher encryption level than the either the first security policy or the second security policy.

13. The method of claim 1, wherein the contact type is both the first contact type and the second contact type.

14. A communication device comprising:
a memory partitioned into at least a first partition and a second partition;
one or more communication interfaces that receive contact information identifying a second communication device and communicate over one or more networks; and
a processor coupled to the communication interface and the memory which:
determines a contact type for the second communication device from the contact information;

responsive to determining that the contact type is a first contact type, stores the contact information in the first partition of the memory;

responsive to determining that the contact type is a second contact type, stores the contact information in the second partition of the memory;

when the contact type is the first contact type, exchanges messages with the second communication device according to a first security policy; and when the contact type is the second contact type, exchanges messages with the second communication device according to a second security policy.

15. The communication device of claim 14, wherein the first partition and the second partition employ different encryption schemes.

16. The communication device of claim 14, wherein a third party has access and control over the second partition.

17. The communication device of claim 14, wherein the contact information stored in the first partition is stored in a first instant messaging database and the contact information stored in the second partition is stored in a second instant messaging database.

18. The communication device of claim 17, wherein at least one of the first instant messaging database and the second instant messaging database is encrypted.

19. The communication device of claim 14, wherein:

the first security policy comprises receiving and transmitting a message without encryption; and the second security policy comprises at least one of receiving and transmitting a message encoded according to an encryption scheme.

20. A computer program product for communicating between a first communication device and a second communication device using an instant messaging application, the computer program product comprising a non-transitory computer readable storage medium having program instructions embodied therewith, the program instructions executable by a communication device to cause the communication device to perform a method comprising:

receiving contact information identifying a second communication device;

determining a contact type for the second communication device from the contact information;

responsive to determining that the contact type is a first contact type, storing the contact information in a first partition of a memory of the first communication device;

responsive to determining that the contact type is a second contact type, storing the contact information in a second partition of the memory of the first communication device;

when the contact type is the first contact type, exchanging messages with the second communication device according to a first security policy; and when the contact type is the second contact type, exchanging messages with the second communication device according to a second security policy.

\* \* \* \* \*